United States Patent
Kishi

(10) Patent No.: US 6,950,471 B2
(45) Date of Patent: Sep. 27, 2005

(54) CODING DEVICE, CODING METHOD AND STORAGE MEDIUM

(75) Inventor: Hiroki Kishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 747 days.

(21) Appl. No.: 09/851,559

(22) Filed: May 10, 2001

(65) Prior Publication Data

US 2002/0031182 A1 Mar. 14, 2002

(30) Foreign Application Priority Data

May 11, 2000 (JP) .................................... 2000-138927
Apr. 6, 2001 (JP) .................................... 2001-109003

(51) Int. Cl.$^7$ ............................................ H04N 7/18
(52) U.S. Cl. ............................ 375/240.19; 375/240.18
(58) Field of Search .................................... 375/240.19

(56) References Cited

U.S. PATENT DOCUMENTS 5,867,602 A * 2/1999 Zandi et al. ................ 382/248
6,549,666 B1 * 4/2003 Schwartz .................... 382/233

* cited by examiner

*Primary Examiner*—Andy Rao
(74) *Attorney, Agent, or Firm*—Fitzpatrick, Cella, Harper & Scinto

(57) ABSTRACT

A code length of image coded data is length-fixed in accordance with a code length representing a required criterion. For this purpose, a discrete wavelet transformation unit 110 performs discrete wavelet transformation of image data. A factor quantization unit 112 performs quantization. An entropy coding unit 113 performs entropy coding of a factor quantized value by arithmetic coding. If the code length of quasi image coded data is longer than the code length designated by a designated image coded data code length inputting unit 102, entropy coded values are deleted in the unit of sub-bands so that the code length of the quasi image code data equals the designated code length. If the code length of quasi image coded data is shorter than the designated code length, adjustment bits are added.

33 Claims, 64 Drawing Sheets

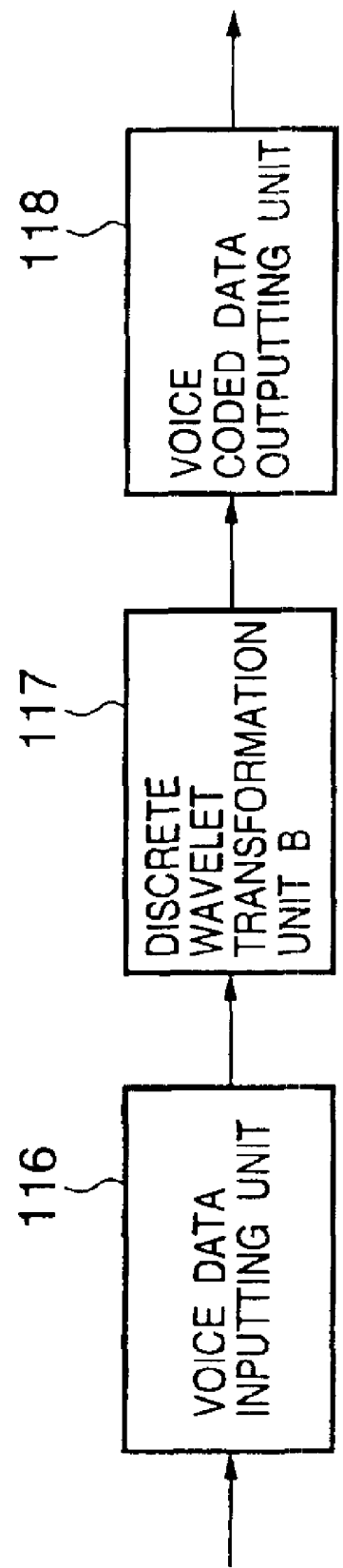

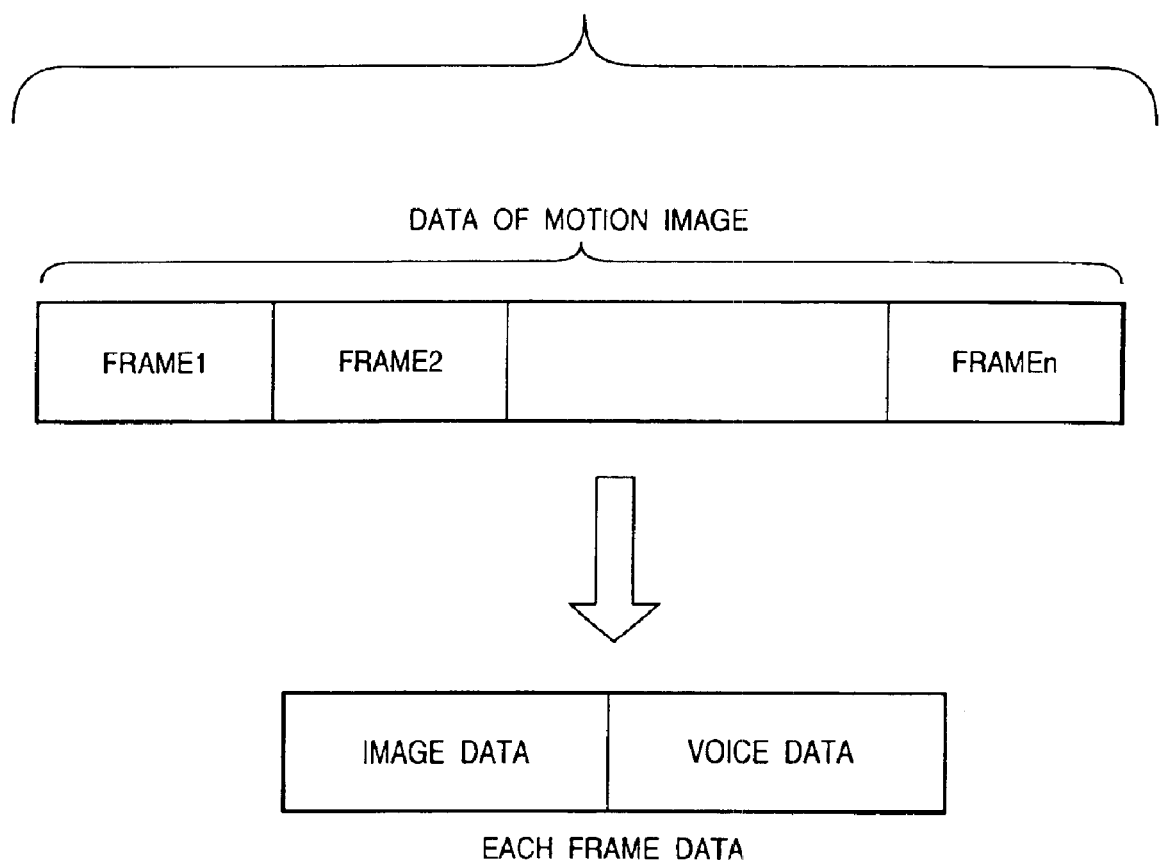

FIG. 3
FRAME DATA
| IMAGE DATA | VOICE DATA |
SEPARATION BY FRAME DATA SEPARATION UNIT 104
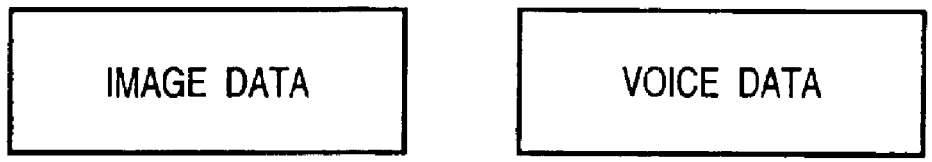
IMAGE DATA    VOICE DATA

FRAME CODED DATA

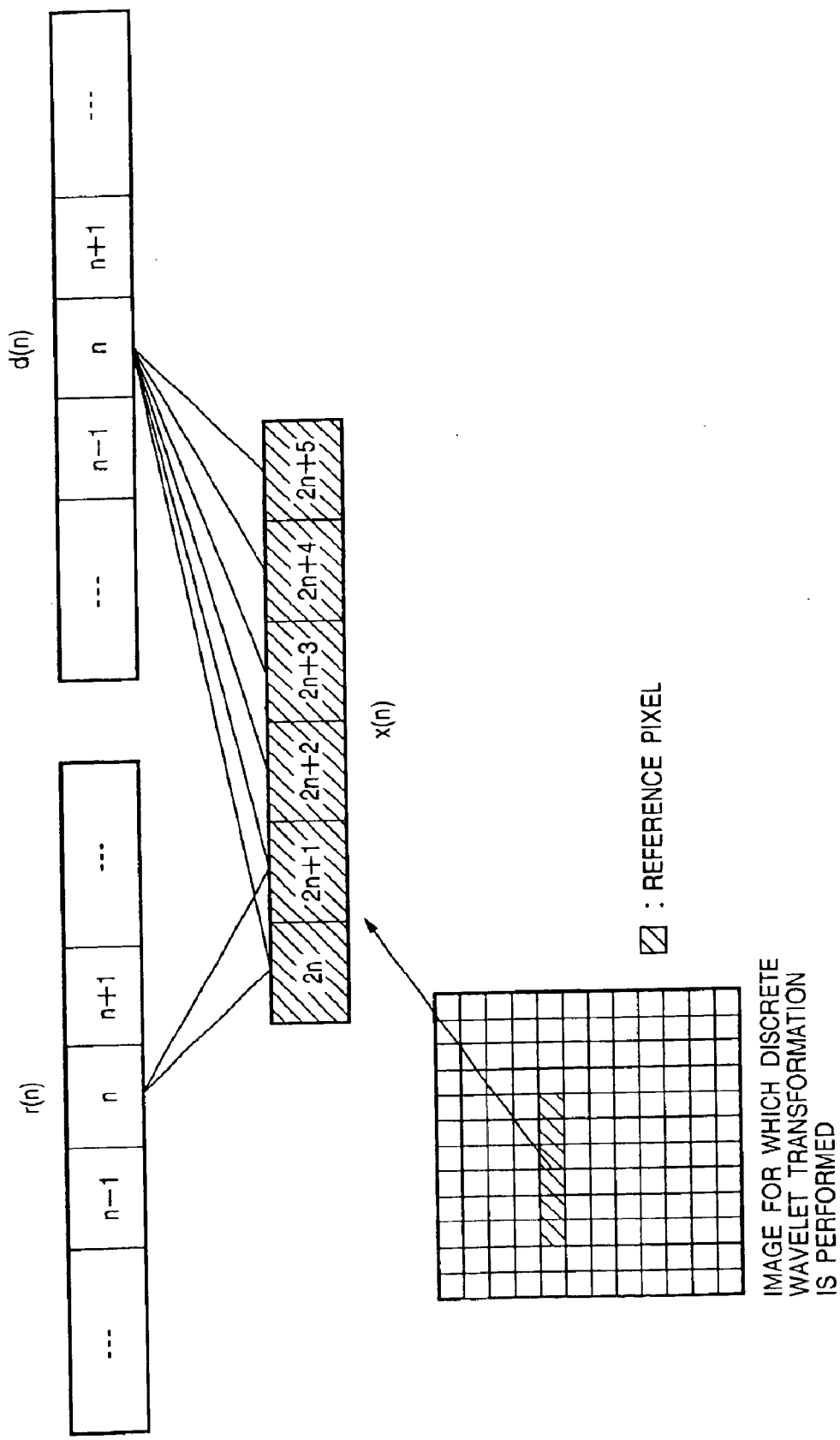

FIG. 6A

| LL | HL |
|---|---|
| LH | HH |

FIG. 6B

| LL | HL | HL | |
|---|---|---|---|
| LH | HH | | |
| LH | | HH | |

FIG. 6C

| LL | HL1 | HL2 | HL3 |
|---|---|---|---|
| LH1 | HH1 | | |
| LH2 | | HH2 | |
| LH3 | | | HH3 |

LEVEL0 : LL
LEVEL1 : HL1,HH1,LH1
LEVEL2 : HL2,HH2,LH2
LEVEL3 : HL3,HH3,LH3

FIG. 7

| FREQUENCY COMPONENT | QUANTIZING STEP |
|---|---|
| LL | 1 |
| HL1 | 2 |
| HH1 | 2 |
| LH1 | 2 |
| HL2 | 4 |
| HH2 | 4 |
| LH2 | 4 |
| HL3 | 8 |
| HH3 | 8 |
| LH3 | 8 |

QUASI IMAGE CODED DATA

FIG. 9

QUASI IMAGE CODED DATA

| LL | HL1 | LH1 | HH1 | --- | LH3 | HH3 |

DELETED IN ASCENDING ORDER
WITH DATA OF THIS SUB-BAND
BEING DELETED FIRST

LEVEL0 : LL
LEVEL1 : HL1,HH1,LH1
LEVEL2 : HL2,HH2,LH2
LEVEL3 : HL3,HH3,LH3

FIG. 20

| FREQUENCY COMPONENT | QUANTIZING STEP |
|---|---|
| LL | 1 |
| HL1 | 2 |
| HH1 | 2 |
| LH1 | 2 |
| HL2 | 4 |
| HH2 | 4 |
| LH2 | 4 |

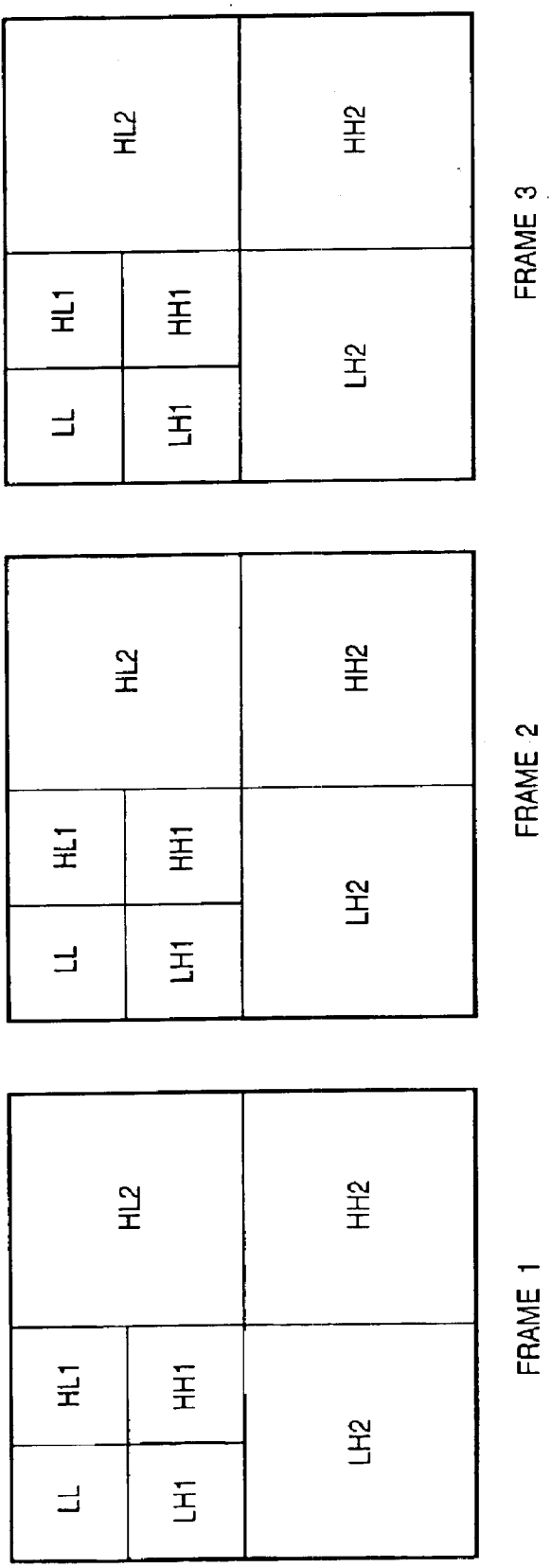

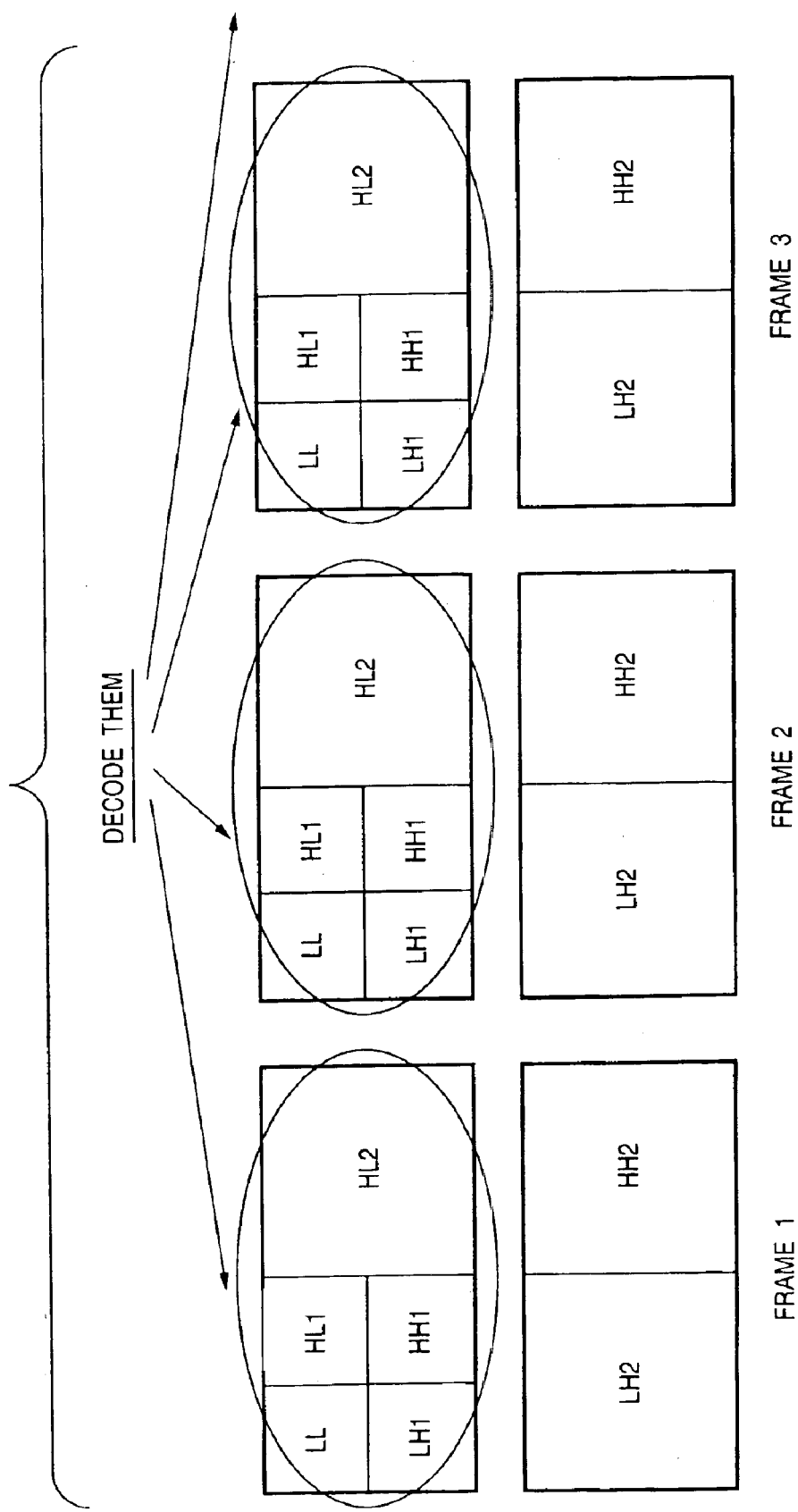

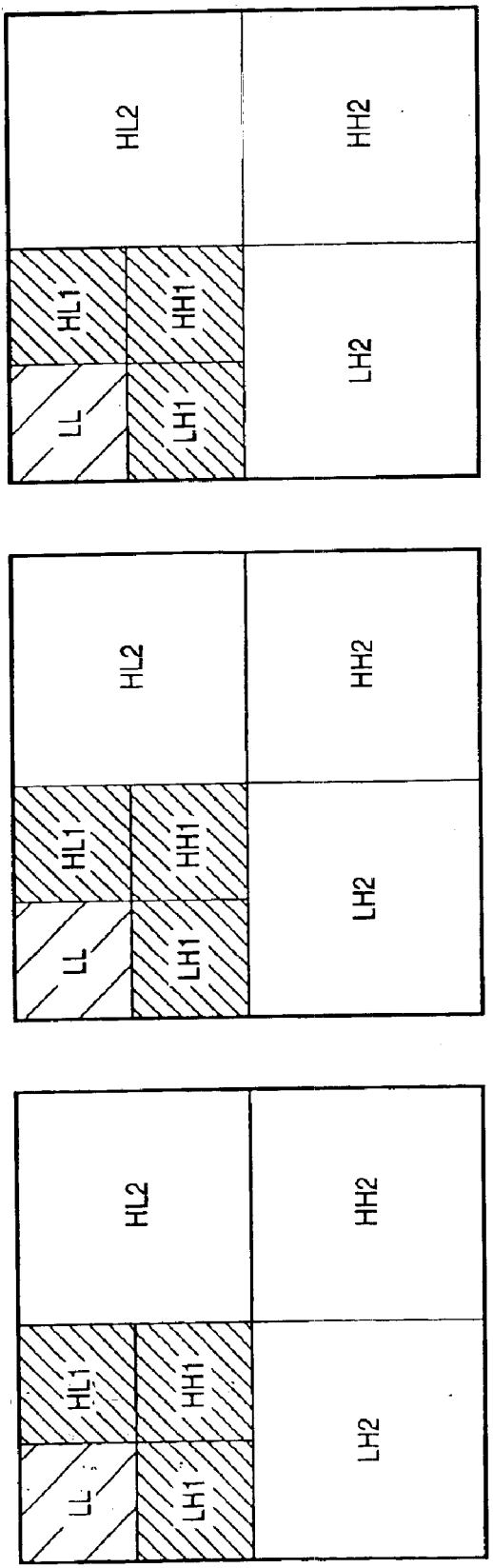

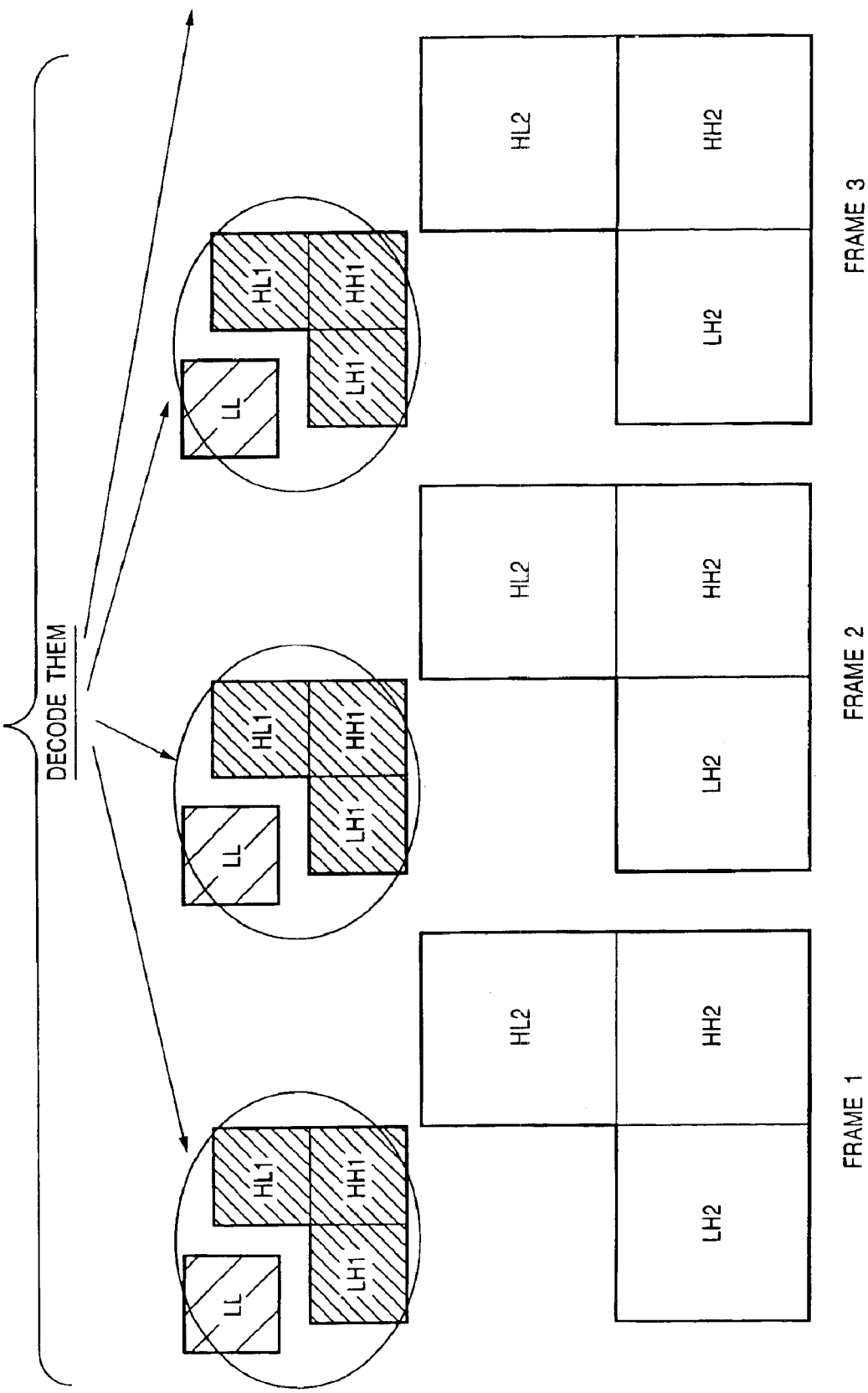

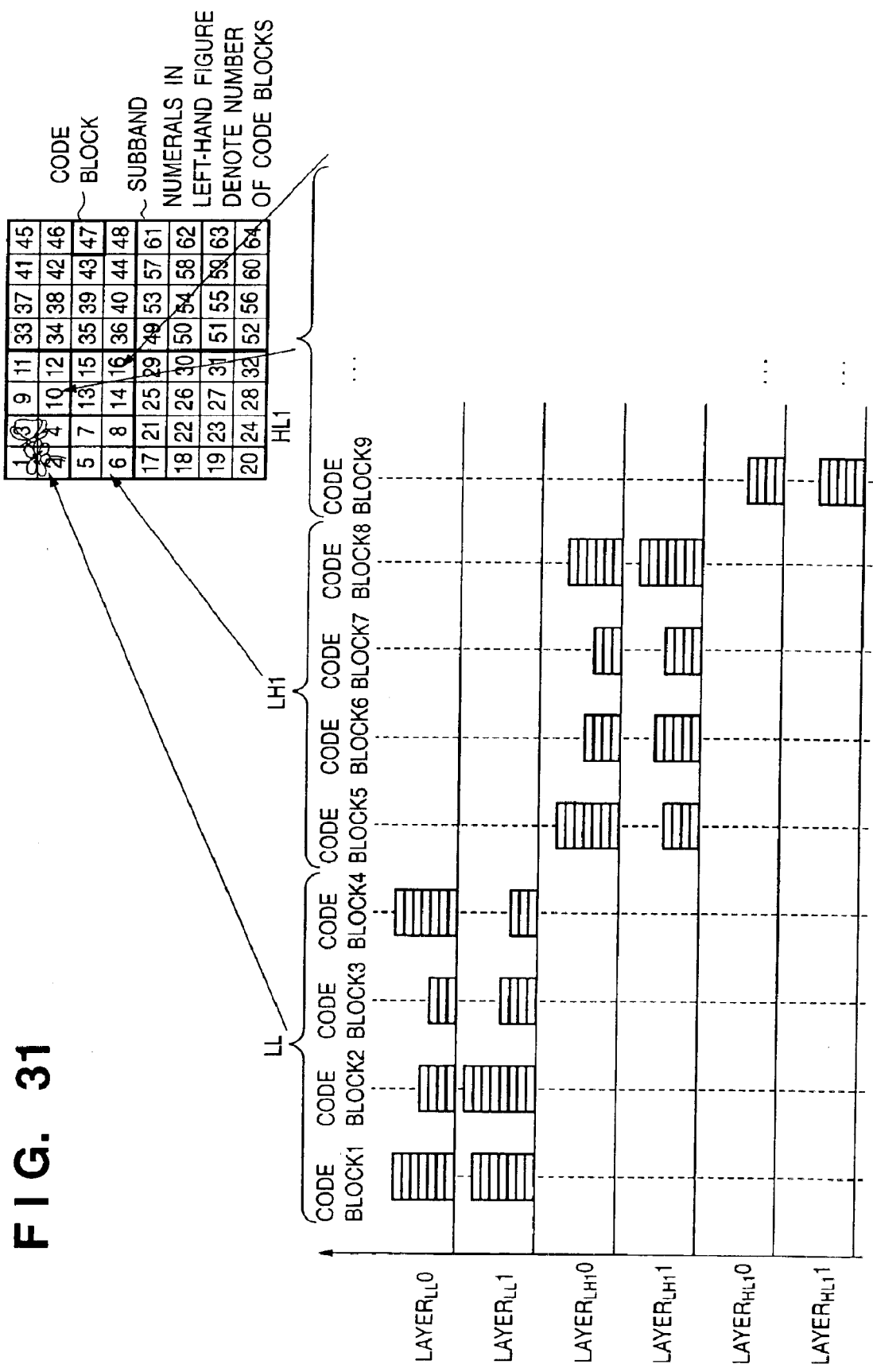

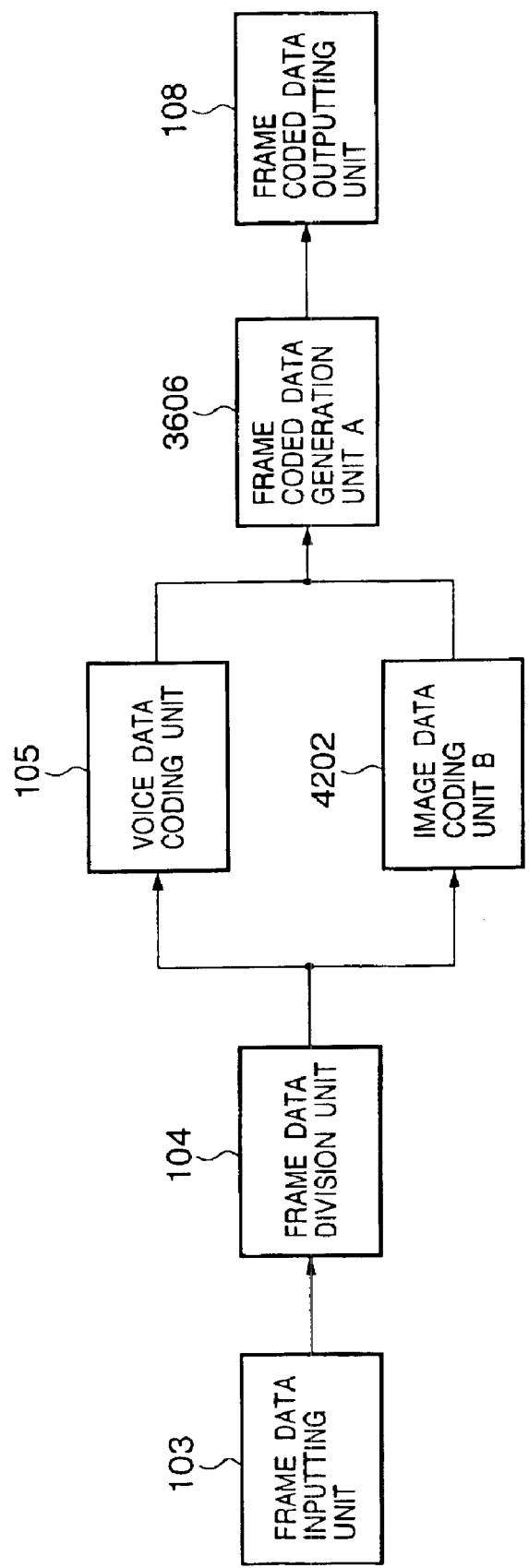

CODING DEVICE, CODING METHOD AND STORAGE MEDIUM

FIELD OF THE INVENTION

The present invention relates to a coding device and coding method for encoding image data, and a storage medium thereof.

BACKGROUND OF THE INVENTION

Recently, due to the spread of personal computers and mobile terminals, communication of digital data (data communication) via Internet has come into general practice. One of digital data distributed in data communication is an motion image. Since the motion image has large quantity of data, it is encoded with static images and associated voices (frames) as units before it is sent, thus reducing the data amount of the motion image.

As a method of encoding motion image data like this, there has been the method of encoding image data in which image coded data is provided with a function of enhancing precision of the decoded image (scalability) with the progress of decoding of image coded data obtained by encoding image data in motion image data.

For the conventional method of encoding image data, however, there have been cases where for some code length of image coded data having a scalability function, this image coded data could not be decoded within a time period over which the one-frame image is played back.

SUMMARY OF THE INVENTION

The present invention has been made in the light of the above described problems, and is to provide a coding device and coding method for fixing the code length of image coded data in accordance with the code length conforming to required criteria, and a storage medium thereof.

Particularly, the object of the present invention is to provide a technology for generating coded data, which can cope with various kinds of decoding/playback speeds/times, or a technology for decoding coded data in accordance with various kinds of decoding/playback speeds/times, in a state in which hierarchical coding can be performed.

For achieving the objects of the present invention, a coding device of the present invention has a configuration described below, for example. That is, a coding device for encoding image data, comprising:

transforming means for performing discrete wavelet transformation on inputted image data, thereby generating transformation factors of a plurality of frequency sub-bands;

coding means for entropy-coding each of the above described sub-bands; and generating means for monitoring the amount of coded data of a predetermined sub-band in the above described sub-bands, and if the predetermined sub-band exceeds a predetermined code length, removing coded data included in an area where the sub-band exceeds the predetermined code length, and if the predetermined sub-band does not reach the above described predetermined code length, adding dummy data to the coded data of the above described sub-band, thereby generating fixed length coded data of the above described predetermined code length.

Also, another coding device has a configuration described below. That is, a coding device for encoding image data of each frame constituting an motion image, comprising:

transforming means for performing discrete wavelet transformation on inputted image data, thereby generating transformation factors of a plurality of frequency sub-bands;

coding means for entropy-coding each of the above described sub-bands; and generating means for monitoring the amount of coded data of a predetermined sub-band in the above described sub-bands, and if the predetermined sub-band exceeds a predetermined code length, removing coded data included in an area where the sub-band exceeds the predetermined code length, and if the predetermined sub-band does not reach the above described predetermined code length, adding dummy data to the coded data of the above described sub-band, thereby generating fixed length coded data of the above described code length.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 1D is a block diagram showing a configuration of a voice data coding unit 105 in FIG. 1B;

FIG. 2 illustrates a configuration of frame data;

FIG. 3 illustrates separation of frame data;

FIG. 5 illustrates discrete wavelet transformation;

FIGS. 6A–6C illustrate sub-band division by discrete wavelet transformation;

FIG. 7 shows correspondence of each frequency component to a quantizing step;

FIG. 9 illustrates length fixation of quasi image coded data;

FIG. 20 shows correspondence of each frequency component to a quantizing step in the fifth to seventh, ninth and tenth embodiments of the present invention;

FIG. 27 shows length fixation of unit data in the sixth embodiment of the present invention;

FIG. 28B shows use of LL, HL1, LH1, HH1 and HL2 sub-bands for quick decoding in the sixth embodiment of the present invention;

FIG. 29 shows length fixation of unit data in the seventh embodiment of the present invention;

FIG. 30 shows use of a group of sub-bands of level 0 and level 1 for quick decoding in the seventh embodiment of the present invention;

FIG. 31 illustrates a layer arrangement in image coded data of the tenth embodiment of the present invention;

FIG. 42B is a block diagram showing a configuration of a frame data coding unit B4201 in the sixth embodiment;

DETAILED DESCRIPTION OF THE PREFERRED EMBODIMENTS

The present invention will be described below in accordance with preferred embodiments, referring to the accompanying drawings.

[First Embodiment]

Assume, in this embodiment, that an motion image to be encoded has a plurality of frames. The frame refers to one static image in the motion image and a voice rolled forth for a time period over which the static image is projected (display time). Thus, data of the frame (frame data) is comprised of data of one static image (image data) and data of voice (voice data). Also, the encoding of frame data to generate frame coded data means the encoding of each of image data and voice data to generate image coded data and voice coded data. Furthermore, reduction of sound quality is generally more noticeable than reduction of image quality.

Thus, for the encoding of voice data in the present invention, a reversible coding system to prevent any information loss due to coding is used.

Also, when one frame coded data is inputted in a device for decoding frame coded data (decoding device), the frame coded data is separated into image coded data and voice coded data. At this time, if the code length of image coded data varies for each frame coded data, the coding device retrieves the start of voice coded data in each frame and recognizes the code length of the image coded data before performing separation. This requires much time. Thus, quicker separation of image coded data and voice coded data is desired. This is achieved by fixation of the code length of image coded data (length fixation of image coded data) in all frame data.

Also, there may be cases where due to length fixation of image coded data, image coded data to be decoded is made to constitute a part of the inputted image coded data, and decoding of the part of image coded data (partial decoding) is performed.

In spite of partial decoding, however, the outline of the image obtained by decoding of the entire image coded data (full decoding) (full decoded image) needs to be displayed. This is achieved by performing recurrently discrete wavelet transformation on the low frequency sub-band of image data to generate image coded data during coding, performing partial decoding of the image coded data in succession in the order of from the lowest frequency sub-band to the highest frequency sub-band during decoding, and displaying the same.

Figure 1A:
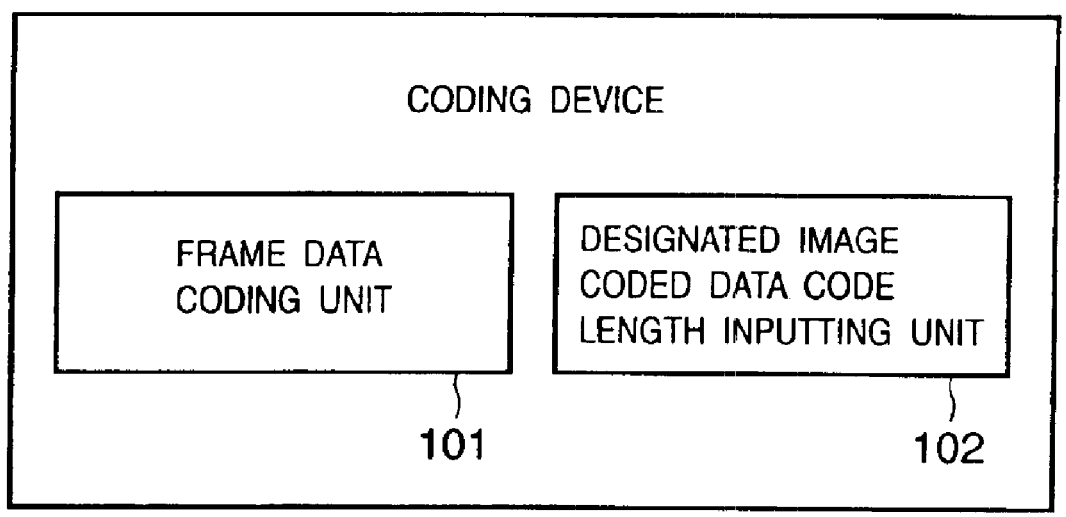
FIG. 1A is a block diagram showing a configuration of a coding device in a first embodiment of the present invention.

A coding device and coding method for generating image coded data satisfying the above described conditions, and generating frame coded data from the image coded data and voice coded data will be presented below, FIG. 1A is a block diagram showing a configuration of a coding device in this embodiment.

In this figure, reference numeral 101 denotes a frame data coding unit, and reference numeral 102 denotes a designated image coded data code length inputting unit.

The frame data coding unit 101 encodes frame data inputted in the coding device in this embodiment. Also, the code length of image coded data to be subjected to length fixation is inputted in the designated image coded data code length inputting unit 102. Furthermore this code length that is inputted shall be a code length such that the outline of the image (predetermined by the user) included in frame coded data can be displayed within a time period over which the decoding device plays back each frame data even for partial decoding.

Figure 1B:
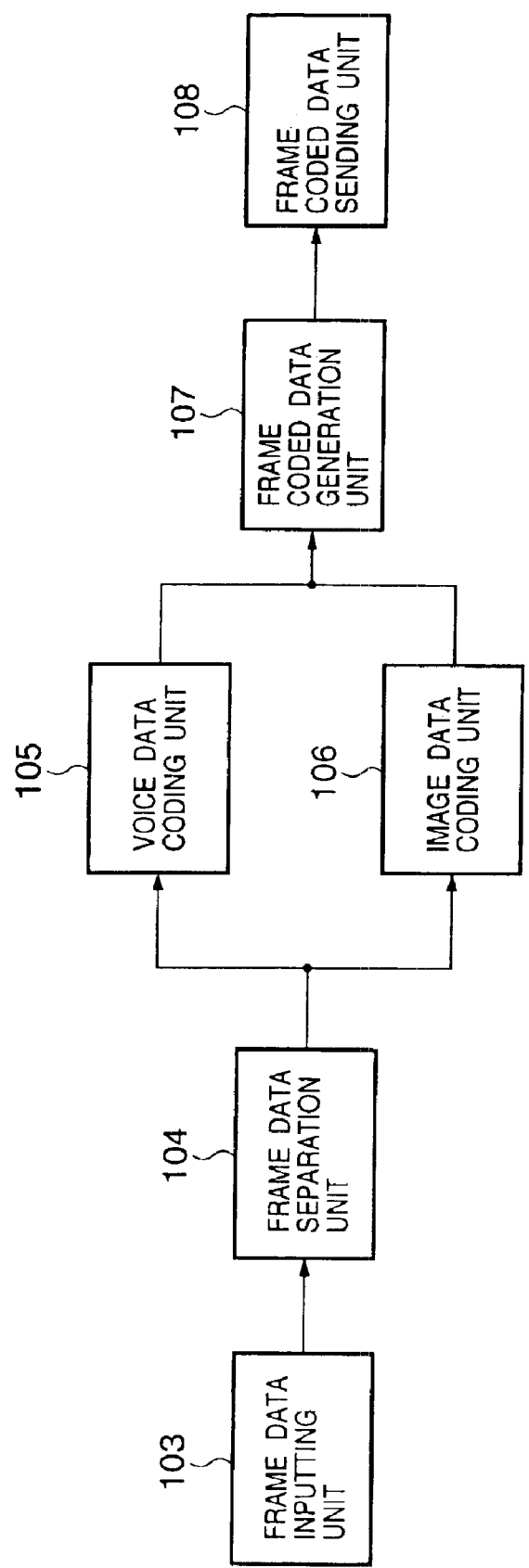
FIG. 1B is a block diagram showing a configuration of a frame data coding unit 101.
Figure 1C:
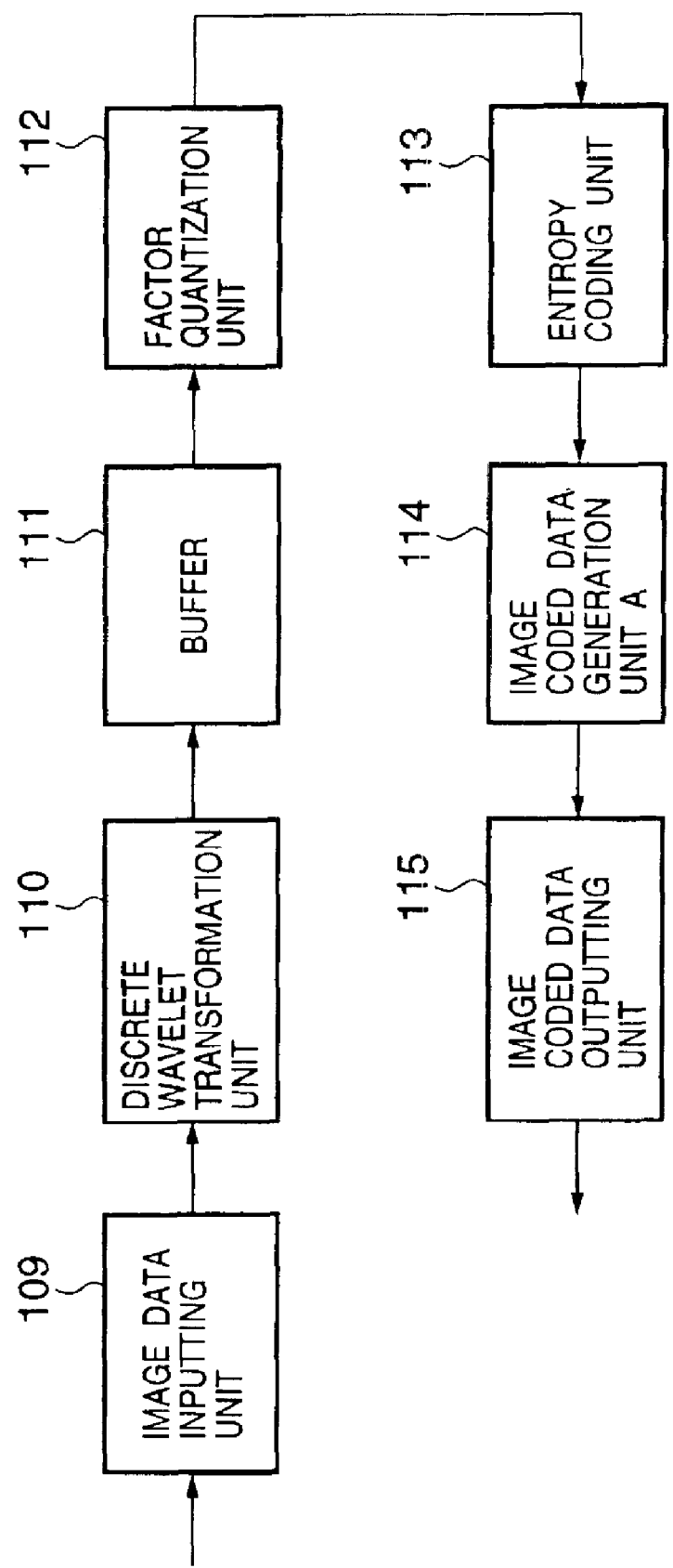
FIG. 1C is a block diagram showing a configuration of an image data coding unit 106 in FIG. 1B.
Figure 14:
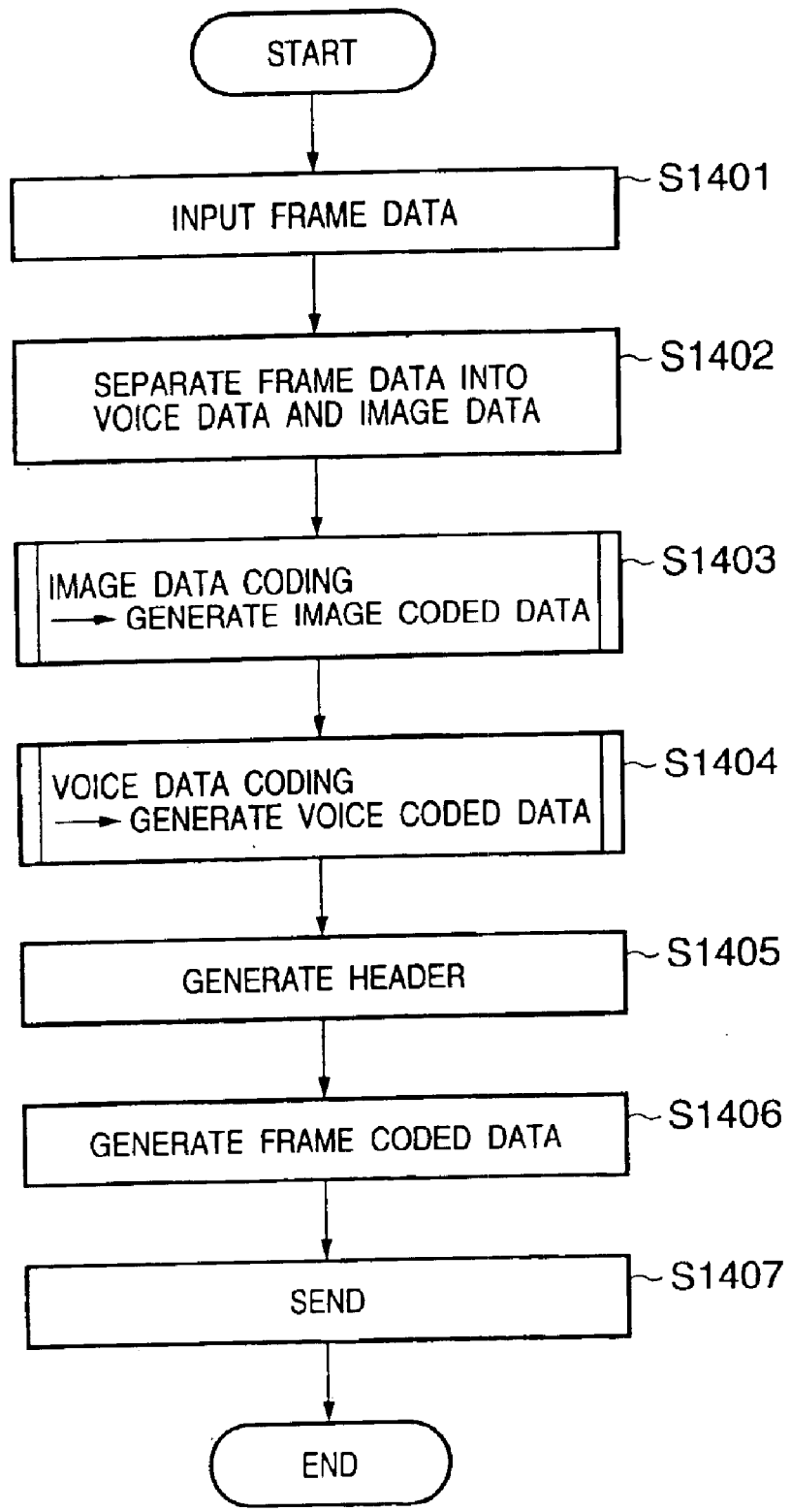
FIG. 14 is a flowchart of processing of generation of frame coded data in the frame data coding unit 101.

A configuration of the frame data coding unit 101 is shown in FIG. 1B, a configuration of an image data coding unit 106 in FIG. 1B is shown in FIG. 1C, and a configuration of a voice data coding unit 105 in FIG. 1B is shown in FIG. 1D. Also, a flowchart of processing of generation of frame coded data frame data coding unit 101 described later is shown in FIG. 14, and explanation thereof will be given using this figure.

First, frame data comprised of image data and voice data, as shown in FIG. 2, is inputted from a frame data inputting unit 103, and is outputted to a frame data separation unit 104 (Step S1401). For this frame data inputting unit 103, for example, image pickup equipment such as a digital video camera and a digital still camera, an image pickup device such as a CCD, an interface of the network line or the like is used. Also, the frame data inputting unit 103 may be a recording medium such as a RAM, a ROM, a hard disk, a CD-ROM or the like.

Furthermore, a plurality of frame data in an motion image that is to be encoded shall be inputted each by each in the frame data inputting unit 103. Also, processing after the frame data inputting unit 103 shall be performed independently for each frame data.

Frame data inputted in the frame data separation unit 104 is separated into voice data and image data, as shown in FIG. 3 (Step S1402). And, the voice data and the image data are inputted in the voice data coding unit 105 and the image data coding unit 106, respectively.

The image data inputted in the image data coding unit 106 is encoded by processing described later to become image coded data (Step S1403). And, the image coded data is inputted in a frame coded data generation unit 107.

The voice data inputted in the voice data coding unit 105 is encoded by a reversible coding system in each unit described later to become voice coded data (Step S1404). And, the voice coded data is inputted in the frame coded data generation unit 107.

Figure 4:
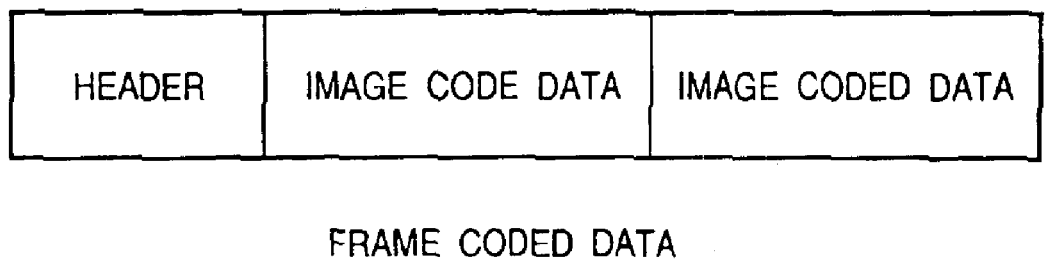
FIG. 4 shows a configuration of frame coded data.

When the voice coded data and the image coded data are inputted in the frame coded data generation unit 107, a header is generated (Step S1405). Furthermore, the size of image data inputted in an image inputting unit 109, information on types and the like showing whether the image data is a binary image or a multi-valued image, the length of the image coded data, the length of the voice coded data, a character string showing a coding device sending the data, a send date and so on are written in the header. If the image coded data includes an adjustment bit, the code length of the adjustment bit is also written. And, as shown in FIG. 4, frame coded data is generated from the header, the voice coded data and the image coded data (Step S1406).

In a frame coded data sending unit 108, the inputted frame coded data is sent to the outside (Step S1407). For this frame coded data sending unit 108, an interface such as a public line, a wireless line, a LAN or the like may be used.

Figure 15:
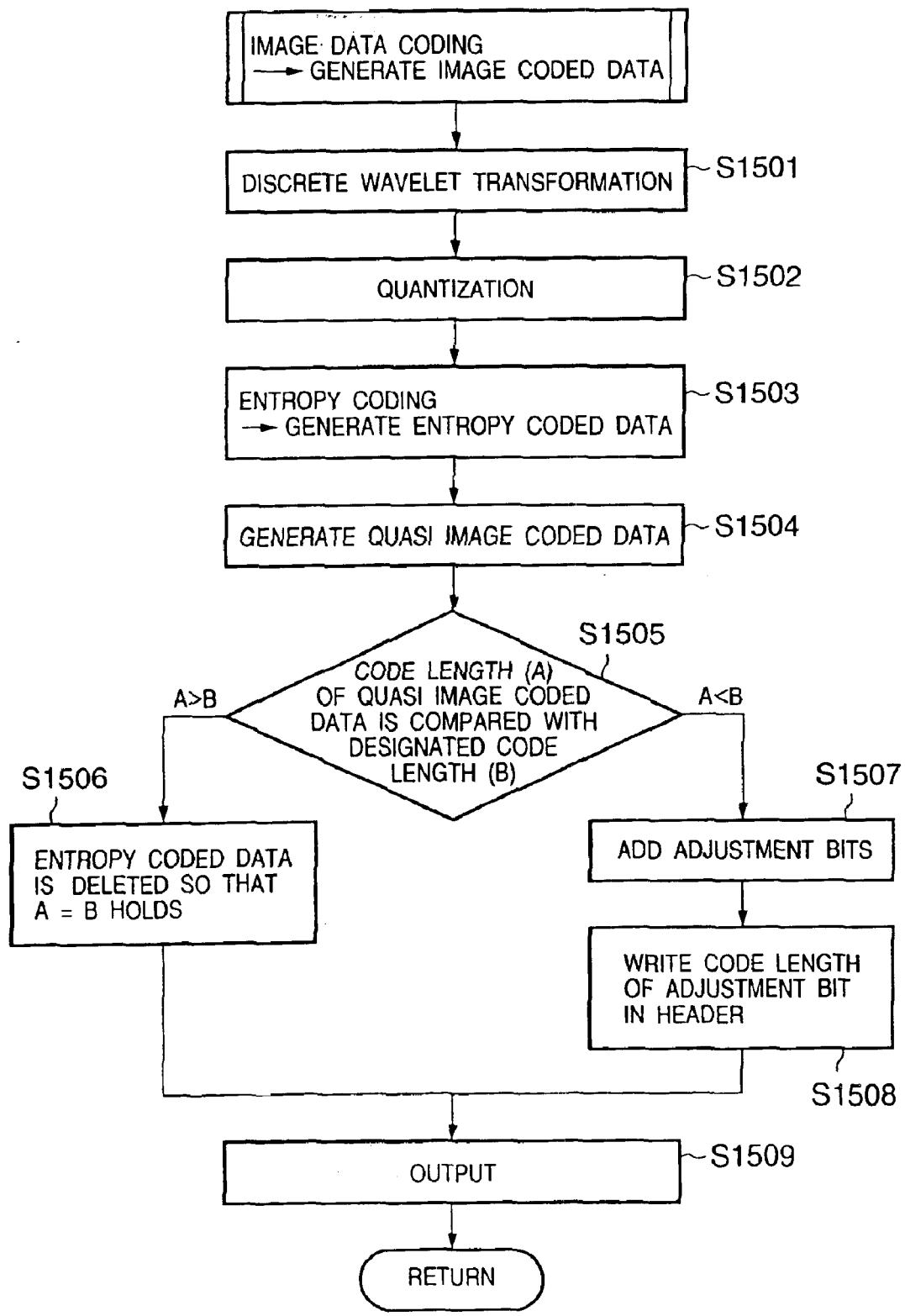
FIG. 15 is a flowchart of processing of coding of image data in the image data coding unit 106 in Step S1403.

A flowchart of processing of coding of image data in the image data coding unit 106 in Step S1403 is shown in FIG. 15, and the explanation thereof will be given below, using this figure.

Image data to be encoded in a frame in this embodiment shall be 8-bit monochrome image data. However, the data can also be applied when it is a monochrome image in which each pixel is expressed by the number of bits other than 8 bits like 4 bits, 10 bits and 12 bits, or multi-valued image data of color in which each color component (RGB/Lab/YCrCb) in each pixel is expressed by 8 bits. Also, the data can be applied when it is multi-valued information showing a state and the like of each pixel constituting the image, for example a multi-valued index value showing the color of each pixel. For application to those, each kind of multi-valued information may be defined as monochrome image data described later.

First, pixel data constituting image data to be encoded is inputted in raster scan order from the image data inputting unit 109, and is outputted to a discrete wavelet transformation unit 110. For this image data inputting unit 109, for example, image pickup equipment such as a scanner and a digital camera, an image pickup device such as a CCD, an interface of a network line or the like is used. Also, the image data inputting unit 109 may be a recording medium such as a RAM, a ROM, a hard disk, a CD-ROM or the like.

The discrete wavelet transformation unit 110 performs discrete wavelet transformation using data (reference pixel data) of plurality of pixels (reference pixels) in image data x(n) of one static image inputted from the image data inputting unit 109 (Step S1501).

Image data after discrete wavelet transformation (discrete wavelet transformation factor) is as follows $$r(n)=\text{floor}\{(x(2n)+x(2n+1))/2\};$$

$$d(n)=x(2n+2)-x(2n+3)+\text{floor}\{(-r(n)+r(n+2)+2)/4\},$$

where r(n) and d(n) are discrete wavelet transformation factor sequences, and r(n) and d(n) refer to low and high frequency sub-bands, respectively. Also, in the above equations, floor {X} represents a maximum value that does not exceed X. A view depicting this discrete wavelet transformation in schematic form is shown in FIG. 5.

Although this transformation equation is for one-dimensional data, this transformation is applied in lateral direction and then in vertical direction to perform two-dimensional transformation, thereby enabling division into four sub-bands of LL, HL, LH and HH as shown in FIG. 6A. Here, L represents a low frequency sub-band and H represents a high frequency sub-band. Then, in a similar way, the LL sub-band is divided into four sub-bands (FIG. 6B), and the LL sub-band of them is further divided into four sub-bands (FIG. 6C). Totally, ten sub-bands are prepared. The ten sub-bands are referred to as HH1, HL1, . . . , respectively, as shown in FIG. 6C. Here, the number in the name of each sub-band refers to a level of each sub-band. That is, sub-bands of level 1 are HL1, HH1 and LH1, and sub-bands of level 2 are HL2, HH2 and LH2. Furthermore, the LL sub-band is a sub-band of level 0. No subscript is assigned to the LL sub-band because there is only one LL sub-band. Also, the decoded image obtained by decoding sub-bands of level 0 to level n is called a decoded image of level n. For the decoded image, the higher its level, the higher its resolution. That is, for image data subjected to discrete wavelet transformation, the outline of the original image can be displayed by partial decoding.

The transformation factors of ten sub-bands are stored in a buffer 111 on a temporary basis, and are outputted to a factor quantization unit 112 in the order of LL, HL1, LH1, HH1, HL2, LH2, HH2, HL3, LH3 and HH3, namely in the order of from the lowest level sub-band to the highest level sub-band.

The factor quantization unit 112 quantizes the transformation factor of each sub-band outputted from the buffer 111 by a quantizing step determined for each frequency component, and outputs a value after quantization (factor quantization value) to an entropy coding unit 113 (Step S1502). When the factor value is X, and the value of the quantizing step for the frequency component to which this factor belongs is q, the factor value after quantization Q(X) is determined by the following equation.

$$Q(X)=\text{floor}\{(X/q)+0.5\}$$

Correspondence of each frequency component to a quantizing step in this embodiment is shown in FIG. 7. As shown in this figure, a larger quantizing step is given to a sub-band of higher level. Furthermore, the quantizing step for each sub-band is previously stored in a memory such as a RAM and ROM (not shown). And, all the transformation factors in one sub-band are quantized, followed by outputting those factor quantization values to the entropy coding unit 113.

Figure 8:
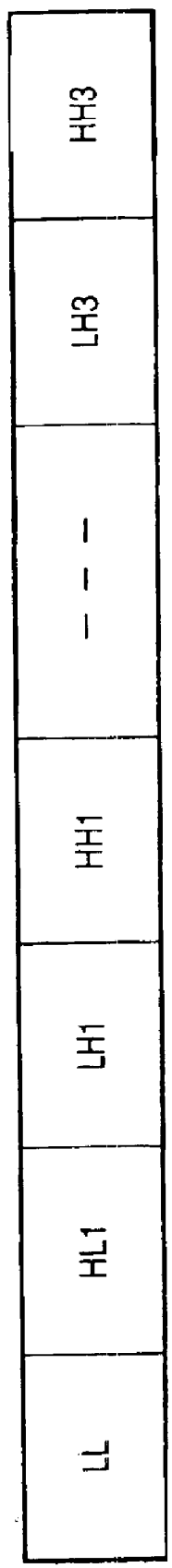
FIG. 8 shows a configuration of quasi image coded data.

The entropy coding unit 113 entropy-encodes the inputted factor quantization value by arithmetic coding to generate an entropy coded value (Step S1503). The entropy coded value is outputted to an image coded data generation unit A114. The entropy coded value inputted in the image coded data generation unit A114 is arranged in the unit of sub-bands as shown in FIG. 8, and quasi image coded data is generated (Step S1504).

Also, the generated quasi image coded data is subjected to length fixation to form image coded data as described below.

Figure 10:
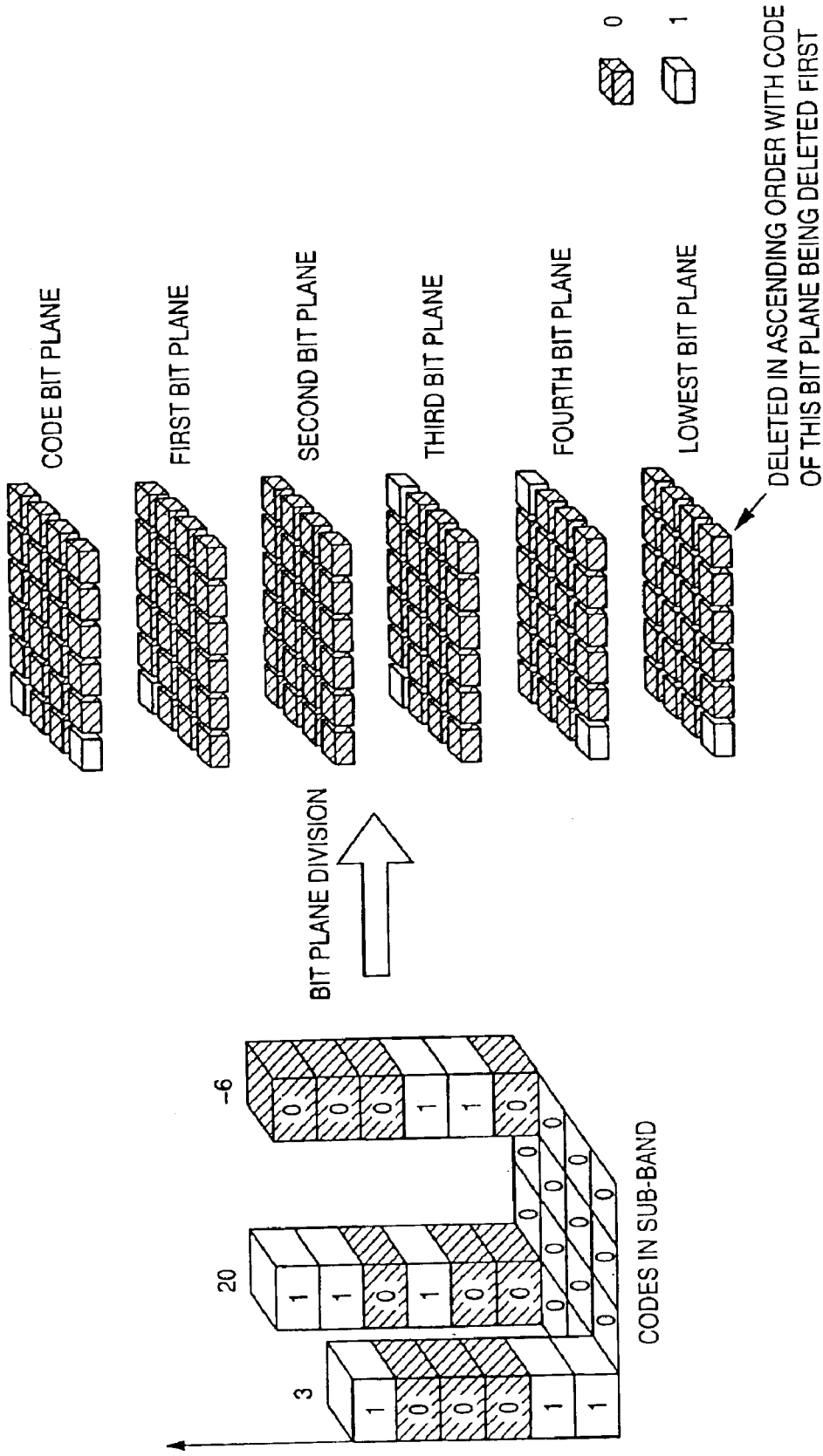
FIG. 10 illustrates length fixation of quasi image coded data.

If the code length of quasi image coded data is larger than the code length designated by the designated image coded data code length inputting unit 102 (Step S1505), in order for the data to have a designated code length, entropy coded values are deleted in the unit of sub-bands in the order of resolution level with the highest level the first, or in the same level in the order of HH, LH and HL, namely from the rearmost in the quasi image coded data as shown in FIG. 9 (Step S1506). In this deletion of the entropy coded value in the unit of sub-bands, bit planes comprised of respective digits of the code in the sub-band as shown in FIG. 10 are defined, and bit planes are deleted in ascending order with the lowest bit plane being deleted first.

Figure 11:
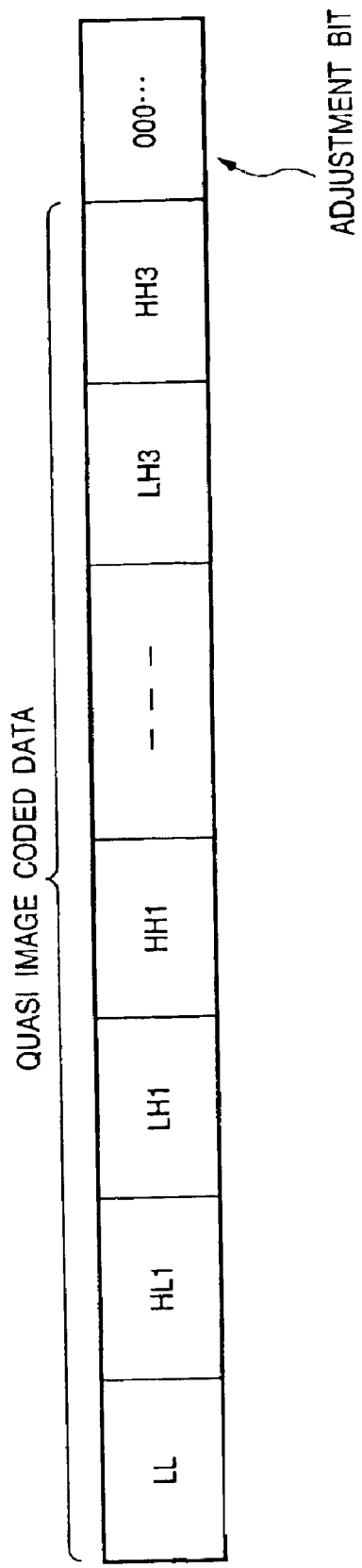
FIG. 11 illustrates length fixation of quasi image coded data.

On the other hand, if the code length of quasi image coded data is smaller than the designated code length (Step S1505), the adjustment bit comprised of bits "0" is added to the rear of the HH3 sub-band as shown in FIG. 11. (Step S1507). When the quasi image coded data is decoded, the no adjustment bit is decoded. Thus, in order that the decoding device can correctly decode the image coded data with adjustment bits added thereto, the code length of this adjustment bit is written in the header, as described above (Step S1508).

The image coded data generated as described above is outputted from an image coded data outputting unit 115 to the frame coded data generation unit 107 (Step S1509).

Figure 16:
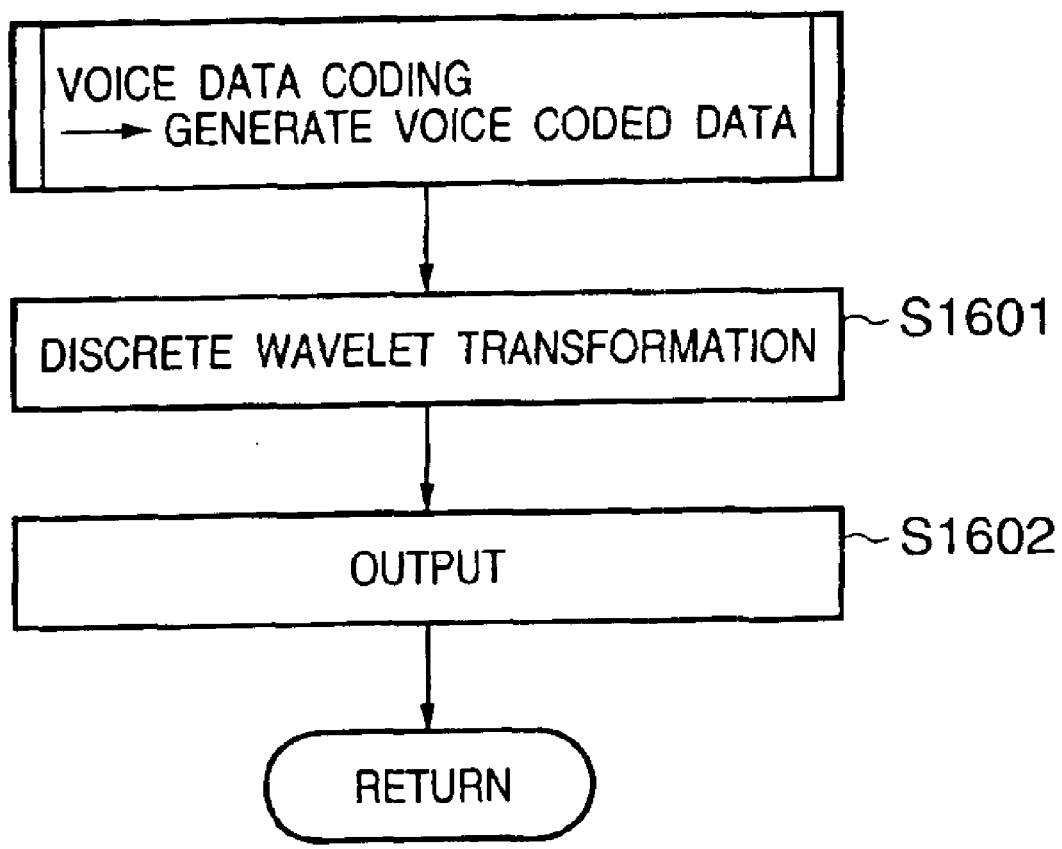
FIG. 16 is a flowchart of processing of coding of voice data in the voice data coding unit 105 in Step S1404.

On the other hand, a flowchart of processing of encoding voice data in the voice data coding unit 105 in Step S1404 is shown in FIG. 16, and explanation thereof will be given using this figure.

Voice data to be encoded in the frame in this embodiment is inputted from the voice data inputting unit 116, and is outputted to a discrete wavelet transformation unit B117.

The discrete wavelet transformation unit B117 performs discrete wavelet transformation on voice data inputted from the voice data inputting unit 116 to generate voice coded data (Step S1601).

The voice coded data generated by the discrete wavelet transformation unit B117 is outputted to a voice coded data outputting unit 118, and is outputted from the voice coded data outputting unit 118 to the frame coded data generation unit 107 (Step S1602).

Also, the program code complying with the above described flowchart is stored in a memory such as a RAM and ROM, and is read out and executed by the CPU.

As described above, in the coding device and coding method in this embodiment, when image data in frame data is encoded, discrete wavelet transformation is used to generate image coded data, and image coded data in each frame coded data is subjected to length fixation. As a result, the outline of the original image is displayed within a time period over which one frame data is played back in spite of partial decoding of image coded data. Also, image decoded data is subjected to length fixation, whereby time required for decoding is reduced, thus making it possible to start the decoding of voice coded data immediately after partial decoding.

[Second Embodiment]

When frame coded data is decoded and the decoded image data is displayed, it may be required that the decoding and display should be performed more quickly than at least the decoding and display of image data in the first embodiment, for only the outline of the image of each frame. In this case, only the LL sub-band of each image coded data may be decoded and displayed. For decoding and displaying the LL sub-band of each image coded data more quickly than the case of the first embodiment, the LL sub-band of each image coded data should be fetched in a predetermined buffer at one time without excess and deficiency. That will be achieved if the LL sub-band in each image coded data is length-fixed to a predetermined code length. In this embodiment, a coding device and coding method for encoding each image data so that the component of the LL sub-band of each image coded data is length-fixed will be presented.

Figure 12:
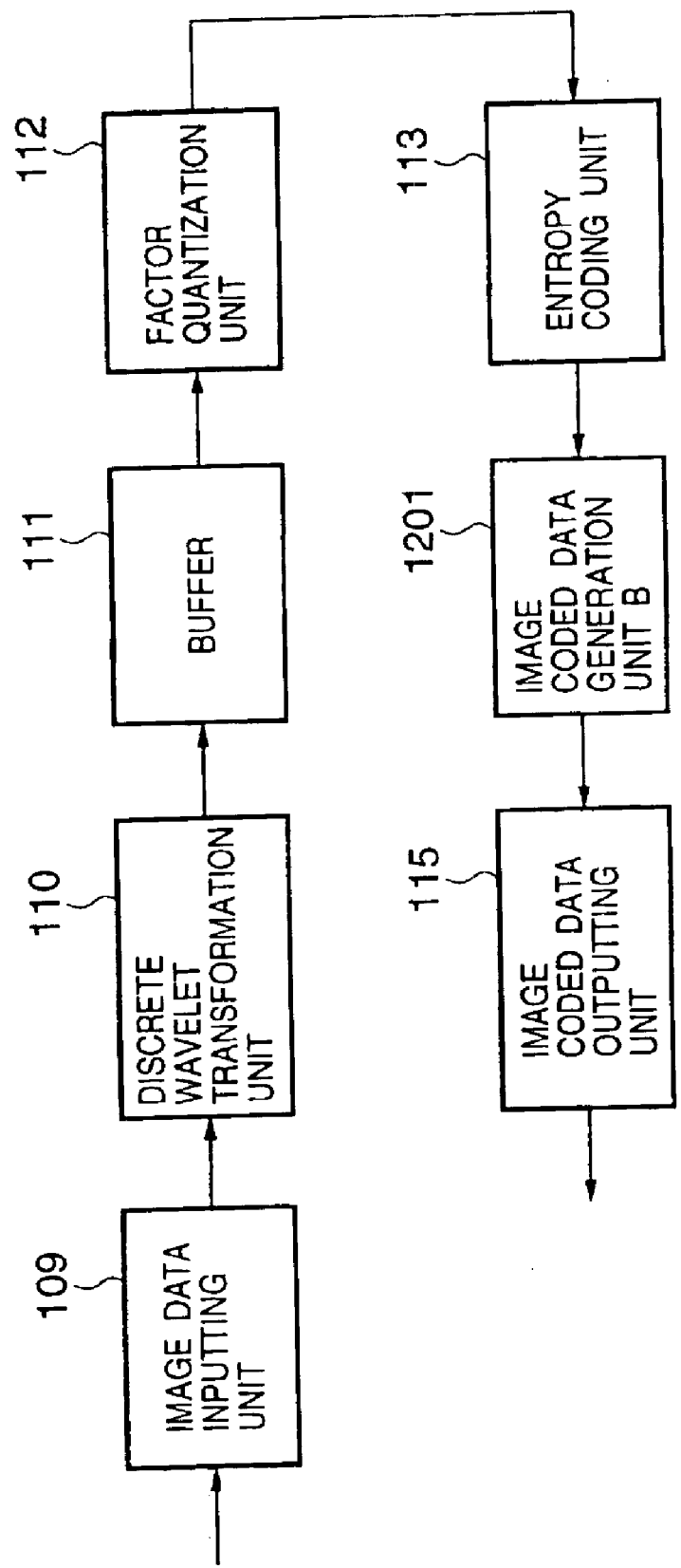
FIG. 12 is a block diagram showing a configuration of a coding device of a second embodiment of the present invention.

A block diagram showing a configuration of the coding device in this embodiment is shown in FIG. 12. The coding device in this embodiment has replaced with an image coded data generation unit B1201 the image coded data generation unit A114 constituting the image data coding unit 106 shown in FIG. 1C in the first embodiment. All the units of the coding device and operations thereof other than the image coded data generation unit in this embodiment are same as those of the coding device in the first embodiment.

The entropy coded value generated by the entropy coding unit 113 based on the factor quantized value inputted from the factor quantization unit 112 is inputted in the image coded data generation unit B1201 as in the case of the first embodiment, and quasi image coded data as shown in FIG. 8 is generated as in the case of the first embodiment.

If the code length of the LL sub-band in quasi image coded data is larger than the code length designated by the designated image coded data code length inputting unit 102, bits are deleted in ascending order, with the bit in the lowest bit plane of bit planes constituting the LL sub-band being deleted first.

On the other hand, if the code length of the LL sub-band in quasi image coded data is smaller than the code length designated by the designated image coded data code length inputting unit 102, the adjustment bit described in the first embodiment is added to the rear of the LL sub-band. As a result, the code length of LL sub-bands included in all image coded data is all equalized (to the code length designated by the designated image coded data code length inputting unit 102), resulting in length fixation.

In this way, image coded data is generated, and is inputted in the image coded data outputting unit 115. And, processing thereafter is same as that of the first embodiment.

Furthermore, the LL sub-band designated by the designated image coded data code length inputting unit 102 shall be a code length such that decoding and displaying of the data can be performed more quickly than at least the decoding and displaying of image data in the first embodiment for only the outline of the image of each frame.

Furthermore, the flowcharts of generation of frame coded data and voice coded data in this embodiment are same as those in FIGS. 14 and 16, respectively, but the flowchart of generation of image coded data is a flowchart with the following changes made to processing in each step in FIG. 15.

First, the processing in Step S1505 is considered as processing of comparing the designated code length to the code length of the LL sub-band. And, if the code length of the LL sub-band is larger than the designated code length, the processing in Step S1506 is considered as processing of deleting bits in ascending order, with the bit in the lowest bit plane of bit planes constituting the LL sub-band being deleted first.

On the other hand, if the code length of the LL sub-band is smaller than the designated code length, the processing in Step S1507 is considered as processing of adding the adjustment bit to the LL sub-band.

Also, the program code complying with the above described flowchart is stored in a memory such as a RAM and ROM, and is read and executed by the CPU.

Furthermore, in this embodiment, the case where length fixation of the LL sub-band is performed has been described, but the present invention is not limited thereto. For example, four sub-bands of LL, LH1, HL1 and HH1 are considered as the low frequency sub-band and the total length of these four sub-bands is made to be a fixed length by the above described method, whereby the object of this embodiment is also achieved.

As described above, the coding device and coding method in the second embodiment performs length fixation of only the LL sub-band in each image coded data, thereby making it possible to perform the decoding and display for only the outline of the image of each frame (image corresponding to the low frequency component) more quickly than the decoding and displaying of image data in the first embodiment.

[Third Embodiment]

In a server/client model, the server transmits data that the client demands. In this transmission, due to difference in data transfer capacity of the line connecting the server to the client and so on, the amount of data that each client demands from the server is varied. Therefore, a part or all of the data that the server accumulates in accordance with the amount of data that the client demands is fetched. Furthermore, if a part of data is fetched, the data must be fetched in the unit of data (unit data) such that significant data is generated after decoding. For example, image coded data subjected to discrete wavelet transformation may be fetched in the unit of sub-band.

Also, when unit data is fetched, importance may be placed on the speed at which the data is fetched. For example, if each sub-band is length-fixed to a predetermined code length (namely, if sub-bands with same types/same frequencies belonging to each frame are coded data of same length), image coded data subjected to discrete wavelet transformation can be fetched more quickly than the case where no length fixation is made.

In this embodiment, a coding device and coding method will be shown in which image data in frame data is divided into a plurality of sub-bands through discrete wavelet transformation and each sub-band is length-fixed (namely, at least sub-bands with same types/same frequencies belonging to each frame are length-fixed) so that the server can fetch image data in the sub-band unit at high speed.

Figure 13:
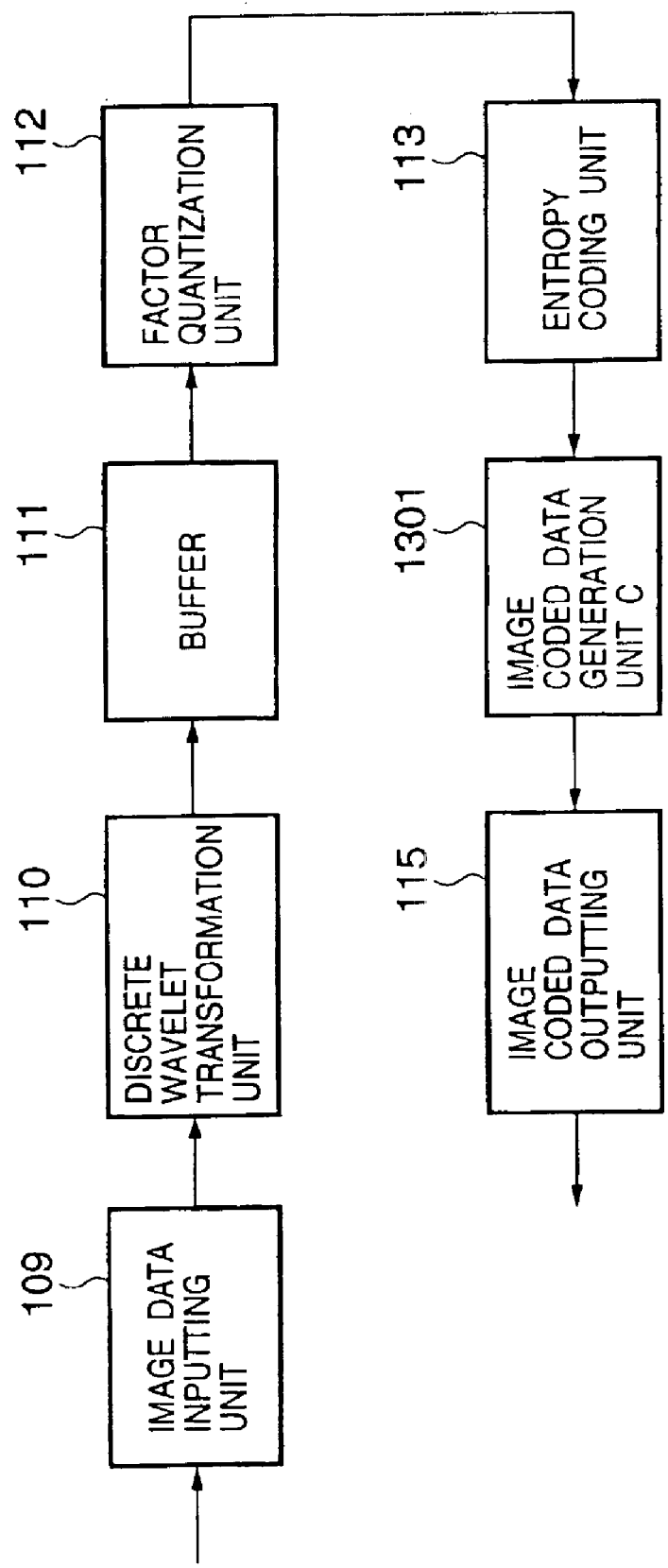
FIG. 13 is a block diagram showing a configuration of a coding device of a third embodiment of the present invention.

A configuration of the coding device in this embodiment is shown in FIG. 13. The coding device in this embodiment has replaced with an image coded data generation unit C1301 the image coded data generation unit A114 constituting the image data coding unit 106 shown in FIG. 1C in the first embodiment. All the units of the coding device and operations thereof other than the image coded data generation unit in this embodiment are same as those of the coding device in the first embodiment.

The entropy coded value generated by the entropy coding unit 113 based on the factor quantized value inputted from the factor quantization unit 112 is inputted in an image coded data generation unit C1201 as in the case of the first embodiment, and quasi image coded data as shown in FIG. 8 is generated as in the case of the first embodiment.

If the code length of each sub-band in quasi image coded data is larger than the code length designated for that kind of sub-bands, it is limited to the code length predetermined for that kind of sub-bands by deleting bits in ascending order, with the bit in the lowest bit plane of bit planes constituting each sub-band being deleted first.

Specifically, the code length is predetermined for each of LL, HL1, LH1, HH1, . . . , LH3, HH3, for example. In other words, a limitation is imposed in such a manner that LLs, LH1s, . . . of certain two frames (or more) are expressed by coded data of same code lengths, respectively.

On the other hand, if the code length of each sub-band in quasi image coded data is smaller than the designated code length, the adjustment bit is added to the rear of each sub-band. Consequently, the code length of respective sub-bands of same kinds in a plurality of frames is all equalized (to the code length designated by the designated image coded data code length inputting unit 102), resulting in length fixation. In this way, image coded data is generated, and is inputted in the image coded data outputting unit 115. And, each processing thereafter is same as that of the first embodiment.

Furthermore, the flowcharts of generation of frame coded data and voice coded data in this embodiment are same as those in FIGS. 14 and 16, respectively, but the flowchart of generation of image coded data is a flowchart with the following changes made to processing in each step in FIG. 15.

First, the processing in Step S1505 is considered as processing of comparing the designated code length to the code length of each sub-band in quasi image coded data. And, if the code length of each sub-band in quasi image coded data is larger than the designated code length, the processing in Step S1506 is considered as processing of deleting bits in ascending order, with the bit in the lowest bit plane of bit planes constituting each sub-band being deleted first.

On the other hand, if the code length of each sub-band in quasi image coded data is smaller than the designated code length, the processing in Step S1507 is considered as processing of adding the adjustment bit to each sub-band.

Also, the program code complying with the above described flowchart is stored in a memory such as a RAM and ROM, and is read and executed by the CPU.

As described above, in the coding device and coding method in the third embodiment, the code length of each sub-band of image coded data included in frame coded data is all equalized and length-fixed at least in the same kind of sub-bands, whereby, for example, the server can fetch data in the unit of sub-bands more speedily than the case where no length fixation is made.

Furthermore, since the above described sub-band has a different number of factors (size) depending on the frequency level, explanation has been given on the premise that the code length at least in the same kind of sub-bands is equalized, but the present invention is not limited thereto. In other words, for four kinds of sub-bands of LL, HL1, LH1 and HH1 in all frames, such coded data as identical in code length to one another may be used for expression. In the same way, for three kinds of sub-bands of HL2, LH2 and HH2, coded data such that their code lengths are equalized may be used for expression. In the same way, for three kinds of sub-bands of HL3, LH3 and HH3, coded data such that their code lengths are equalized may be used for expression. In the present invention, since being able to understand where data of each sub-band exists for each of coded data of a plurality of frames is enough, the object of the present invention is achieved as long as at least the "boundary" of coded data of each sub-band can be recognized.

[Fourth Embodiment]

When frame coded data is decoded, it may be required that coded data (a plurality of sub-bands) expressing the image of each frame be fetched in the unit of resolution level to display the image of designated resolution at high speed. That is, if making considerations in the light of the state of the sub-band after wavelet transformation, the above described resolution level can be understood as, for example, level 0=<LL>, level 1=<HL1, LH1, HH1>, level 2=<HL2, LH2, HH2>, level 3=<HL3, LH3, HH3>.

For decoding the image of designated resolution at high speed, each image coded data should be fetched in the unit of level in a work buffer at one time without excess and deficiency. That will be achieved if image coded data expressing the image of each frame is length-fixed in the unit of level. For this embodiment, a coding device and coding method for encoding each image data so that each image coded data is length-fixed in the unit of level will be presented.

Figure 17:
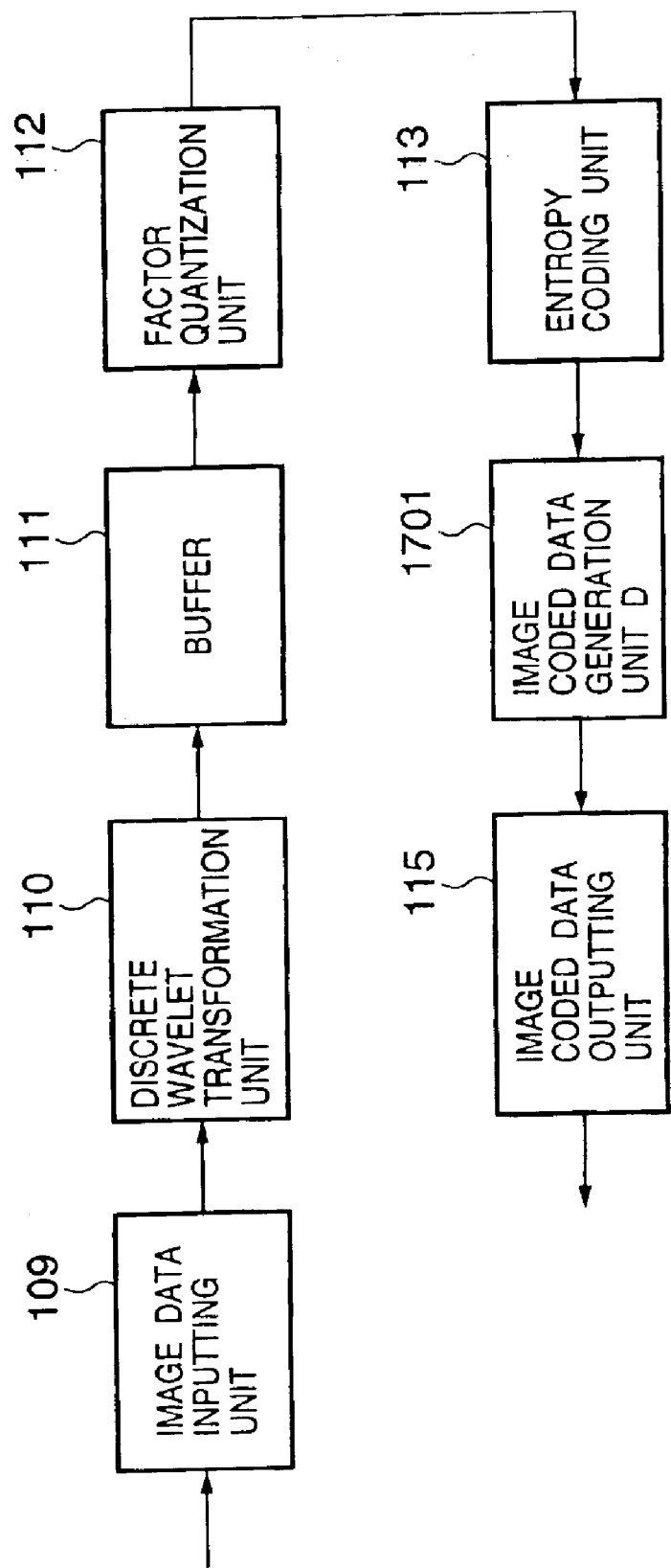
FIG. 17 is a block diagram showing a configuration of a coding device of a fourth embodiment of the present invention.

A block diagram showing the configuration of the coding device in this embodiment is shown in FIG. 17. The coding device in this embodiment has replaced with an image coded data generation unit D1701 the image coded data generation unit A114 constituting the image data coding unit 106 in the first embodiment shown in FIG. 1C. All the units of the coding device and operations thereof other than the image coded data generation unit in this embodiment are same as those of the coding device in the first embodiment.

The entropy coded value generated by the entropy coding unit 113 based on the factor quantized value inputted from the factor quantization unit 112 is inputted in the image coded data generation unit D1701 as in the case of the first embodiment, and quasi image coded data as shown in FIG. 8 is generated as in the case of the first embodiment.

For this embodiment, if the code length of each level in quasi image coded data is larger than the code length designated in advance for each level by designated image coded data code length inputting unit 102, coded data is deleted/reduced in the order of HHn, LHn and HLn sub-bands. Furthermore, in deletion/reduction of coded data of these sub-bands, bit planes are deleted in ascending order with the lowest bit plane being deleted first (in the case of level 1 or higher).

In the same way, when coded data of the sub-band LL of the lowest frequency component is deleted/reduced (in the case of level 0), bit planes are deleted in ascending order with the lowest bit plane being deleted first.

On the other hand, if the code length of each level in the quasi image coded data is smaller than the code length designated by the designated image coded data code length inputting unit 102, the adjustment bit described in the first embodiment is added to the rear of the HH sub-band of each level, for level 1. Furthermore, for level 0, the adjustment bit is added to the rear of the LL sub-band as a matter of course. Consequently, the code length of each level unit included in image coded data of all frames is all equalized (to the code length designated for each level by the designated image coded data code length inputting unit 102), resulting in length fixation.

As described above, image coded data is generated, and is inputted in the image coded data outputting unit 115. And, each processing thereafter is same as that of the first embodiment.

Figure 18:
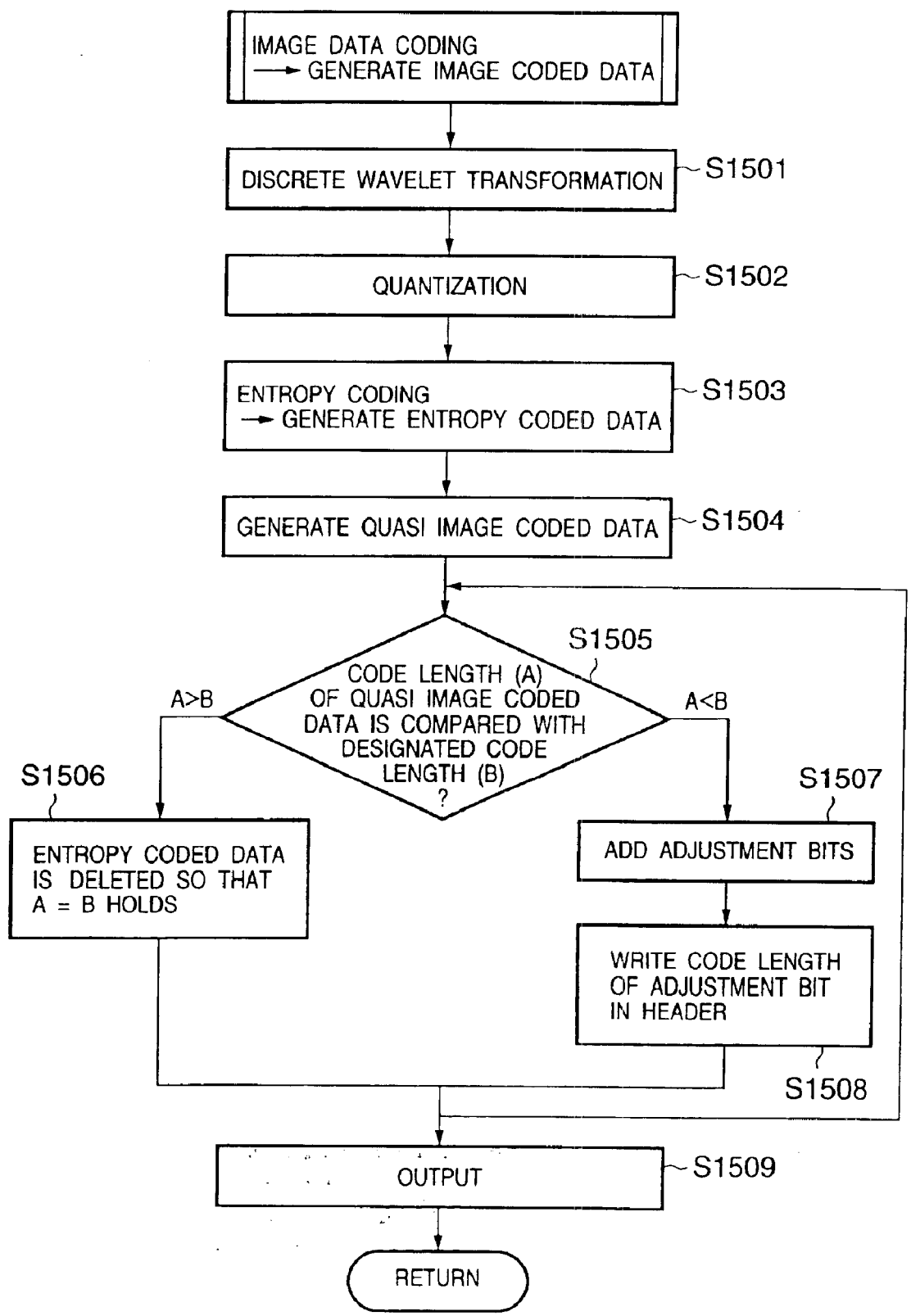
FIG. 18 is a flowchart of generation of image coded data in the fourth embodiment of the present invention.

Furthermore, the flowcharts of generation of frame coded data and voice coded data in this embodiment are same as those in FIGS. 14 and 16, respectively, but the flowchart of generation of image coded data is a flowchart in FIG. 18 with the following changes made to processing in FIG. 15.

First, the processing in Step S1505 is considered as processing of comparing the designated code length to the code length of each level. And, if the code length of each sub-band is larger than the designated code length, the processing in Step S1506 is considered as processing of deleting/reducing bits in the order of HH, LH and HL (only LL in the case of level 0) in each level, and in the sub-band, deleting/reducing bits in the lowest bit plane first.

On the other hand, if the code length of each level is smaller than the designated code length, the processing in Step S1507 is considered as processing of adding the adjustment bit to the rear of the HH sub-band (to the rear of the LL sub-band in the case of level 0).

Furthermore, in Steps S1505, S1506, S1507 and S1508, repetition processing of the level number of times is performed.

Also, the program code complying with the above described flowchart is stored in a memory such as a ROM and RAM, and is read and executed by the CPU.

As described above, in the coding device and coding method in this embodiment, the code length is length-fixed in the unit of each level in image coded data expressing each frame, there by making it possible to display each frame with designated resolution at high speed.

[Alterations of the Above Embodiments]

In all the embodiments, the leading address of each frame data may be written in the header for performing the partial decoding of each frame data at high speed.

Also, in the second embodiment, the leading address of each frame coded data may be written in the header after the partial decoding of each image coded data, for decoding voice coded data more quickly.

[Fifth Embodiment]

In this embodiment, as in the case of the second embodiment, the case where quick playback (playback of the motion image at frame rates of one to n-fold speeds) is performed efficiently by the length fixation of coded data of the LL sub-band corresponding to the low frequency component in each frame will be described.

In some cases, a frame decoding device performs playback at the speed any several times as high as a normal playback speed (arbitrary multiple speed playback). At this time, if coded data required for playback is length-fixed among a plurality of frames, the arbitrary multiple speed playback can be performed efficiently. This is because the frame decoding device needs to obtain the leading address and code length of the coded data from the header for taking out the coded data in a work area, if the coded data is not length-fixed. If the coded data is length-fixed, however, the coded data can be fetched in the work area if only the leading address of the coded data is obtained.

Thus, in this embodiment, a frame coding device performing the length fixation of coded data required for efficiently carrying out arbitrary multiple speed playback is provided, and a frame decoding device for efficiently carrying out arbitrary multiple speed playback of the frame coded data generated by the frame coding device is provided.

Furthermore, in this embodiment, data that is length-fixed among frames (referred to as unit data) is considered as the LL sub-band. Furthermore, the concept of the fixed length is similar to that of the second embodiment.

<Frame Coding Device>

Figure 36A:
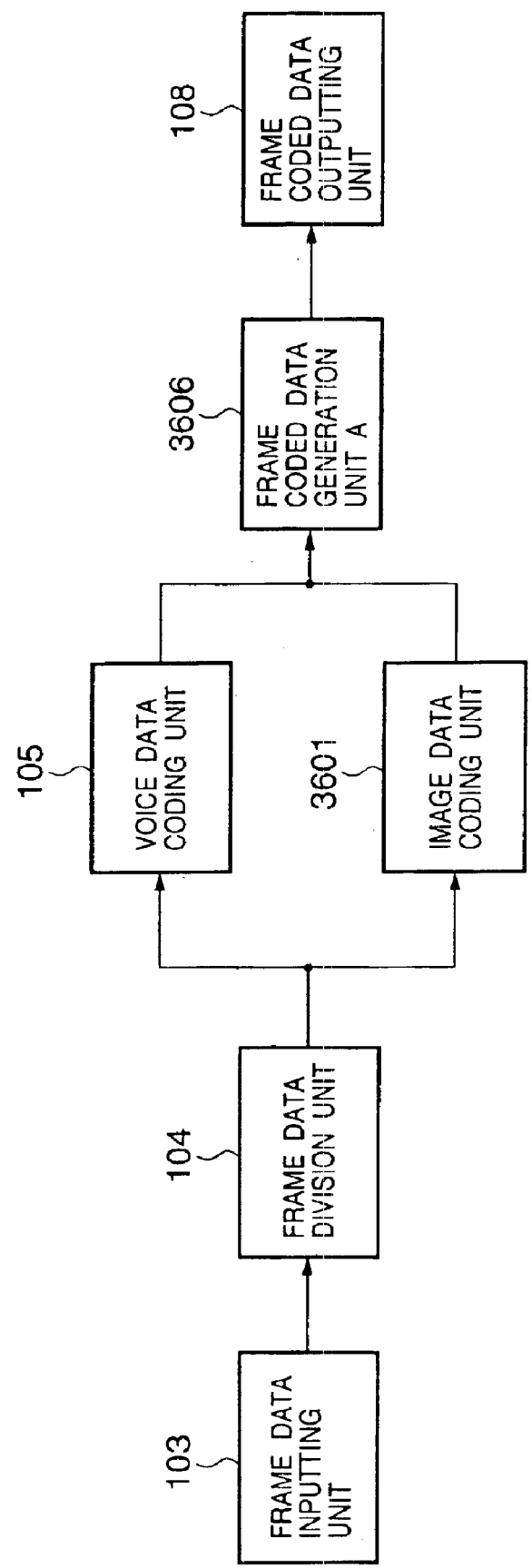
FIG. 36A is a block diagram showing a configuration of a frame data coding unit A3607 in the fifth embodiment.
Figure 36B:
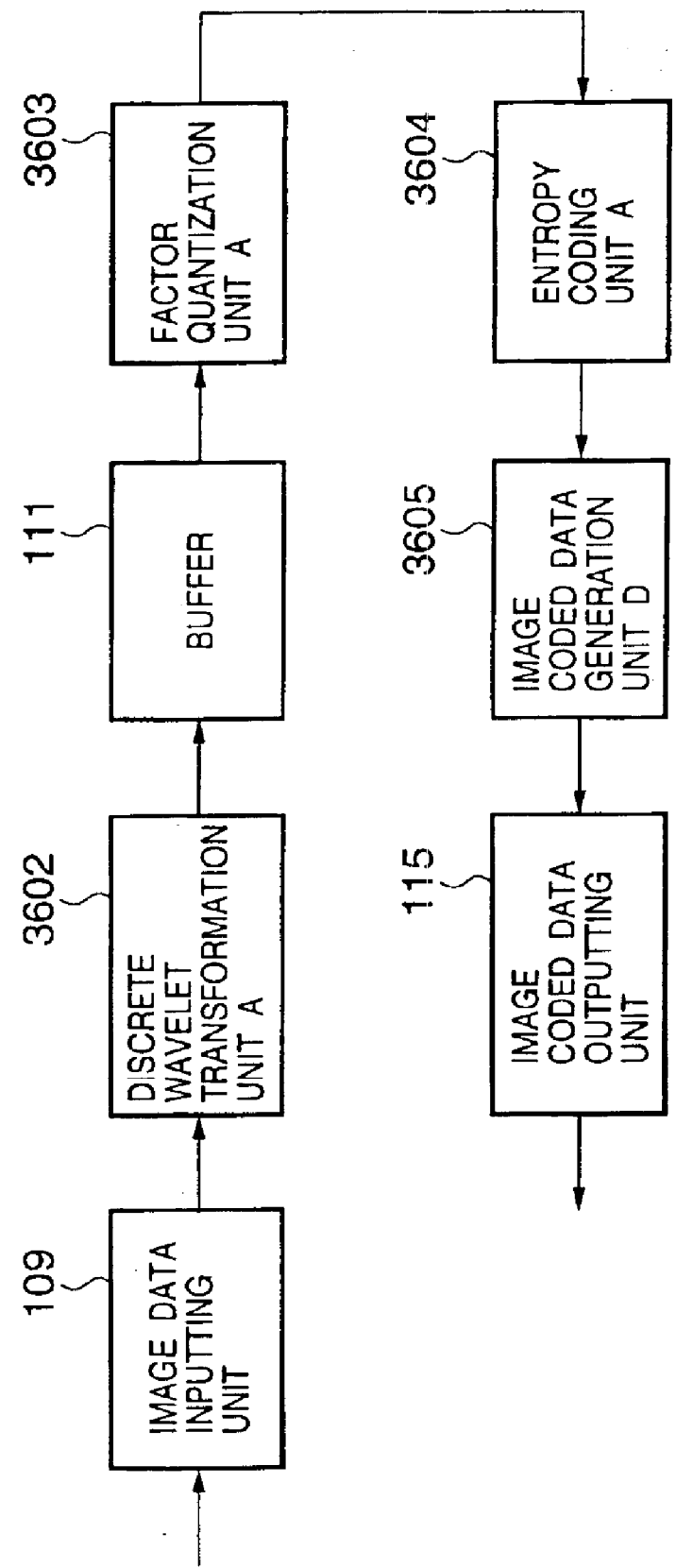
FIG. 36B is a block diagram showing a configuration of an image data coding unit A3601 in the fifth embodiment.
Figure 36C:
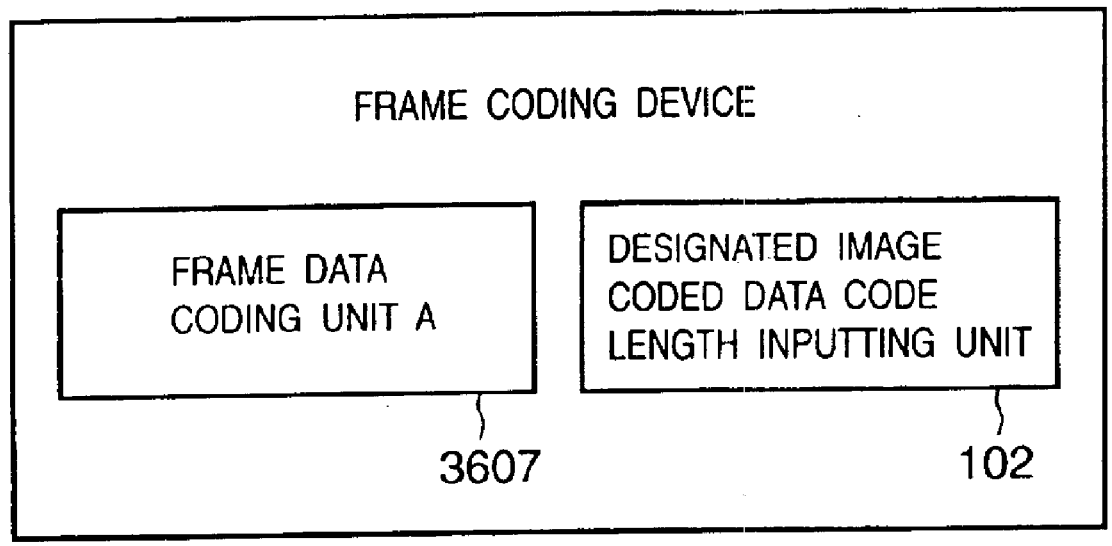
FIG. 36C is a block diagram showing a configuration of a frame coding device in the fifth embodiment.

A block diagram showing the configuration of the frame coding device in this embodiment is shown in FIG. 36C.

The frame coding device in this embodiment has replaced with a frame data coding unit A3607 the frame data coding unit 101 in the coding device of the first embodiment shown in FIG. 1A. The reason why this replacement is applied is that unit data is the whole image coded data in the first embodiment, but unit data in this embodiment is the LL sub-band. Operations in the designated image coded data code length inputting unit 102 are identical to those of the same processing unit in the first embodiment.

Furthermore, in this embodiment, the code length of the above described unit data is called a target code length.

FIG. 36A is a graphic view of a configuration of a frame data coding unit A in a frame coding device in this embodiment. In this figure, reference numerals 103, 104, 105, 3601, 3606 and 108 denote a frame data inputting unit, a frame data division unit, a voice data coding unit, an image data coding unit A, a frame coded data generation unit A and a frame coded data outputting unit, respectively.

Contents of processing in the frame data coding unit A in this embodiment are similar to those in the frame data coding unit 101 in the first embodiment, except for the image data coding unit 3601 and the frame coded data generation unit A 3606.

Furthermore, a difference in processing between the frame coded data generation unit A3606 in this embodiment and the frame coded data generation unit 107 in the first embodiment lies in different information written in the header by these generation units. That is, the frame coded data generation unit A3606 in this embodiment writes not only information written in the header by the frame coded data generation unit 107 but also information showing unit data and the target code length in the header in the first embodiment.

Processing in the image data coding unit A3601 will be described below.

FIG. 36B shows in diagrammatic form the specific configuration of the image data coding unit A3601 in FIG. 36A. In this figure, reference numerals 109, 3602, 111, 3603, 3604, 3605 and 115 denote an image data inputting unit, a discrete wavelet transformation unit A, a buffer, a factor quantization unit A, an entropy coding unit A, an image coded data generation unit D and an image coded data outputting unit, respectively. The image data coding unit A3601 in this embodiment has the discrete wavelet transformation unit 110, the factor quantization unit 112, the entropy coding unit 113 and the image coded data generation unit A114 in the above described FIG. 1C with the discrete wavelet transformation unit A3602, the factor quantization unit A3603, the entropy coding unit A3604 and the image coded data generation unit D3605, respectively. Each portion of the image data coding unit A3601 will be described below with emphasis on portions characteristic of this embodiment.

Figure 19A:
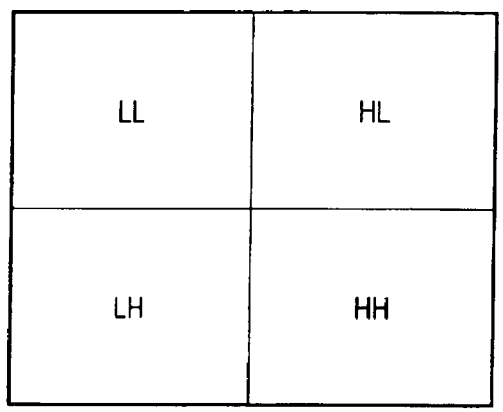
FIGS. 19A and 19B illustrate sub-band division by discrete wavelet transformation in fifth to seventh, ninth and tenth embodiments.
Figure 19B:
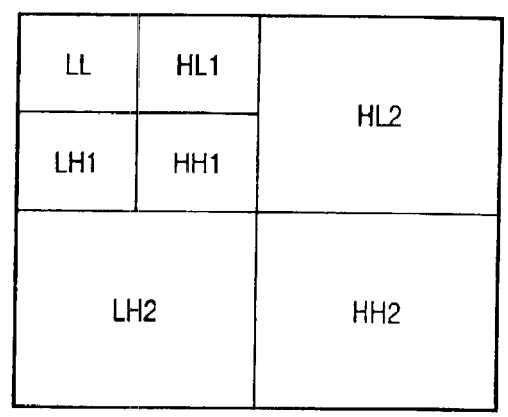

As shown in FIGS. 19A and 19B, the discrete wavelet transformation unit A3602 repeats division by wavelet transformation in the lateral and vertical direction to generate seven sub-bands. These seven sub-bands are outputted to the buffer 111, and are further outputted to the factor quantization unit A3603.

In the factor quantization unit A3603, the factor belonging to each sub-band inputted is quantized to become a factor quantized value, as shown in FIG. 20. This factor quantized value is outputted to the entropy coding unit A3604.

Figure 21:
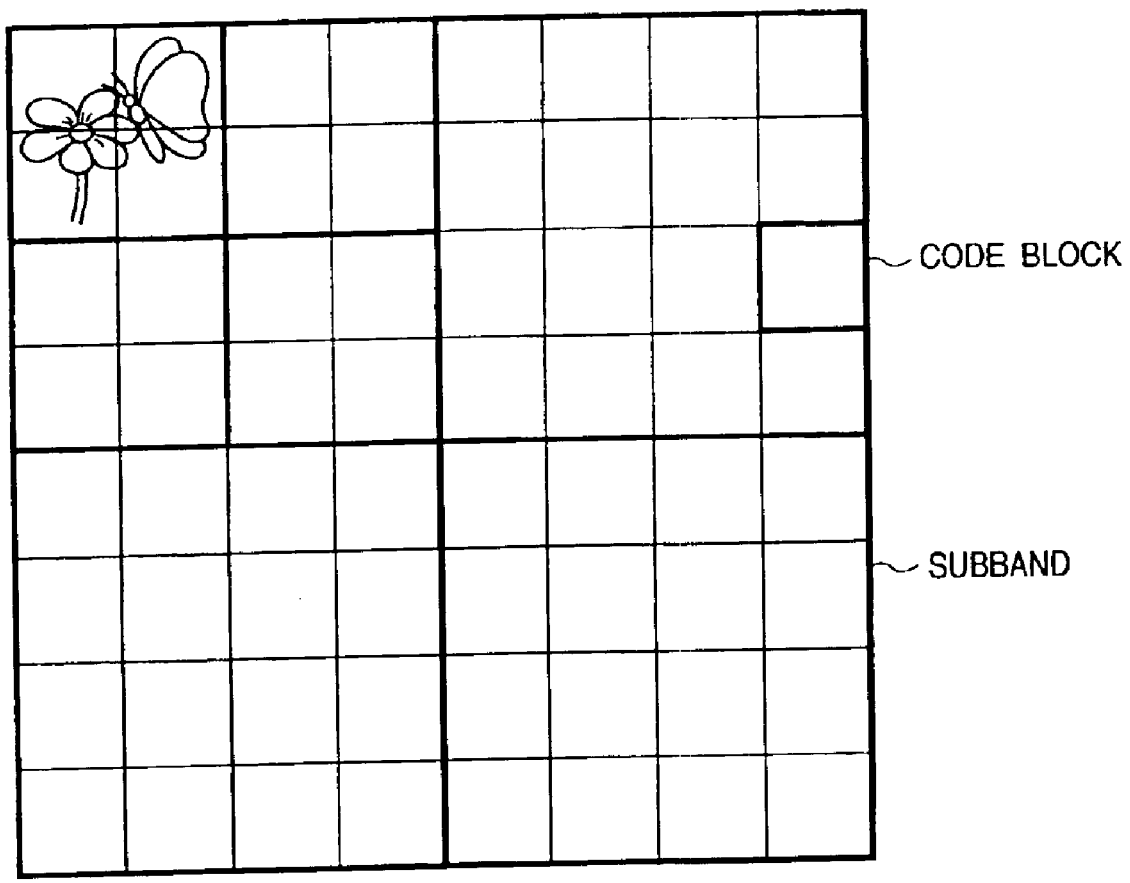
FIG. 21 shows code block division of each sub-band in the fifth to tenth embodiments.
Figure 22:
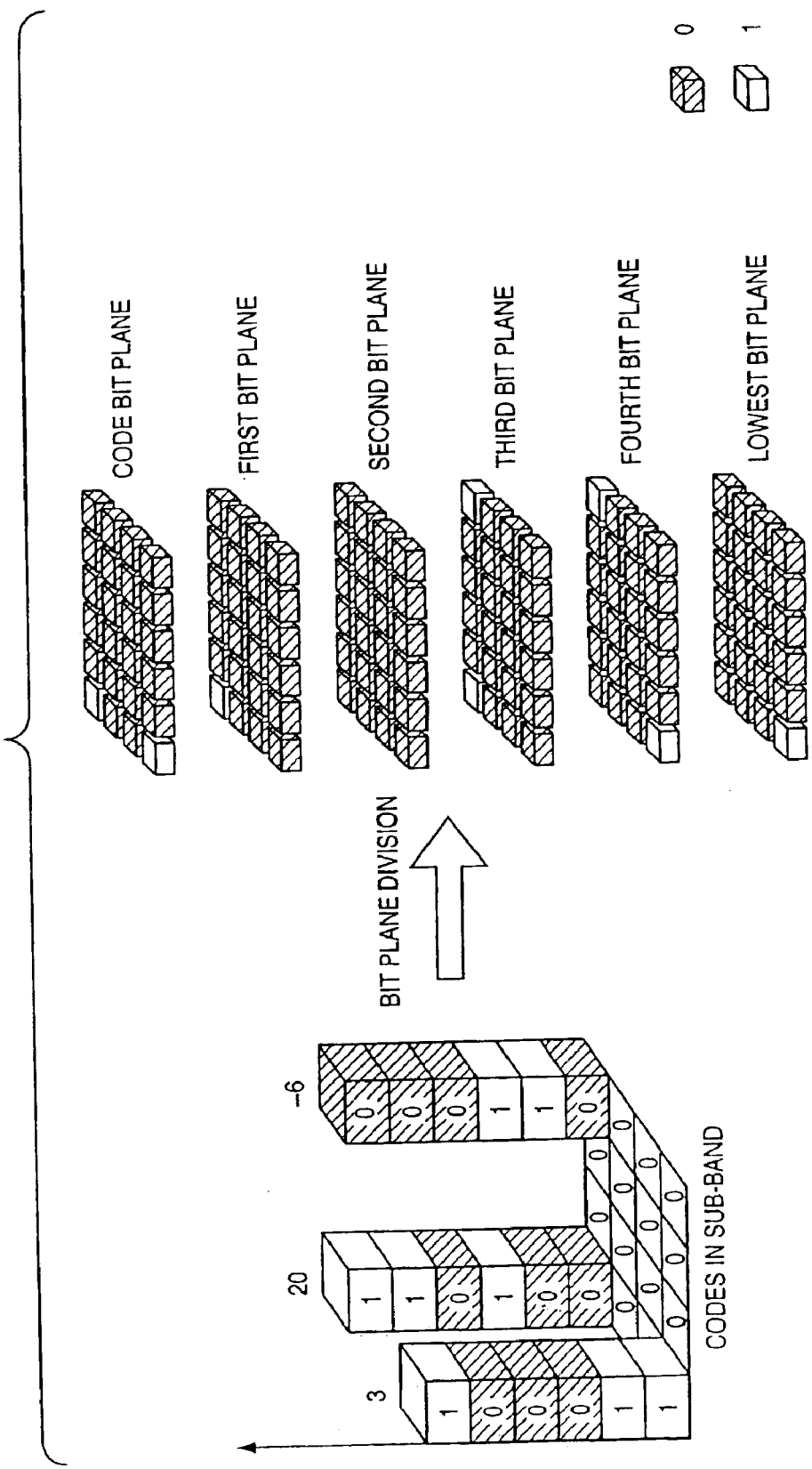
FIG. 22 shows division of each code block into bit planes in the fifth to tenth embodiments of the present invention.
Figure 23:
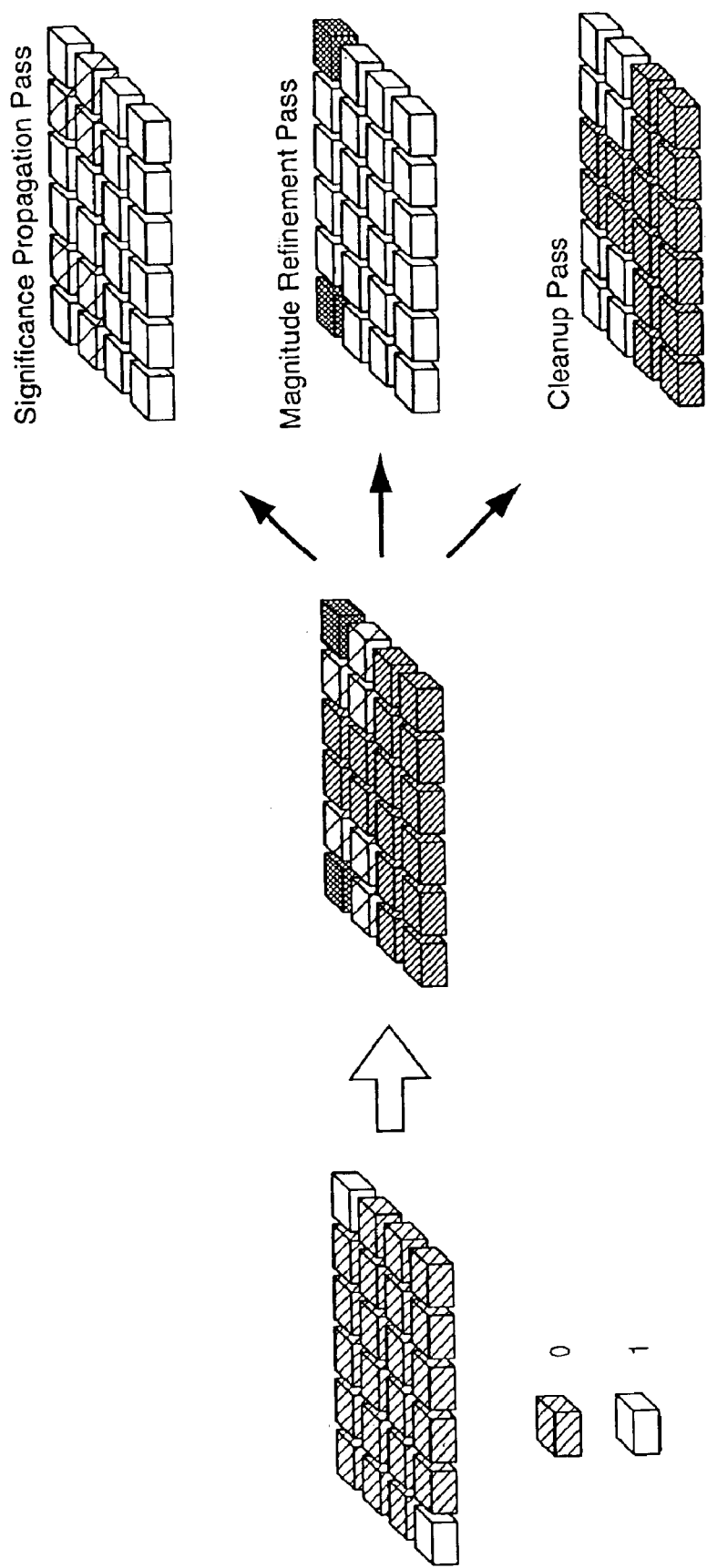
FIG. 23 shows division of each code block into bit planes in the fifth to tenth embodiments of the present invention.

In the entropy coding unit A3604, each sub-band, which is a group of inputted factor quantized values, is divided into rectangular forms (referred to as a code blocks), as shown in FIG. 21. Furthermore, the size of this code block is defined as 2m×2n (m and n are integers equal to or greater than 1) or the like. In addition, this code block is divided into bit planes as shown in FIG. 22. Furthermore, as shown in FIG. 23, bits in a certain bit plane are grouped into three types based on a classification rule, and three kinds of coding passes gathering a same type of bits are thus generated. The inputted factor quantized value is subjected to binary arithmetic coding, which is entropy coding, with the coding pass obtained here as a unit, to generate an entropy coded value.

Furthermore, for specific order of processing of entropy coding here, coding is performed in the order of from the highest plane bit to the lowest plane bit if watching a single coding block, and three kinds of passes shown in FIG. 23 are coded in descending order if watching a bit plane in the single coding block.

The entropy coded values are outputted to the image coded data generation unit D3605. The entropy coded values inputted in the image coded data generation unit D3605 are arranged in the unit of sub-bands to form quasi image coded data as shown in FIG. 8. If a desired bit rate (compression rate to the amount of original image data) is not achieved yet, data is deleted with the least important data being deleted first, with a coding pass as a unit.

In this embodiment, the LL sub-band is further subjected to length fixation before image coded data is formed, as will be described below.

If the LL sub-band in the code length of quasi image coded data is larger than the target code length designated by the designation image coded data code length inputting portion 102, data in the LL sub-band that is considered less important is deleted. As one form of this deletion, deletion in ascending order with the bit plane in the code block included in the LL sub-band as a unit can be considered. Also, as another form of deletion, deletion in ascending order with the coding pass in the code block included in the LL sub-band as a unit can also be considered.

On the other hand, if the LL sub-band in the code length of quasi image coded data is smaller than the target code length designated by the designation image coded data code length inputting portion 102, a marker indicating embedment of a message that should be given to a decoding end (comment marker) and some message data (comments) are inserted in header information at the head of coded data of the frame to be encoded. Also, dummy data to the LL sub-band is added. This dummy data is pseudo data required for rendering the encoded image data the code amount n byte (n: integer) of length fixation. Furthermore, it is further desirable that this dummy data is considered as auxiliary data for correcting an error of coded data of the LL sub-band, for using this dummy data effectively.

Image coded data generated as described above is outputted from the image coded data outputting unit 115 to the frame coded data generation unit 108.

<Frame Decoding Device>

The frame decoding device in this embodiment not only can decode the entire data of the frame coded data generated as described above (normal decoding) and play back the decoded image generated at normal speed (normal playback), but also fetch only a part of data to decode the same (quick decoding) and play back the decoded image generated at high speed (quick playback).

Furthermore, in this embodiment, it is desirable that the LL sub-band is an object to be decoded in the case of quick playback as the above described part of data because the LL sub-band is length-fixed.

Furthermore, explanation will be given, for this embodiment, on the premise that the amount of coded data of the LL sub-band is about 1/16 of the amount of entire coded data including other sub-bands, and for quick decoding (playback) in this embodiment, it is preferred data in performing sixteen-fold-speed playback, in order to simplify the explanation.

However, it should also be noted that in fact, the amount of coded data of the LL sub-band is usually larger than 1/16 of the amount of entire coded data because the coding efficiency of the LL sub-band is not high compared with other sub-bands.

Figure 24:
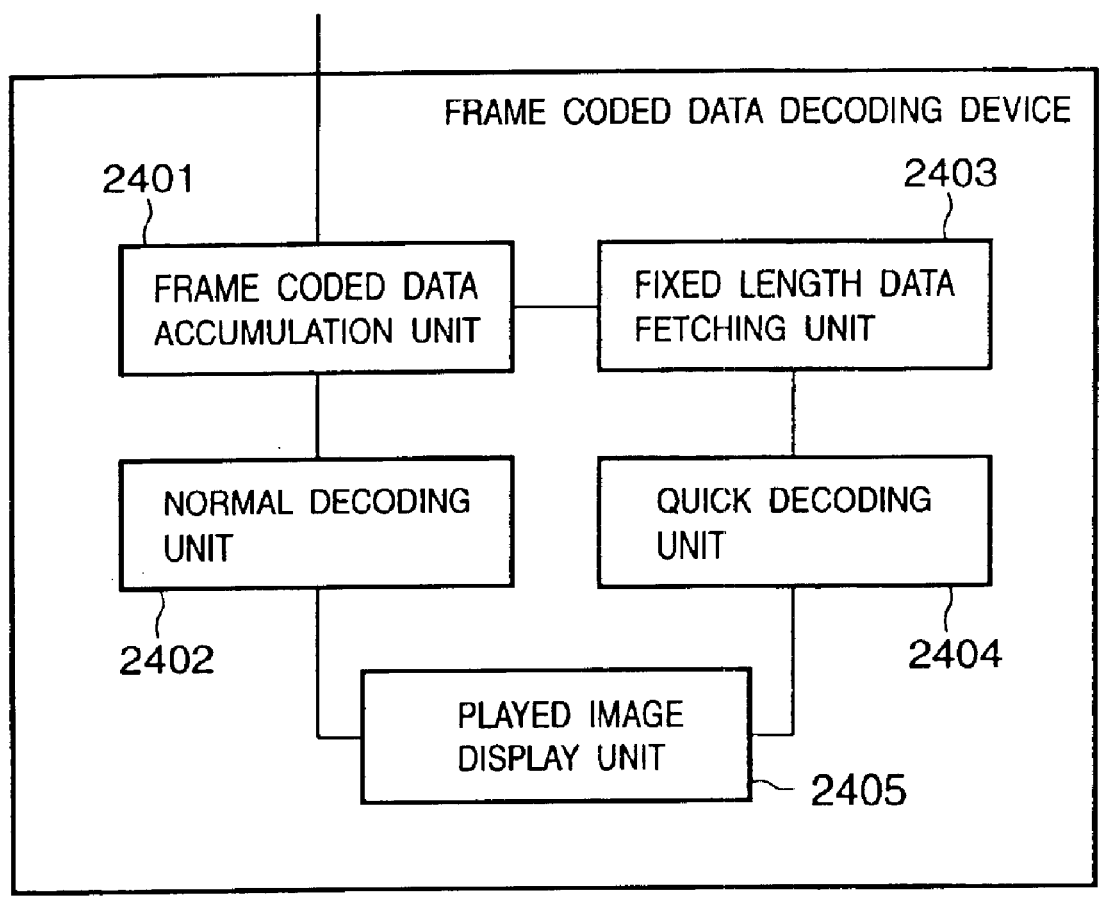
FIG. 24 is a block diagram showing a configuration of a frame decoding device in the fifth to tenth embodiments of the present invention.

FIG. 24 is a block diagram of the frame decoding device in this embodiment. In this figure, reference numerals 2401, 2402, 2403, 2404 and 2405 denote a frame coded data accumulation unit, a normal decoding unit, a fixed length fetching unit, a quick decoding unit and a played image display unit, respectively.

Figure 25:
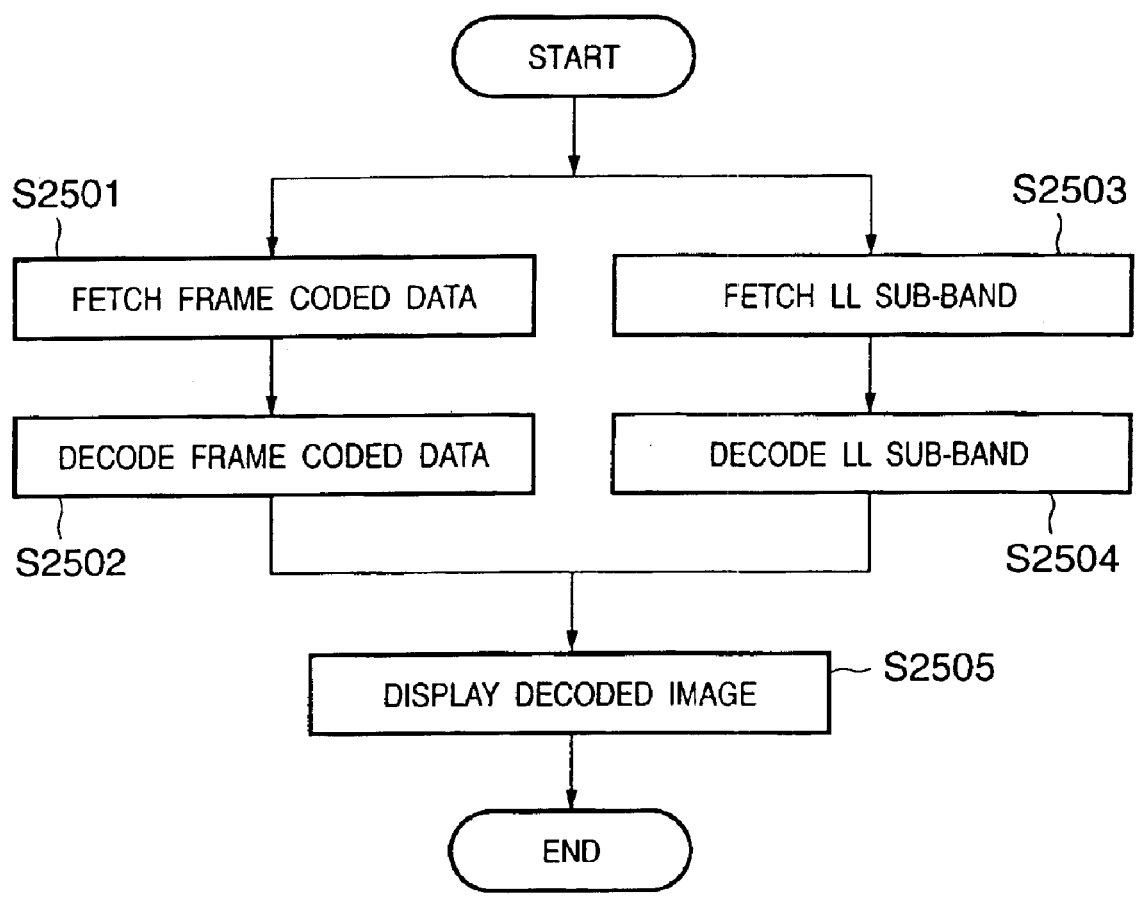
FIG. 25 is a flowchart of processing of generating decoded image data and displaying the decoded image in the fifth embodiment of the present invention.

A flow of processing in terms of the frame decoding device in this embodiment will now be described, using FIG. 25.

Frame coded data inputted in the frame decoding device in this embodiment is accumulated in the frame coded data accumulation unit 2401. If normal decoding is carried out, the frame coded data to be decoded is fetched in the normal decoding unit 2402 (S2501), and decoding of the frame coded data is performed (S2502). On the other hand, if quick decoding is carried out, only the LL sub-band in the frame coded data to be decoded is fetched in the quick decoding unit 2404 by the fixed length fetching unit 2403 (S2503), and decoding of the LL sub-band is performed (S2504). After that, the decoded image obtained by normal decoding or quick decoding is displayed on the played image display unit 2405 (S2505).

Processing of decoding frame coded data in the normal decoding unit 2402 will now be described.

Figure 26:
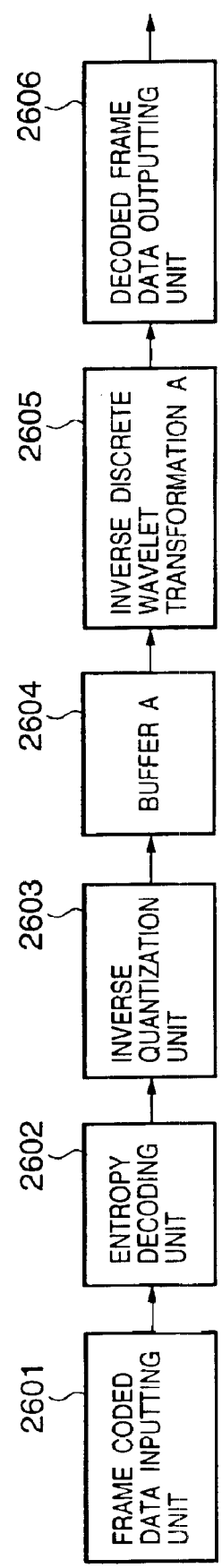
FIG. 26 is a block diagram showing a configuration of a normal decoding unit 2402 in the fifth embodiment of the present invention.

FIG. 26 is a block diagram of the normal decoding unit 2402 in this embodiment. In this figure, reference numerals 2601, 2602, 2603, 2604, 2605 and 2606 denote a frame coded data inputting unit, an entropy decoding unit, an inverse quantization unit, a buffer A, an inverse discrete wavelet transformation unit A and a decoded frame data outputting unit 2606.

A flow of processing in terms of the normal decoding unit 2402 will now be described.

When a code string sent from the frame coded data accumulation unit 2401 is inputted in the frame coded data inputting unit 2601, the frame coded data is divided into header information, image coded data and voice coded data, and the image coded data is outputted to the entropy decoding unit 2602. Furthermore, the voice coded data is decoded by a decoding unit (not shown), but such decoding processing is not described here because decoding of voice coded data is not concerned with the substance of the present invention.

The entropy decoding unit 2602 subjects the fetched image coded data to decoding processing to restore the quantized value. Then, the restored quantized value is outputted to the inverse quantization unit 2603. The inverse quantization unit 2603 subjects the inputted quantized value to inverse quantization, thereby restoring the discrete wavelet transformation factor and outputs the same to the following buffer A 2604. Inverse quantization is carried out according to the equation described below.

$$Xr = Q \times q$$

wherein Q, q and Xr represent a quantized value, a quantizing step and a restored discrete wavelet transformation factor, respectively.

The discrete wavelet transformation factor stored in the buffer A2604 is inputted in the inverse discrete wavelet transformation unit A2605 by each level. In the inverse discrete wavelet transformation unit A2605, inverse discrete wavelet transformation is performed based on the equations described below.

$$x(2n) = r(n) + \text{floor}\{p(n)/2\}$$

$$x(2n+1) = r(n) - \text{floor}\{p(n)/2\}$$

where:

$$p(n) = d(n-1) - \text{floor}\{(-r(n) + r(n+2) + 2)/4\}$$

wherein the discrete wavelet transformation factor of the low frequency component is represented by r (n), and the discrete wavelet transformation factor of the high frequency component is represented by d (n). Also, x (n) represents decoded data. This equation of transformation is for one-dimensional data, but two-dimensional transformation is performed by applying this transformation in order of lateral direction and vertical direction. Then, decoded image data is generated, and is outputted to the decoded frame data outputting unit 2606. This decoded frame data outputting unit 2606 combines voice data decoded (decoded voice data) and decoded image data to generate frame decoded data. This frame decoded data is outputted to the played image display unit 2405.

The quick decoding unit 2404 will now be described.

The quick decoding unit 2404 in this embodiment decodes only the LL sub-band fetched by the fixed length data fetching unit 2403. Decoding processing itself in this case is usually performed substantially as in the case of the normal decoding unit 2402, and therefore detailed description thereof is not particularly presented.

As described above, coded data corresponding to the frequency component of a part of the image is length-fixed, whereby both image playback at normal speed and image playback at high speed can efficiently be performed.

Furthermore, in this embodiment, since the resolution of the decoded image obtained by decoding processing in the case of the above described quick playback is low, processing of changing the resolution of the image as appropriate for the decoded image is preferably added.

This embodiment is also characterized by performing image processing for improving image quality of the decoded image as far as practical, depending on the speed of quick playback. In other words, in this embodiment, for any quick playback of double-speed, triple-speed, quadruple-speed, . . . , sixteen-fold-speed, processing for increasing resolution (data interpolation) and processing for improving image quality (smoothing and the like) are performed in the interval between decoding and playback if only the LL sub-band is decoded/played back at modest playback speed such as double-speed and quadruple-speed, even provided that only the LL sub-band of fixed length must be decoded/played back because there is no time for performing normal decoding. By so doing, the image of highest possible quality can be played back even in quick playback.

In the fifth embodiment, as described above, in a configuration in which image data expressing each frame in the motion image is subjected to discrete wavelet transformation before it is encoded, the portion corresponding to the low frequency LL sub-band is further length-fixed among frames, thereby making it possible to perform quick playback smoothly.

[Sixth Embodiment]

In this embodiment, the case where coded data of the same kind of sub-bands in each frame are length-fixed, thereby performing efficiently quick playback (playback of the motion image at frame rates of one to n-fold speeds) as in the case of the third embodiment will be described.

In the fifth embodiment, the case where only coded data of the LL sub-band subjected to length fixation is decoded to perform playback and display in the case of double-speed to sixteen-fold-speed decoding/playback has been described. However, it is also desired that decoding/playback a little more faithful to the original image should be performed in the case of double-speed and quadruple-speed decoding/playback.

Thus, for image coded data in this embodiment, length fixation of coded data is carried out for each sub-band, thereby performing each quick playback of the motion image in multi-level image quality in accordance with the playback speed.

<Frame Coding Device>

Figure 42A:
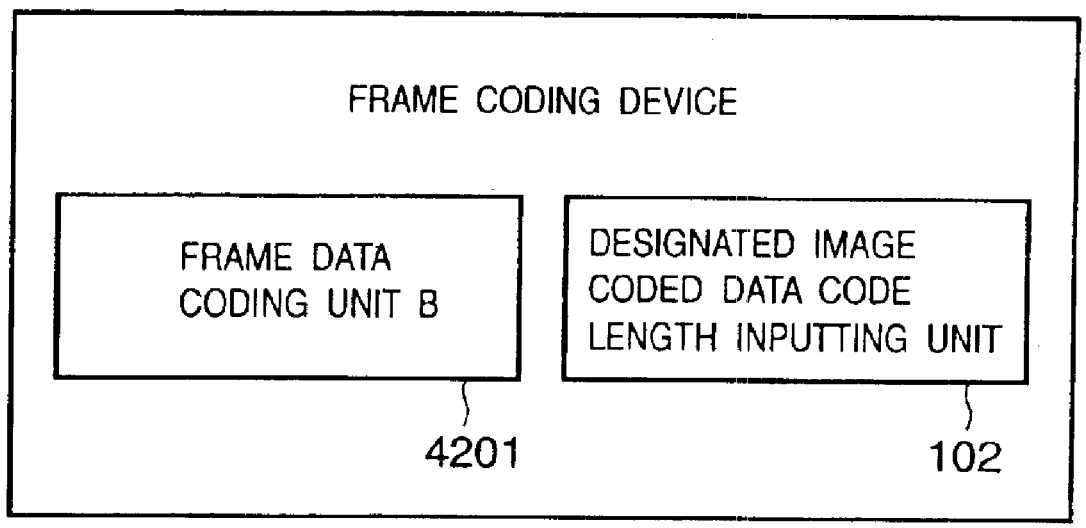
FIG. 42A is a block diagram showing a configuration of a frame coding device in the sixth embodiment.

A block diagram showing a configuration of a frame coding device in this embodiment is shown in FIG. 42A. The frame coding device in this embodiment has replaced with a frame data coding unit B4201 the frame data coding unit A3607 in the coding device shown in FIG. 36C in the fifth embodiment. The reason why this unit is replaced is that unit data is the LL sub-band in the fifth embodiment, but unit data in this embodiment is each sub-band. Operations in the designated image coded data code length inputting unit 102 are same as those in the unit in the fifth embodiment, and therefore detailed description thereof is not presented.

FIG. 42B shows in diagrammatic form the configuration of the frame data coding unit in the frame coding device in this embodiment. In this figure, reference numerals 103, 104, 105, 4202, 3606 and 108 denote a frame data inputting unit, a frame data division unit, a voice data coding unit, an image data coding unit B, a frame coded data generation unit A and a frame coded data outputting unit. As apparent from this figure, contents of processing in the frame data coding unit in this embodiment are similar to those in the frame data coding unit in the fifth embodiment except for the image data coding unit.

Figure 37:
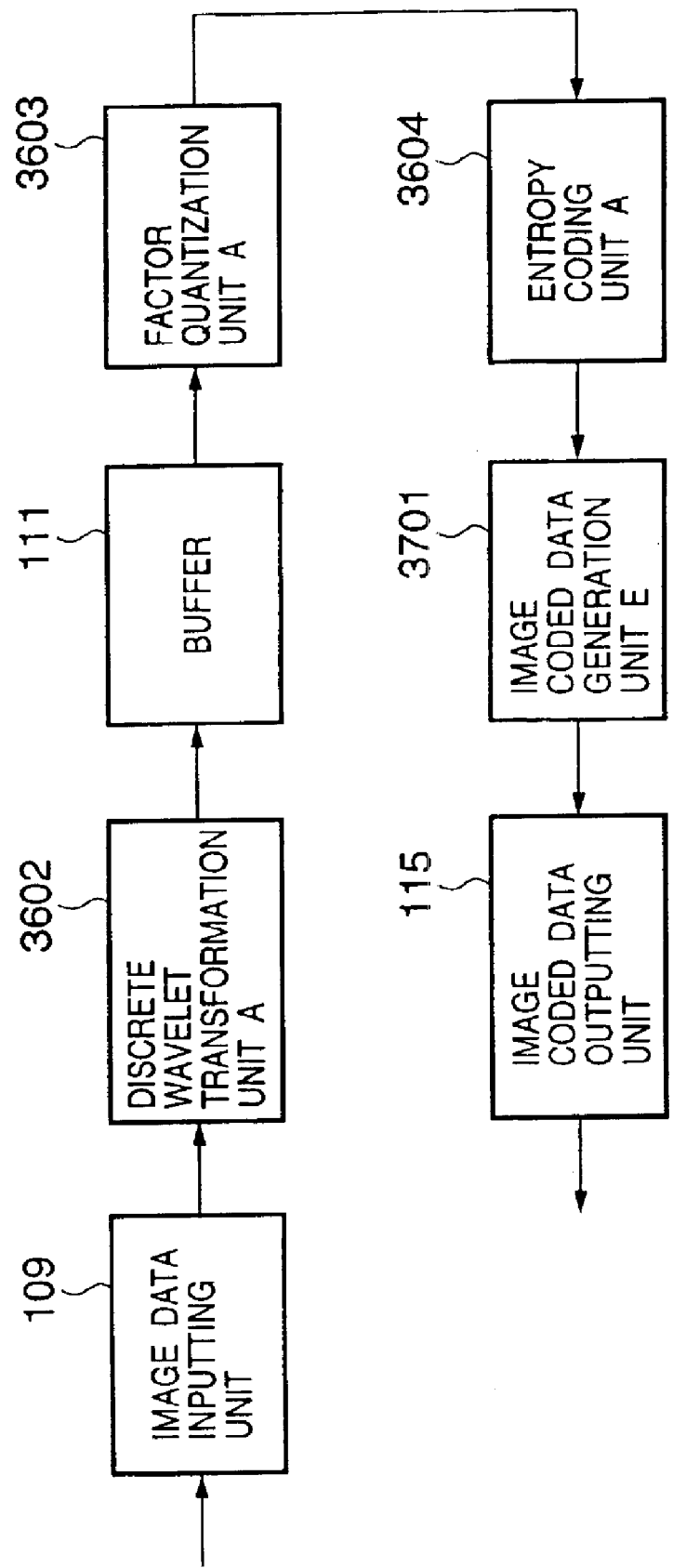
FIG. 37 is a block diagram showing a configuration of an image data coding unit B4202 in the sixth embodiment.

A block diagram showing the configuration of the image coding device in this embodiment is shown in FIG. 37. The image data coding unit B4202 in this embodiment has replaced with an image coded data generation unit E3701 the image coded data generation unit D3605 constituting the image data coding unit A3601 shown in FIG. 36B in the fifth embodiment. Except for that point, the image coding device and operations thereof in this embodiment are same as the image coding device and operations thereof in the fifth embodiment, and therefore detailed description thereof is not presented.

In the image coded data generation unit E3701 in this embodiment, length fixation for each sub-band is carried out as shown in FIG. 27. The concept of this length fixation is similar to that in the fifth embodiment.

Figure 28A:
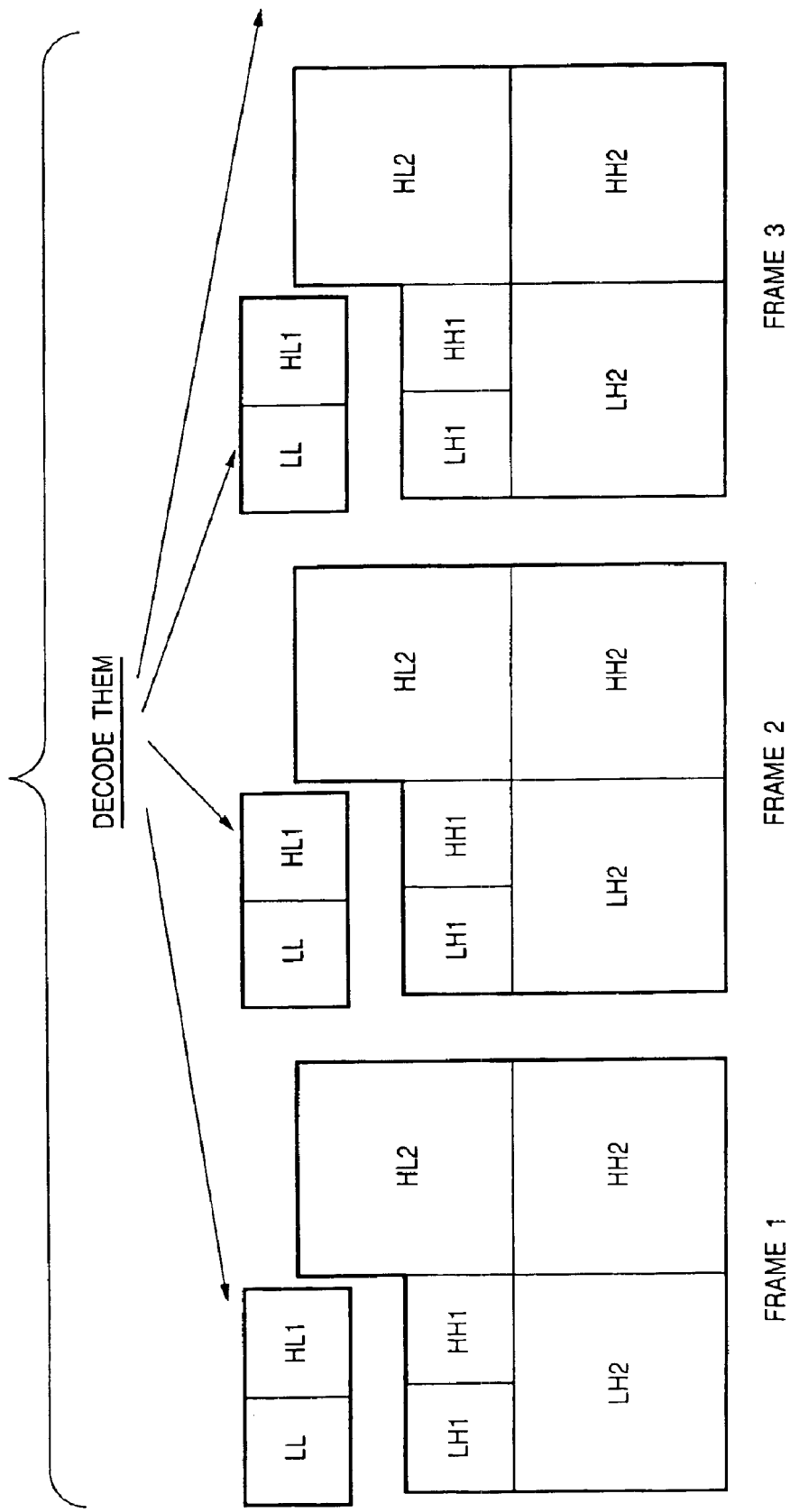
FIG. 28A shows use of LL and HL1 sub-bands for quick decoding in the sixth embodiment of the present invention.

As a result, in the frame decoding device, efficient quick decoding that also copes with speeds other than the sixteen-fold-speed can be performed. The state thereof is shown in FIG. 28. For example, in the case where eight-fold-speed decoding/playback needs to be performed, since there are sufficient time/loads to decode sub-bands other than the LL sub-band, two sub-bands of LL and HL1 of each frame as shown in FIG. 28A are fetched and decoded, thereby making it possible-to achieve eight-fold-speed playback in high image quality.

Four sub-bands of LL, LH1, HL1 and HH1 are usually played back in the case of using a part of sub-bands subjected to wavelet transformation to perform decoding/playback, but in this embodiment, at least HL1 is decoded together with LL considering the playback speed (eight-fold-speed), there by making it possible to playback a highest possible image suited to the playback speed.

Furthermore, to describe the case of double-speed playback in a similar way, coded data accounting for substantially ½ of the amount of the entire coded data is decoded as shown in FIG. 28B, thereby making it possible to perform playback of high image quality suited to the playback speed.

Furthermore, in this embodiment, the sub-band HH2 is not used in the case of quick playback, and therefore this part does not need to be length-fixed. In other words, this embodiment is characterized in that two or more kinds of sub-bands that could be an object to be decoded in the case of quick (special) playback are length-fixed.

<Frame Decoding Device>

Figure 49:
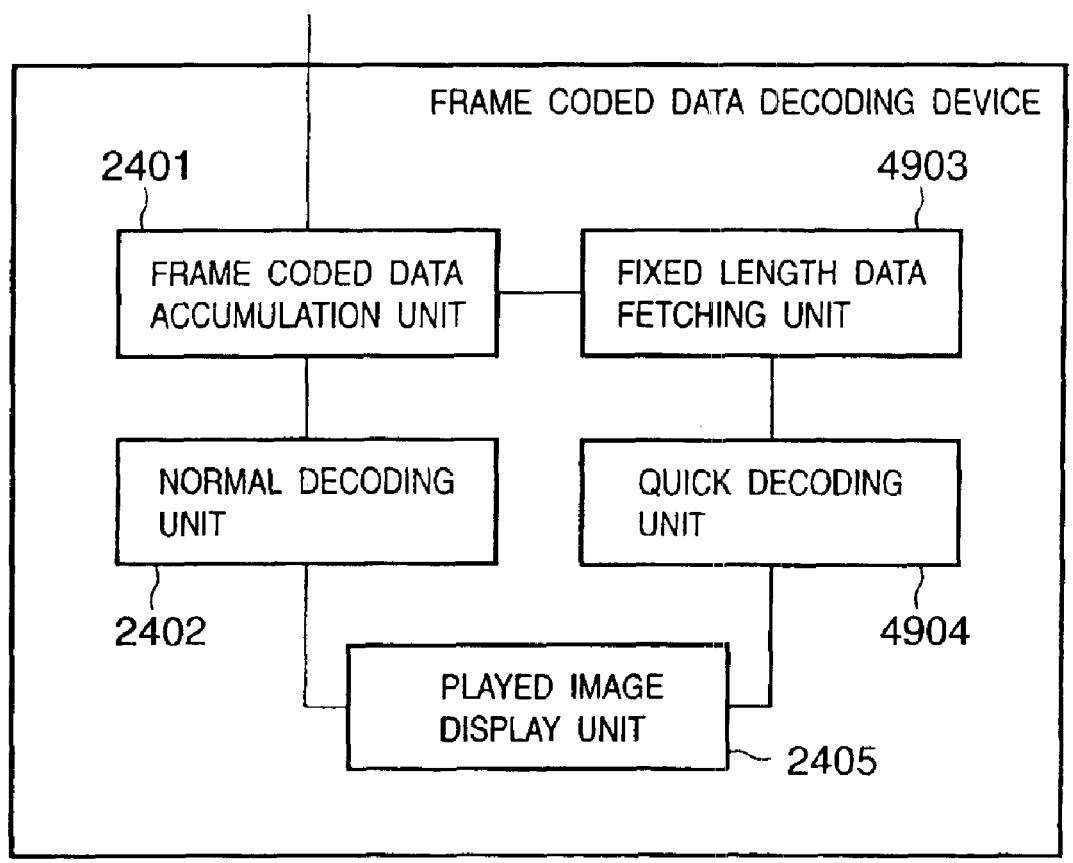
FIG. 49 is a block diagram showing a configuration of a frame decoding device in the sixth embodiment.

The decoding device in this embodiment is shown in FIG. 49. This has the fixed length data fetching unit 2403 and the quick decoding unit 2404 in the fifth embodiment with a fixed length fetching unit 4901 and a quick decoding unit 4902. The reason why these units are replaced is that while data treated with quick decoding is only the LL sub-band in the fifth embodiment, data treated with quick decoding in this embodiment is the length-fixed sub-band including the LL sub-band. Furthermore, processing performed by the frame decoding device in this embodiment is substantially similar to processing performed by the frame decoding device in the fifth embodiment, and therefore detailed description of the frame decoding device in this embodiment is not presented.

In this embodiment, as described above, a same kind of sub-bands in mutual frames are made to take on the fixed length, whereby two or more kinds of sub-bands equivalent to the amount of coded data that sufficiently keeps with the playback speed are decoded, thus making it possible to perform image playback of high image quality suited to the playback speed.

[Seventh Embodiment]

In this embodiment, the case where coded data is length-fixed in the unit of sub-band groups belonging to a same kind of resolution levels in each frame, thereby performing quick playback (playback of the motion image at frame rates of 1 to n-fold speeds) efficiently, as in the case of the fourth embodiment will be described. Furthermore, as described above, the level of resolution refers to groups of sub-bands like, for example, level 0=<LL>, level 1=<HL1, LH1, HH1>, and level 2=<HL2, LH2, HH2>, if considering the state of the sub-band after wavelet transformation.

<Frame Coding Device>

Figure 43A:
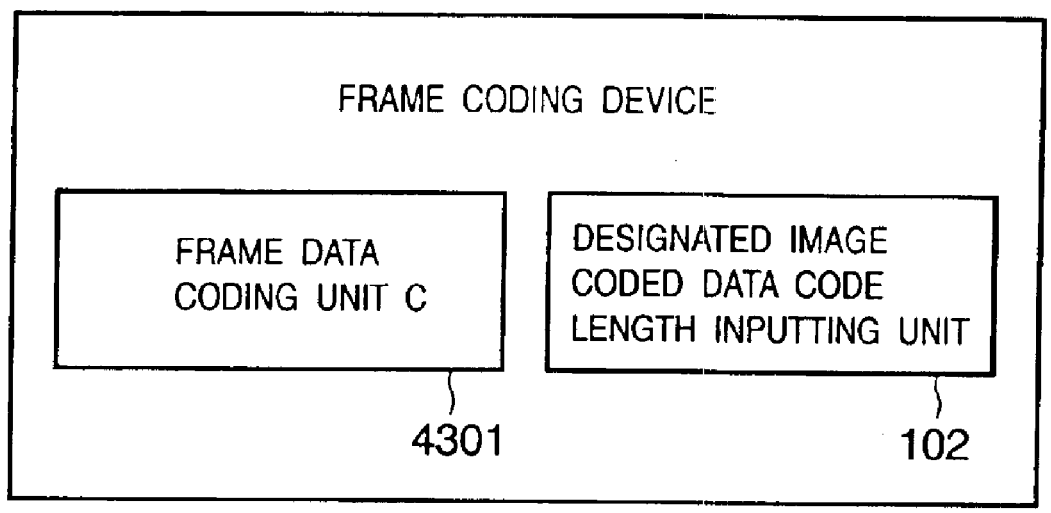
FIG. 43A is a block diagram showing a configuration of a frame coding device in the seventh embodiment.

A block diagram showing the configuration of the frame coding device in this embodiment is shown in FIG. 43A. The frame coding device in this embodiment has replaced with a frame data coding unit C4301 the frame data coding unit A3607 in the coding device shown in FIG. 36C in the fifth embodiment. The reason why this replacement is applied is that unit data is the LL sub-band in the fifth embodiment, but unit data in this embodiment is the level of resolution. Operations in the designated image coded data code length inputting unit 102 are same as those in this processing unit in the fifth embodiment, and therefore description thereof is not presented.

Figure 43B:
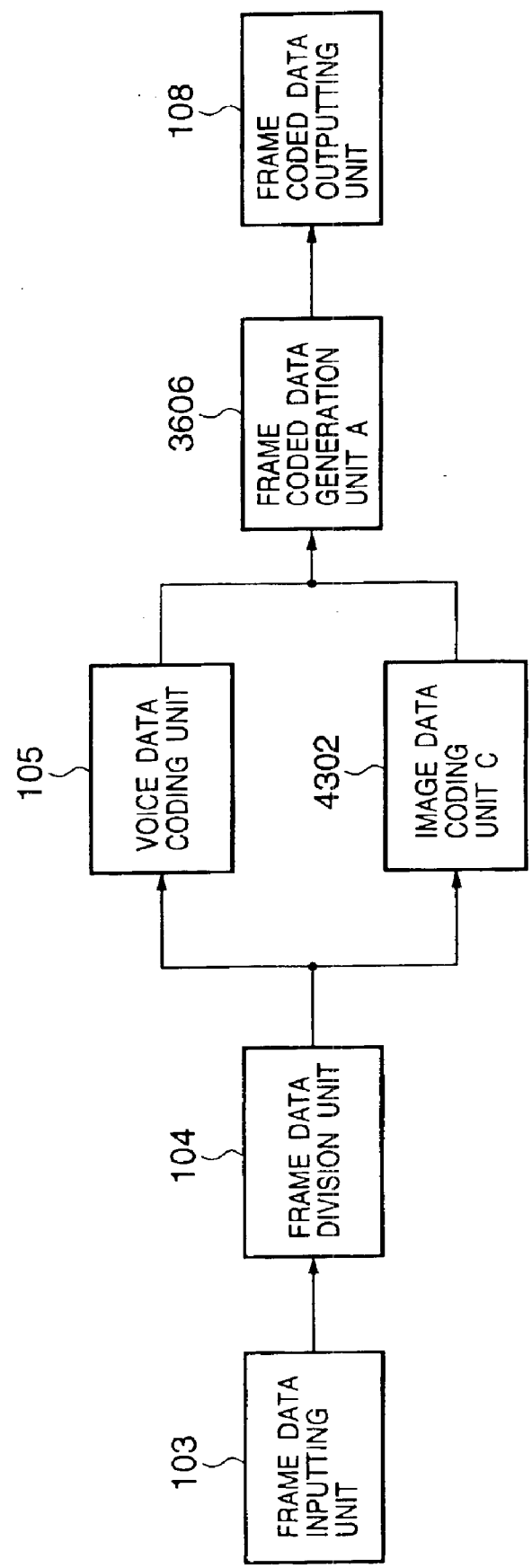
FIG. 43B is a block diagram showing a configuration of a frame data coding unit C4301 in the seventh embodiment.

FIG. 43B shows in diagrammatic form the configuration of the frame data coding unit in the frame coding device in this embodiment. In this figure, reference numerals 103, 104, 105, 4302, 3606 and 108 denote a frame data inputting unit, a frame data division unit, a voice data coding unit, an image data coding unit C, a frame coded data generation unit A and a frame coded data outputting unit, respectively. Contents of processing in the frame data coding unit in this embodiment are similar to those in the frame data coding unit in the fifth embodiment except for the image data coding unit, and therefore detailed description thereof is not presented.

Figure 38:
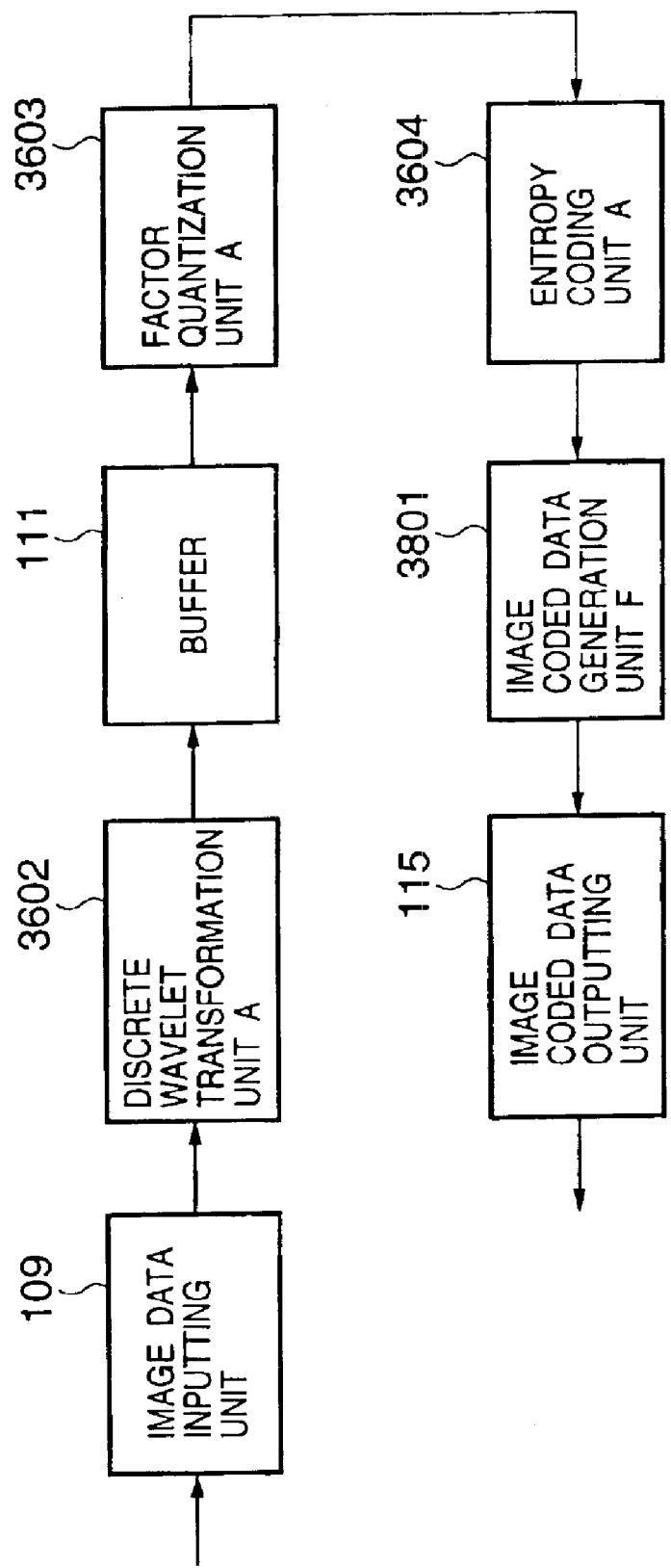
FIG. 38 is a block diagram showing a configuration of an image data coding unit C4302 in the seventh embodiment.

A block diagram showing the configuration of the image coding device in this embodiment is shown in FIG. 38. The coding device in this embodiment has replaced with an image coded data generation unit F3801 the image coded data generation unit D3605 constituting the image data coding unit A3601 shown in FIG. 36B in the fifth embodiment. Except for that point, the image coding device and operations thereof are same as the image coding device and operations thereof in the fifth embodiment.

In the image coded data generation unit F3801 in this embodiment, coded data is length-fixed for each group of sub-bands belonging to a same kind of resolution levels. That is, for each frame, coded data representing LL are length-fixed so that they are rendered the code length C0, a group of coded data representing three sub-bands of HL1, LH1 and HH1 are length-fixed so that they are rendered the code length C1, and a group of coded data representing three sub-bands of HL2, LH2 and HH2 are length-fixed so that they are rendered the code length C2.

As a result, as shown in FIG. 30, the frame decoding device of this embodiment can perform decoding/playback of only the resolution level suited to the playback speed. In FIG. 30, only coded data of the length-fixed LL sub-band (namely, level 0) can be decoded/played back in the case of (five-fold-speed to) sixteen-fold-speed playback, and only coded data representing three sub-bands of HL1, LH1 and HH1 (level 1) together with the LL sub-band can be decoded/played back in the case of (double-speed to) quadruple-speed playback.

Furthermore, in the case shown in FIG. 30, since LH2, HL2 and HH2 belong to a sub-band group of highest resolution level, length fixation does not need to be performed for this group of highest level, for attaining the object of this embodiment.

In this embodiment, the object can be attained as long as at least coded data of resolution level (sub-band group) for which partial playback could be applied when quick playback is carried out.

<Frame Decoding Device>

Figure 50:
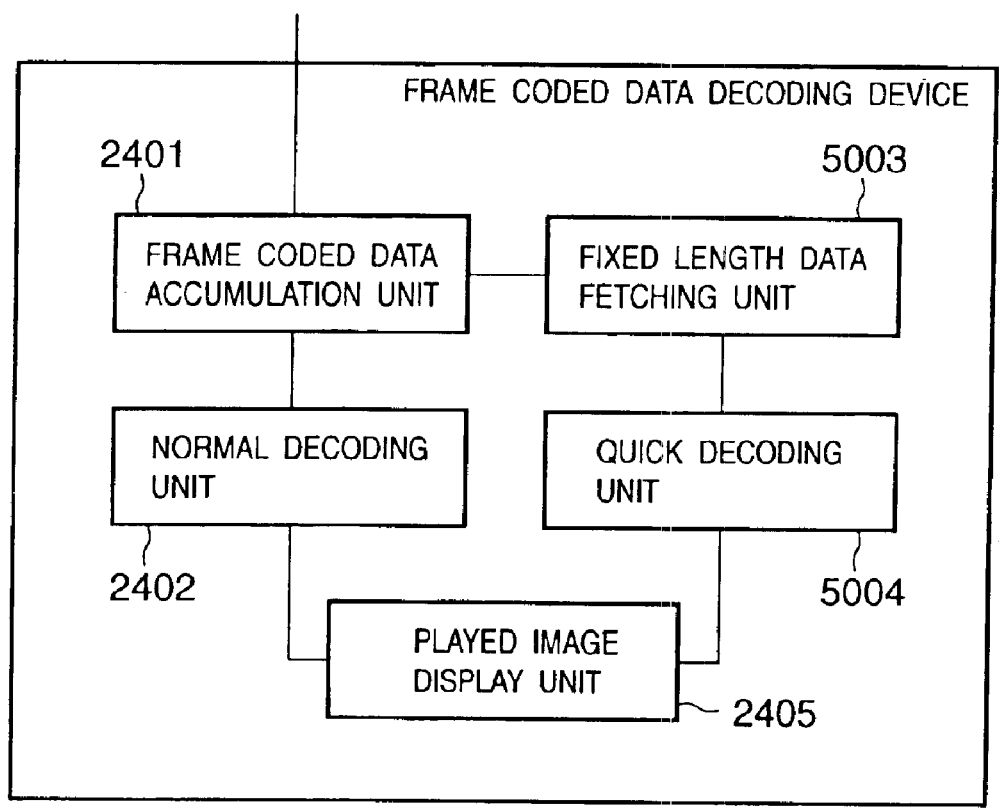
FIG. 50 is a block diagram showing a configuration of a frame decoding device in the seventh embodiment.

The decoding device in this embodiment is shown in FIG. 50. This device has the fixed length data fetching unit 2403 and the quick decoding unit 2404 in the fifth embodiment replaced with a fixed length data fetching unit 5001 and a quick decoding unit 5002. The reason why these units are replaced is that while data treated with quick decoding in only the LL sub-band in the fifth embodiment, data treated with quick decoding in this embodiment is coded data of resolution level. Furthermore, processing performed by the frame decoding device in this embodiment is substantially similar to processing performed by the frame decoding device in the fifth embodiment, and therefore detailed description of processing of the frame decoding device in this embodiment is not presented.

As described above, according to this embodiment, since image coded data are length fixed for each coded data of the group of sub-bands belonging to each resolution level, a image of highest possible quality suited to the playback speed can be played back when these coded data are played back at high speed.

[Eighth Embodiment]

In the fifth embodiment, only the LL sub-band that is the lowest frequency component is length-fixed.

However, the present invention is not limited thereto. For example, the object of the present invention is attained even if four sub-bands of LL, LH1, HL1 and HH1 are considered as low frequency sub-bands, and the sum of these four sub-bands is made to be length-fixed. In this embodiment, this case will be described.

In the case where the number of times discrete wavelet transformation is repeatedly performed in lateral and vertical directions of the image (the level number) is large, length fixation of only the LL sub-band may be impractical.

For example, the level number of discrete wavelet transformation described for the first embodiment is 3, and therefore if length fixation of the LL sub-band in the image coded data is performed, this represents a form of optimum coded data for performing sixty four-fold-speed decoding/playback, which is less practical.

Thus, in this embodiment, coded data of the sub-band group including the LL sub-band and other low frequency sub-bands, though not all of various kinds of sub-bands, are length-fixed.

Figure 44A:
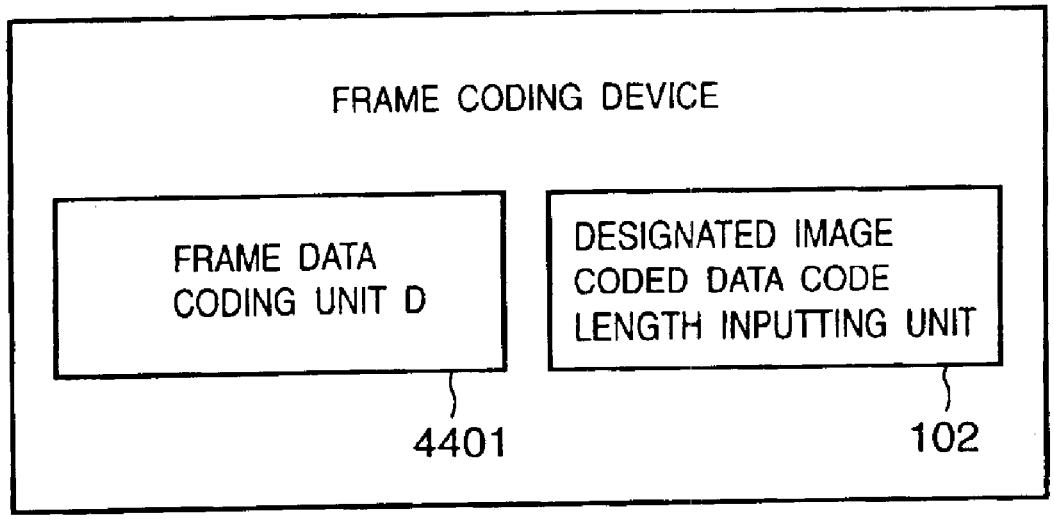
FIG. 44A is a block diagram showing a configuration of a frame coding device in the eighth embodiment.
Figure 44B:
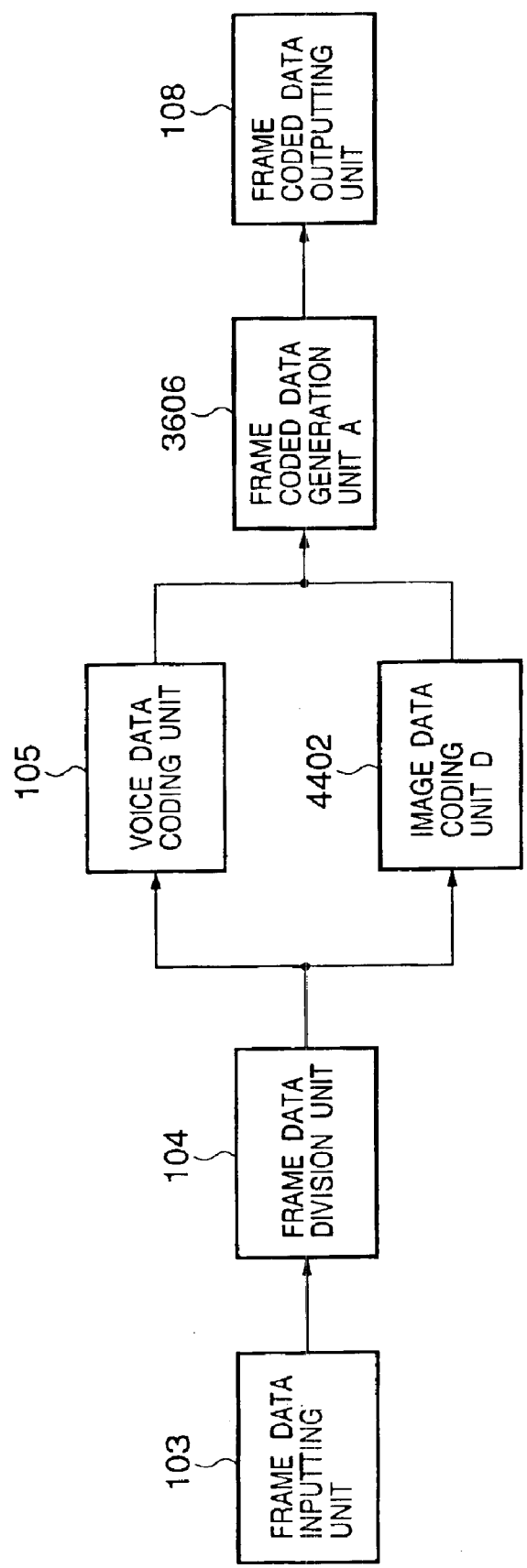
FIG. 44B is a block diagram showing a configuration of a frame data coding unit D4401 in the eighth embodiment.

A block diagram showing the configuration of the frame coding device in this embodiment is shown in FIG. 44A. The frame coding device in this embodiment has replaced with a frame data coding unit D4401 the frame data coding unit A3607 in the coding device in the fifth embodiment shown in FIG. 36C. The reason why this replacement is applied is that unit data in the fifth embodiment is the LL sub-band, but unit data in this embodiment is the LL sub-band+α (LH1, LH1, HH1 . . . ). Operations in the designated image coded data code length inputting unit 102 are similar to those in the same processing unit in the fifth embodiment.

FIG. 43B shows in diagrammatic form the configuration of the frame data coding unit in the frame coding device in this embodiment. In this figure, reference numerals 103, 104, 105, 4402, 3606 and 108 denote a frame data inputting unit, a frame data division unit, a voice data coding unit, an image data coding unit D, a frame coded data generation unit A and a frame coded data outputting unit, respectively. Contents of processing in the frame data coding unit in this embodiment are similar to those in the frame data coding unit in the fifth embodiment except for the image data coding unit, and therefore detailed description thereof is not presented.

Figure 39:
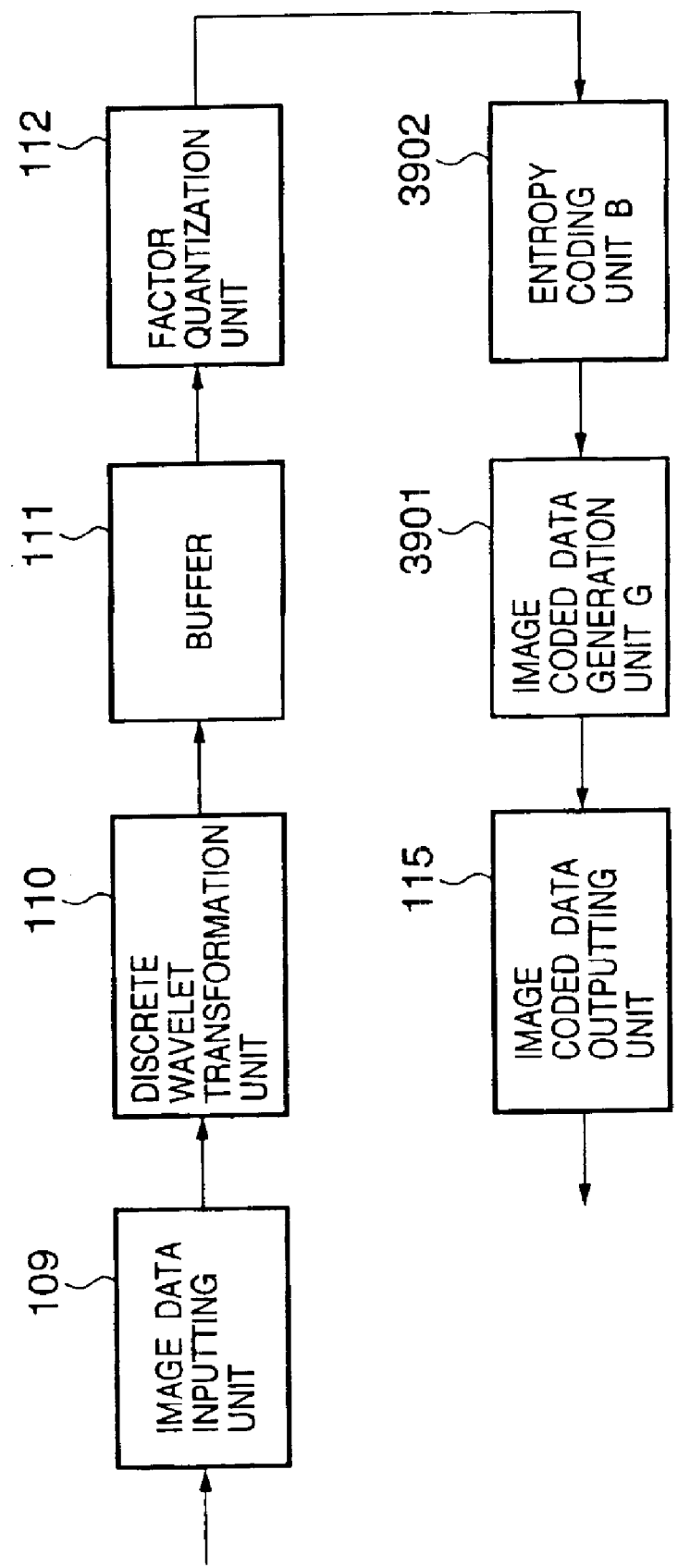
FIG. 39 is a block diagram showing a configuration of an image data coding unit D4402 in the eighth embodiment.

Now, a block diagram showing the configuration of the image coding device in this embodiment is shown in FIG. 39. In this embodiment, since the case where the level number of discrete wavelet transformation is 3 will be described, the discrete wavelet transformation unit 110 and the factor quantization unit 112 used in the first embodiment are applied for a discrete wavelet A3802 and a factor quantization unit A3803. Also, the image coded data generation unit D3605 constituting the image data coding unit A3601 shown in FIG. 36B in the fifth embodiment is replaced with an image coded data generation unit G3901 described later. Also, because of difference in the number of sub-bands treated, the entropy coding unit A3604 is replaced with an entropy coding unit B3902 in FIG. 39 described above. However, basic processing remains unchanged, and therefore detailed description thereof is not presented.

Figure 32:
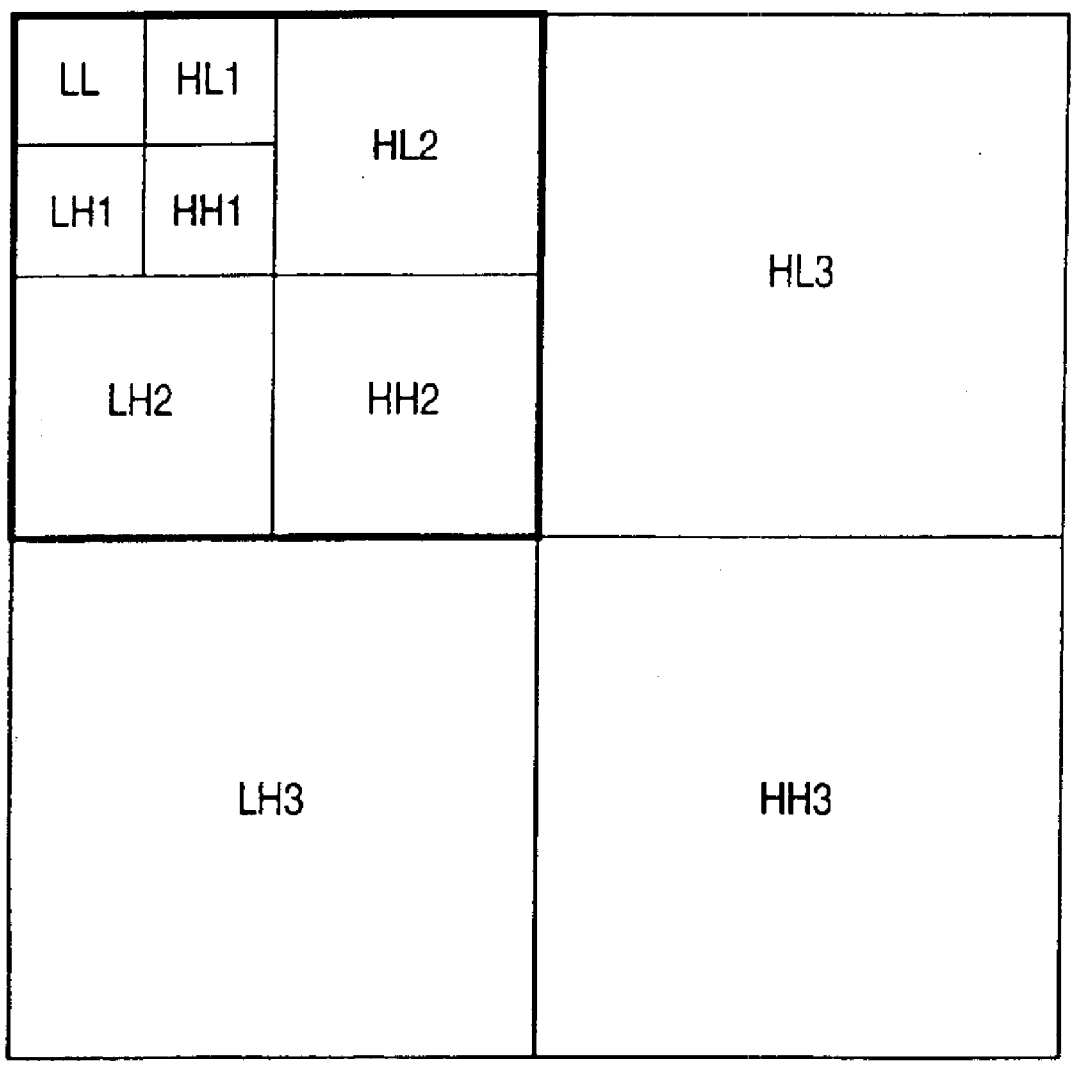
FIG. 32 shows length fixation of unit data in the eighth embodiment of the present invention.

As shown in FIG. 32, the image coded data generation unit G3901 in this embodiment length-fixes the coded data corresponding to the sub-band group of the LL sub-band +α(LH1, HL1, HH1, LH2, HL2, HH2). This point represents a significant difference between this embodiment and the fifth embodiment.

A configuration as shown in FIG. 32 makes it possible to play back easily a simple image most suitable for performing quadruple-speed decoding/playback, which is a very practical setting.

<Frame Decoding Device>

Figure 51:
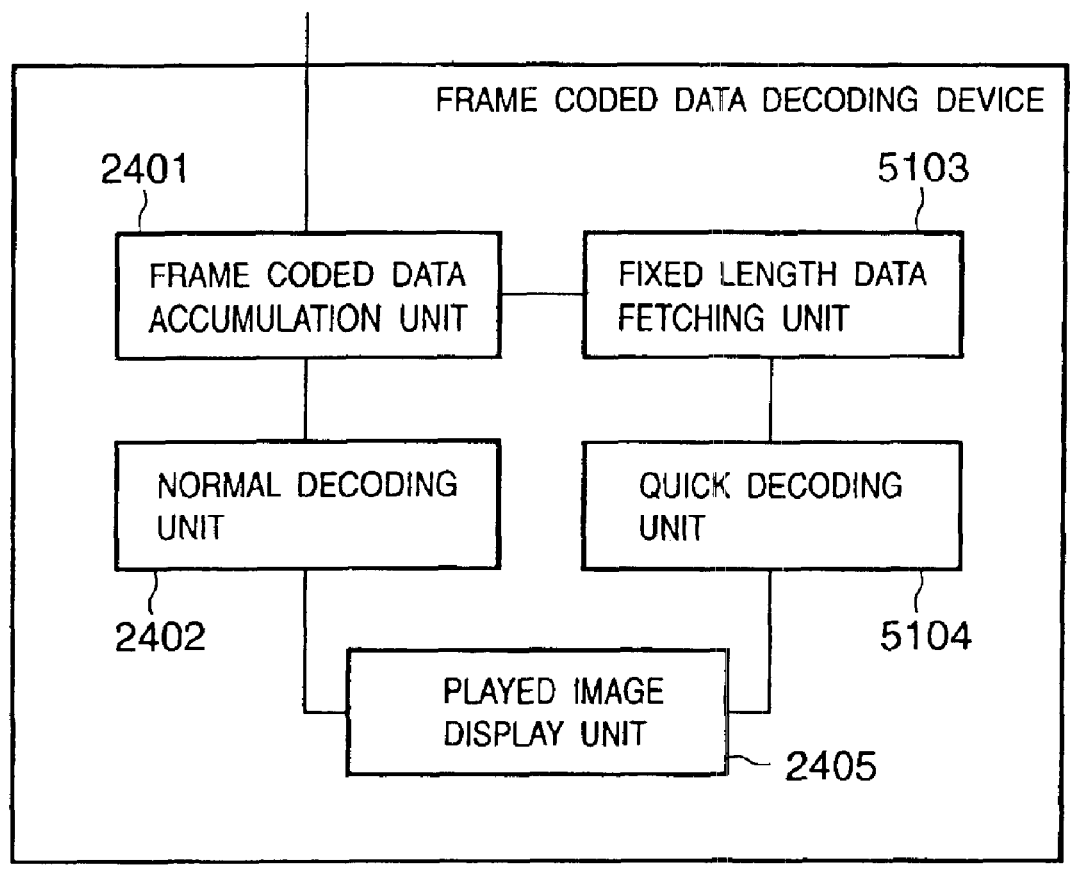
FIG. 51 is a block diagram showing a configuration of a frame decoding device in the eighth embodiment.

The decoding device in this embodiment is shown in FIG. 51. This device has the fixed length data fetching unit 2403 and the quick decoding unit 2404 in the fifth embodiment replaced with a fixed length data fetching unit 5101 and a quick decoding unit 5102. The reason why these units are replaced is that while data treated with quick decoding is only the LL sub-band in the fifth embodiment, data treated with quick decoding in this embodiment is the LL sub-band+ α(LH1, HL1, HH1, LH2, HL2, HH2). Furthermore, processing performed by the frame decoding device in this embodiment is substantially similar to processing performed by the frame decoding device in the fifth embodiment, and therefore detailed description of processing of the frame decoding device in this embodiment is not presented.

As described above, in this embodiment, coded data corresponding to the group of the LL sub-band+α(low frequency sub-bands subsequent thereto) is length-fixed, whereby coded data enabling practical multiple-speed decoding/playback (playback of the motion image at frame rates of 1 to n-fold speeds) to be performed easily can be provided.

[Ninth Embodiment]

Figure 33:
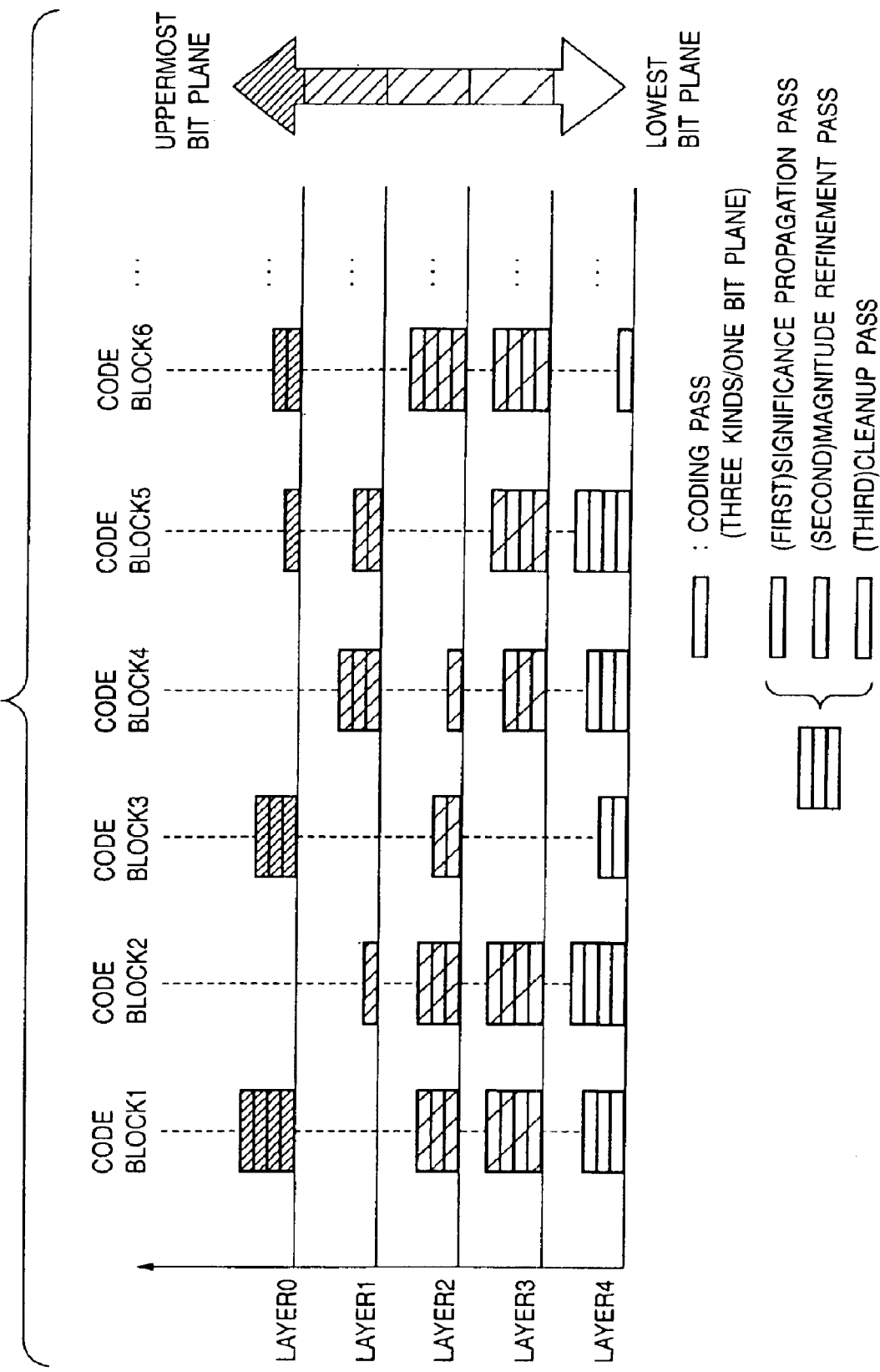
FIG. 33 illustrates layers in the ninth and tenth embodiments of the present invention.
Figure 34:
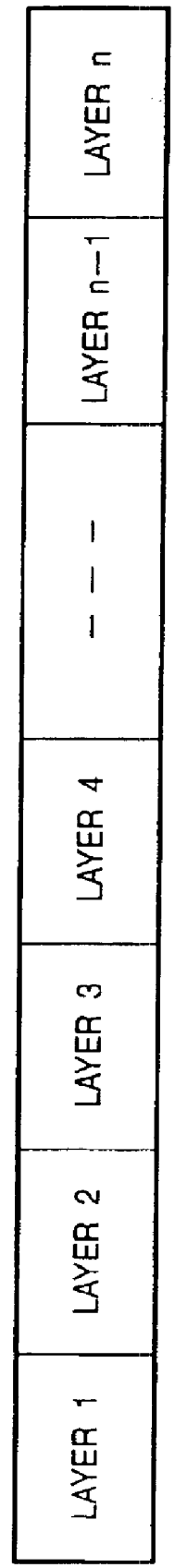
FIG. 34 illustrates a layer arrangement in image coded data of the ninth embodiment of the present invention.
Figure 35:
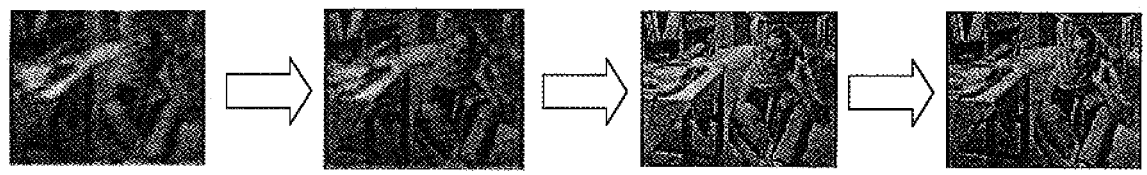
FIG. 35 illustrates hierarchical display in which image quality is gradually improved while an image size is unchanged.

In the coding device in the fifth embodiment, it has been described that image coded data has a data structure as shown in FIG. 8. In the case where the decoding end treats coded data in the order of this data structure, partially decoded data generated by partial decoding is of very low resolution (¼ or ¹⁄₁₆ or ¹⁄₆₄). Considering that in this embodiment, for persons who do not desire a decoding form like this, a plurality of layers (layer 0 to N) as shown in FIG. 33 is defined, and coded data based on this data structure as shown in FIG. 34 is generated, thereby enabling hierarchical display according to a method in which the image size remains unchanged while image quality is gradually improved, as shown in FIG. 35.

And, this embodiment is characterized in that a various kinds of layers (layer 0, . . . ,N) in coded data having the above described layer structure are length-fixed so that they are equalized among respective frames.

<Frame Coding Device>

Figure 45A:
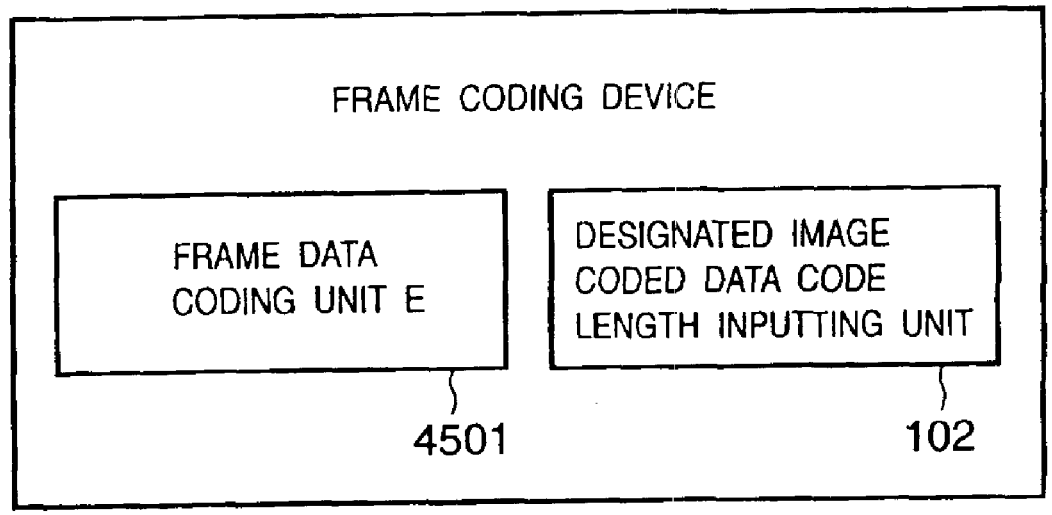
FIG. 45A is a block diagram showing a configuration of a frame coding device in the ninth embodiment.
Figure 45B:
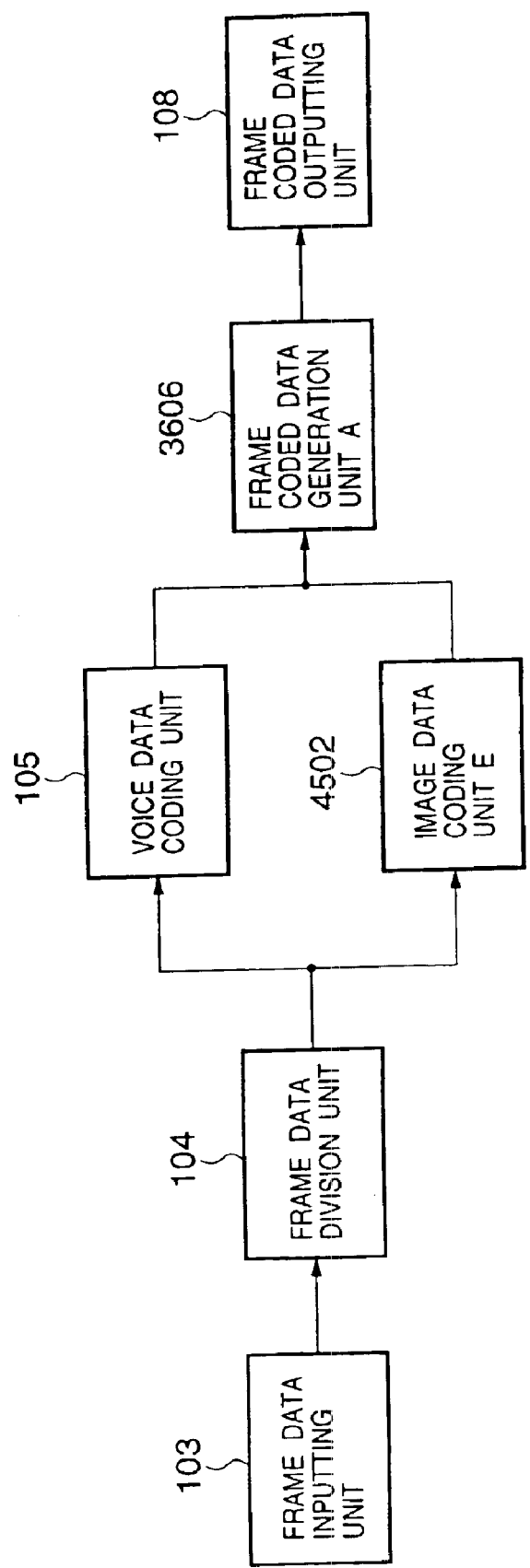
FIG. 45B is a block diagram showing a configuration of a frame data coding unit E4501 in the ninth embodiment.
Figure 46A:
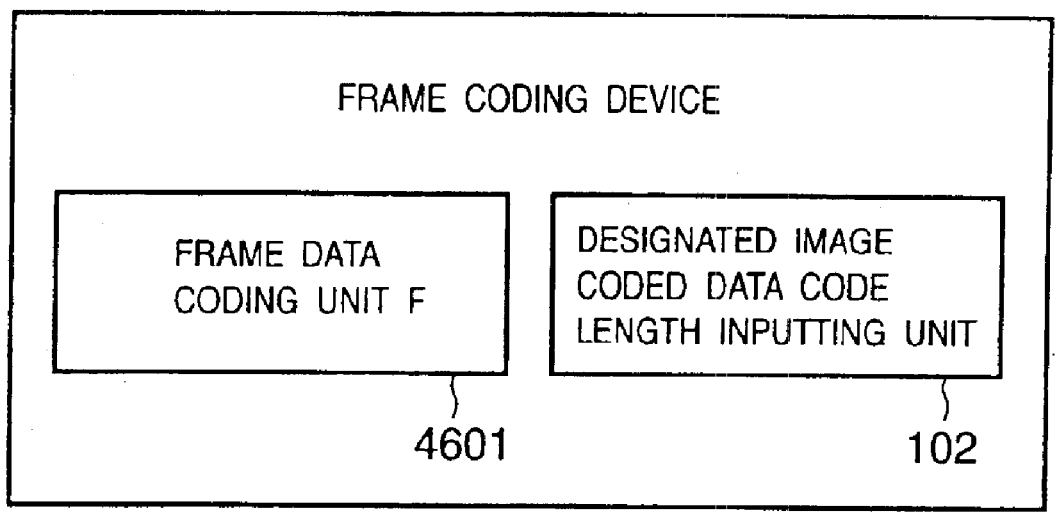
FIG. 46A is a block diagram showing a configuration of a frame coding device in the tenth embodiment.
Figure 46B:
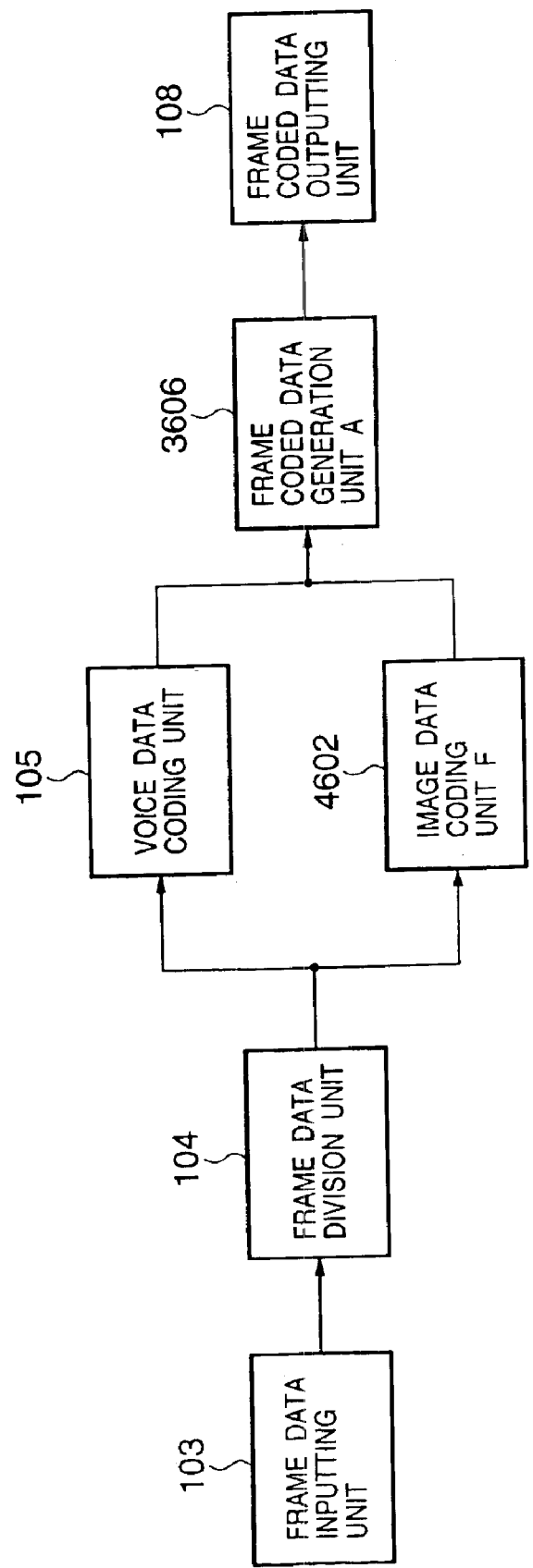
FIG. 46B is a block diagram showing a configuration of a frame data coding unit F4601 in the sixth embodiment.

A block diagram showing the configuration of the frame coding device in this embodiment is shown in FIG. 45A. The frame coding device in this embodiment has replaced with a frame data coding unit E4501 the frame data coding unit A3607 in the coding device of the fifth embodiment shown in FIG. 36C. The reason why this replacement is applied is that while unit data in the fifth embodiment is the LL sub-band, unit data in this embodiment is corresponded to each layer. Operations in the designated image coded data code length inputting unit 102 are same as those in the fifth embodiment, and therefore detailed description thereof is not presented.

FIG. 43B shows in diagrammatic form the configuration of frame data coding unit in the frame coding device in this embodiment. In this figure, reference numerals 103, 104, 105, 4502, 3606 and 108 denote a frame data inputting unit, a frame data division unit 104, a voice data coding unit, an image data coding unit E, a frame coded data generation unit A and a frame coded data outputting unit, respectively. Furthermore, contents of processing in the frame data coding unit in this embodiment are similar to those in the frame data coding unit in the fifth embodiment except for the image data coding unit.

Figure 40:
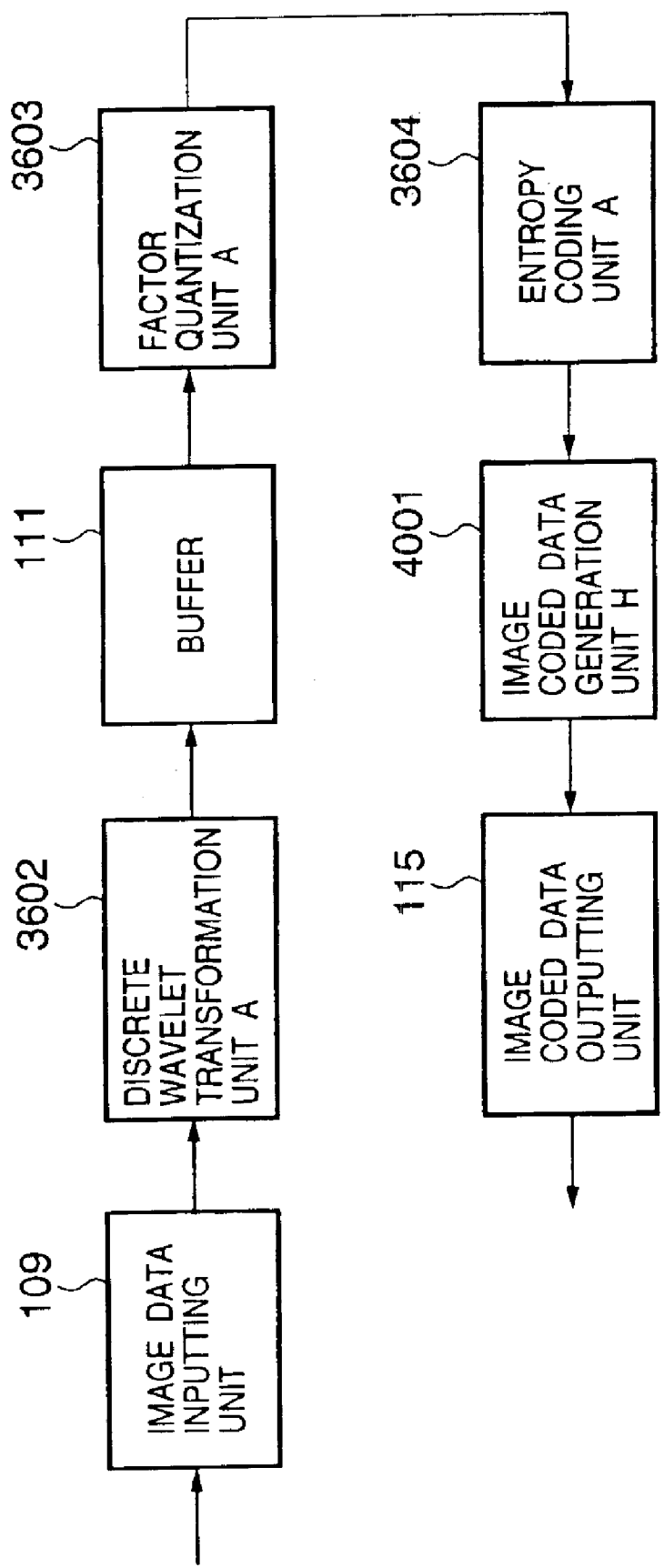
FIG. 40 is a block diagram showing a configuration of an image data coding unit E4502 in the ninth embodiment.

A block diagram showing the configuration of the image coding device in this embodiment is shown in FIG. 40. The coding device in this embodiment has replaced with a an image coded data generation unit H4001 the image coded data generation unit D3605 constituting the image data coding unit A3601 in the fifth embodiment shown in FIG. 36B. Except for this point, the image coding device and operations thereof in this embodiment are same as the image coding device and operations thereof in the fifth embodiment, and therefore detailed description thereof is not presented.

The image coded data generation unit H4001 forms image coded data into a layer structure to perform length fixation of layers. Description about the layer structure will be presented below.

Figure 47:
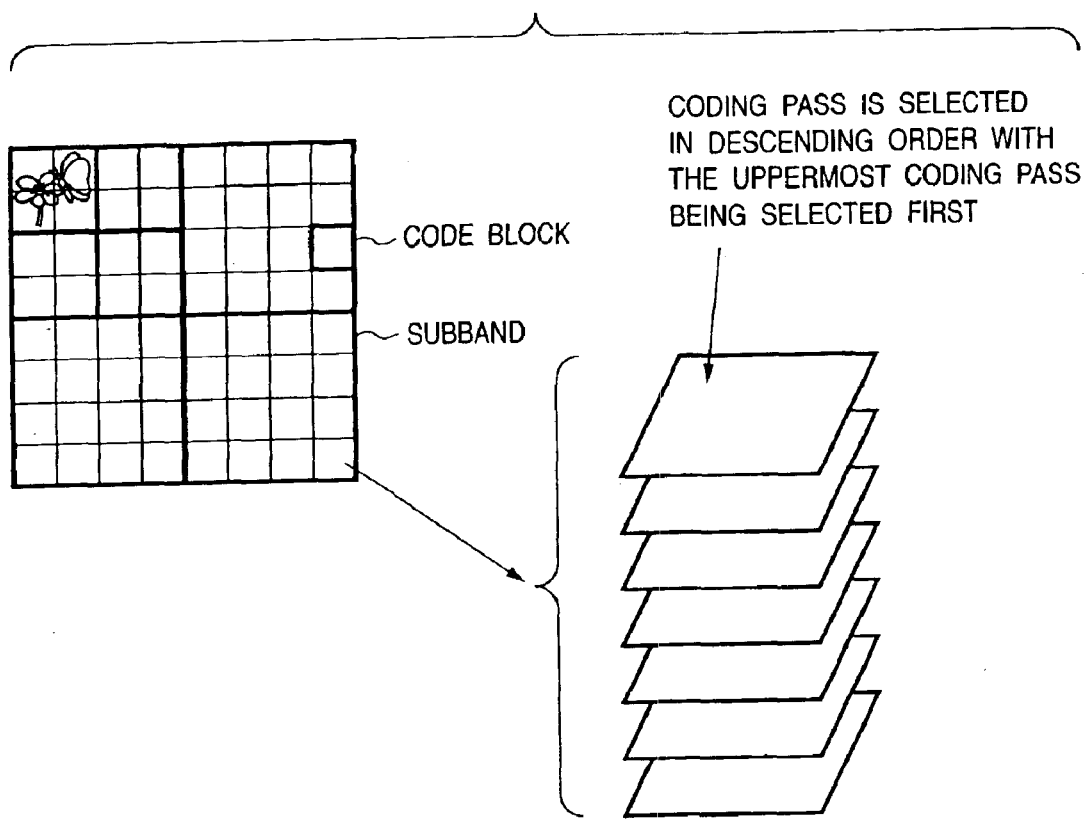
FIG. 47 illustrates a coding pass selected in the layer arrangement in the ninth embodiment.

As shown in FIG. 33, the image coded data generation unit H4001 collects entropy coded coding passes from a plurality of coding passes in a plurality of sub-bands before construct the layer. Furthermore, a shown in FIG. 47, when a coding pass is obtained from a certain coding block, the coding pass existing in the uppermost position of the coding passes is always selected.

Figure 48:
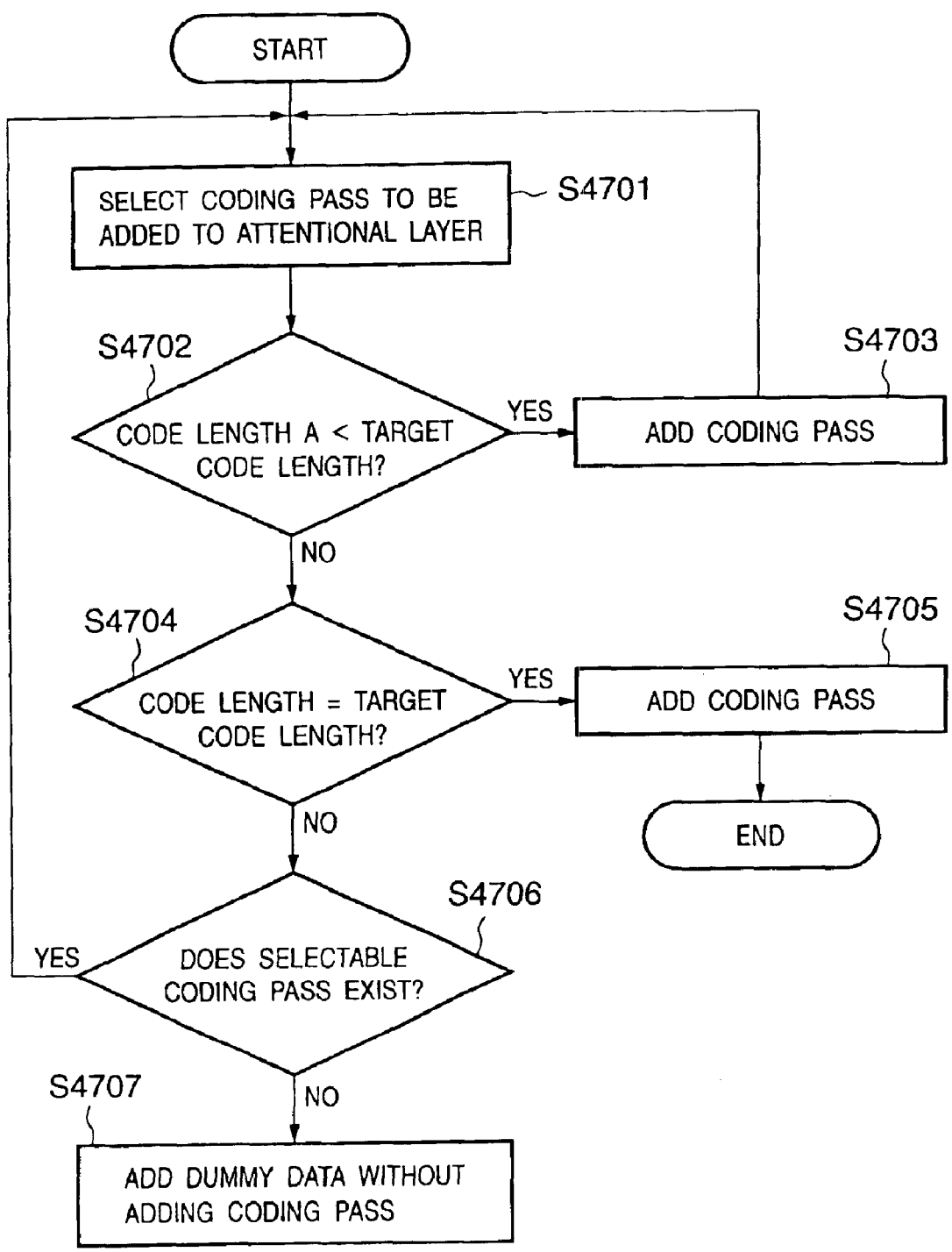
FIG. 48 is a flowchart showing processing of the layer arrangement in the ninth embodiment.

In this layer structure, layers are generated in such a manner that they are length-fixed with the uppermost layer being generated first. That is, in FIG. 33, the layer 0 is first generated in such a manner that it is length-fixed, after which layers 1, 2, . . . are generated. A flow through which one layer is generated will be described below, using FIG. 48 showing a flowchart.

First, a coding pass to be added to a layer to which attention is paid (attentional layer) is selected (S4701), and the size of the code length (code length A) obtained as a result of adding the code length of the selected coding pass to the code length of the attentional layer is compared with the size of the target code length (S4702). If the code length A is smaller than the target code length, the selected coding pass is added to the attentional layer (S4703), and processing is returned back to S4701. If the code length A is not smaller than the target length, whether or not the two code lengths equal each other is examined (S4704). If the code length A equals the target length, the selected coding pass is added to the attentional layer (S4705) to end processing for constructing the attentional layer. If the code length A does not equal the target length and the code length A is larger than the target code length, the existence of other selectable coding passes is examined without selecting the selected coding pass (S4706). If there exists a selectable coding pass, processing is returned back to S4701. On the other hand, if there exists no selectable coding pass, dummy data is added to the attentional layer (S4707) to end processing.

In this embodiment, control is made so that at least coded data of the uppermost layer (layer 0) is length-fixed just as in the case of the second and fifth embodiments in which only the LL sub-band enabling the image of lowest image quality to be played back is length-fixed.

However, the present invention is limited thereto. For example, also for coded data representing not only the uppermost layer but also several layers subsequent thereto, length fixation may be performed in a similar way. In this case, the optimum layer for which length fixation is performed is easily assigned to the multi-level quick playback speed, thus making it possible to play back an image of highest possible image quality during quick playback.

Furthermore, if the contents/bit arrangement of image data are analyzed, based on which the bit plane (coding pass) of the code block having bits as meaningful as possible is included in the upper layer, an image of very high image quality can be played back even in the case of quick playback.

<Frame Decoding Device>

Figure 52:
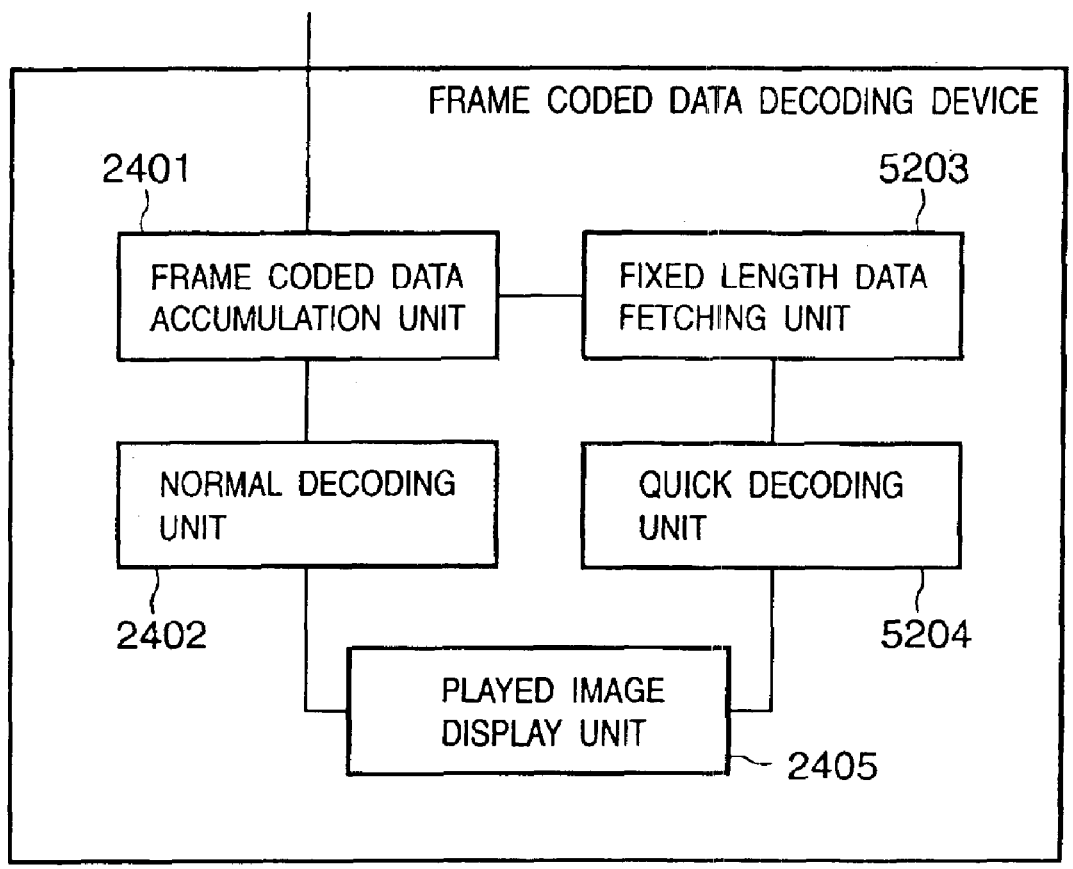
FIG. 52 is a block diagram showing a configuration of a frame decoding device in the ninth embodiment.

The decoding device in this embodiment is shown in FIG. 52. This device has the code length data fetching unit 2403 and the quick decoding unit 2404 in the fifth embodiment replaced with a code length data fetching unit 5210 and a quick decoding unit 5292. The reason why these units are replaced is that while data treated with quick decoding is the LL sub-band in the fifth embodiment, data treated with quick decoding in this embodiment is the length-fixed layer. Furthermore, processing performed by the frame decoding device in this embodiment is substantially similar to processing performed by the frame decoding device in the fifth embodiment, and therefore detailed description of processing in terms of the frame decoding device in this embodiment is not presented.

In this embodiment, as described above, image coded data is formed into a layer structure, and the coded data of the uppermost layer of these layers and further several layers subsequent thereto are length-fixed, thereby enabling image playback in high resolution and also image playback of highest possible image quality with playback speed taken into account even when quick decoding/playback (playback of the motion image at frame rates of 1 to n-fold speeds) is performed.

[Tenth Embodiment]

In the above described fifth to eighth embodiments, for each sub-band or for each group of a plurality of sub-bands, length fixation of their coded data is performed. Image coded data generated by so doing is adapted to various speed playbacks.

If length fixation of coded data is performed considering only the concept of these sub-bands, however, it may be impossible to perform decoding/playback sufficiently suitable for the playback speed of each stage for the image decoding device enabling playback speeds of much more numerous stages compared to the playback speeds of seven stages [HK1] or the like that can be achieved with the sixth embodiment, for example. Accordingly, the image coding device in this embodiment further forms coded data of each sub-band or each group of coded data comprised of a plurality of sub-bands into a structure of a plurality of layers as in the case of the ninth embodiment and performs length fixation of coded data of each layer. That is, adaptation to stages of playback speeds of (the number of sub-bands or the number of sub-band groups)×(the number of layers) is possible. That is, image playback of highest possible image quality suited to each playback speed can be performed.

It is described in the first place that the following method is used in this embodiment. Namely, image coded data is length-fixed for each sub-band, as described in the sixth embodiment. Furthermore, coded data among respective sub-bands have layer structures independent of one another. And, coded data representing these respective layers are length-fixed. Namely, if compared with the ninth embodiment, the layer structure of several stages as shown in FIG. 33 is created. In contrast to that, this embodiment is different from the ninth embodiment in that the layer structure of several stages is created independently for each sub-band/each sub-band group.

<Frame Coding Device>

A block diagram showing the configuration of the frame coding device in this embodiment is shown in FIG. 45A. The frame coding device in this embodiment has replaced with a frame data coding unit F4601 the frame data coding unit A3607 in the coding device in the fifth embodiment shown in FIG. 36C. The reason why this replacement is applied is that while unit data is the LL sub-band in the fifth embodiment, unit data in this embodiment is changed to the layer in the sub-band. Operations in the designated image coded data code length inputting unit 102 are same as operations in the same processing unit in the fifth embodiment.

FIG. 43B shows in diagrammatic form the configuration of the frame data coding unit in the frame coding device in this embodiment. In this figure, reference numerals 103, 104, 105, 4602, 3606 and 108 denote a frame data inputting unit, a frame data division unit, a voice data coding unit, an image data coding unit F, a frame coded data generation unit A and a frame coded data outputting unit, respectively. Contents of processing in the frame data coding unit in this embodiment are similar to those in the frame data coding unit in the fifth embodiment except for the image data coding unit.

Figure 41:
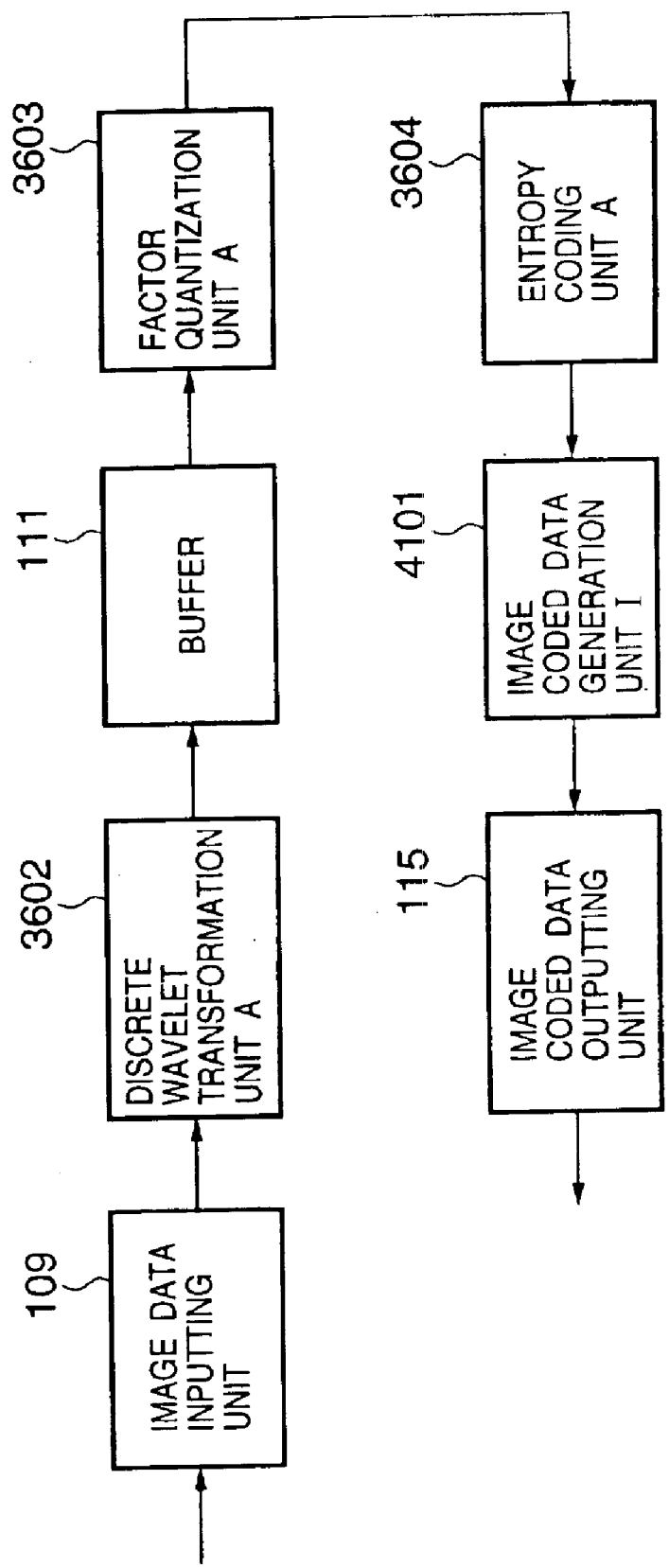
FIG. 41 is a block diagram showing a configuration of an image data coding unit F4602 in the ninth embodiment.

A block diagram showing the configuration of the image coding device in this embodiment is shown in FIG. 41. In the image coding device of this embodiment, the image coded data generation unit D3605 constituting the image data coding unit A3601 of the fifth embodiment shown in FIG. 36B is replaced with an image coded data generation unit I4101. Except for this point, the image coding device and operations thereof in this embodiment are same as the image coding device and operations thereof in the fifth embodiment.

In the image coded data generation unit I4101, length fixation of the coded data of each sub-band is performed as described first in the sixth embodiment.

Thereafter, as shown in FIG. 31, the coded data is formed into a layer structure in which each sub-band is comprised of two layers, and coded data for each layer is length-fixed. Furthermore, the number of layers of each sub-band is considered as 2 in FIG. 31 to avoid complicated explanation, but the present invention is not limited thereto. As a matter of course, if the number of layers is increased to 3 or more, coded data of structure with very numerous hierarchies can be created.

<Frame Decoding Device>

Figure 53:
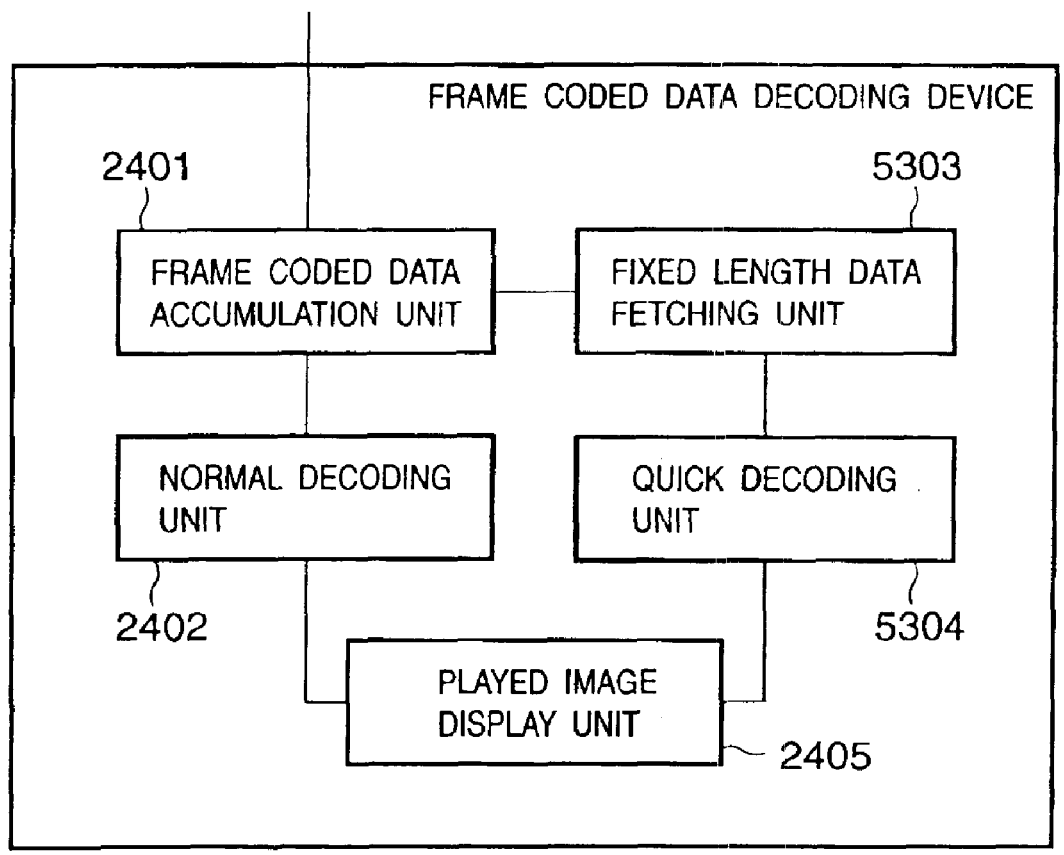
FIG. 53 is a block diagram showing a configuration of a frame decoding device in the tenth embodiment.

The decoding device in this embodiment is shown in FIG. 53. This device has the fixed length data fetching unit 2403 and the quick decoding unit 2404 in the fifth embodiment replaced with a fixed length data fetching unit 5301 and a quick decoding unit 5302. The reason why these units are replaced is that while data treated with quick decoding is the LL sub-band in the fifth embodiment, data treated with quick decoding in this embodiment is the layer length-fixed in each sub-band. Furthermore, processing performed by the frame decoding device in this embodiment is substantially similar to processing performed by the frame decoding device in the fifth embodiment, and therefore detailed description of processing in terms of the frame decoding device in this embodiment is not presented.

As described above, length fixation is performed also in the sub-band, and coded data of each layer constituting the each sub-band is also length-fixed, whereby image coded data adaptable to quick playback of multi-level speeds (playback of the motion image at multi-level frame rates) can be provided. Also, this image coded data can be decoded/played back efficiently.

MODIFICATION

In the above described embodiments, it has been described that a part or all of coded data of the coded data of two-or more of sub-bands or layer structures are length-fixed, and that the length-fixed coded data is effective for using quick (multiple-speed) playback.

However, the method of creating coded data of the present invention may be used for aspects other than quick playback, such a form is also included in the scope of the present invention. For example, since data processing is easily performed separately in parallel for each sub-band/layer if coded data of each sub-band or layer is length-fixed, decoding processing and error correction may be performed for the coded data of each sub-band and each layer as long as technically possible, which is included in the scope of the present invention.

Furthermore, the present invention may be applied either as a part of a system comprised of a plurality of apparatuses (for example, a host computer, an interface apparatus, a reader, a printer, etc.) or as a part of equipment comprised of a single apparatus (for example, a digital video camera, digital steel camera).

Also, the present invention should not be limited to devices and methods for achieving the above described embodiments, but cases where the program code of software to achieve the above described embodiments is supplied to the computer in the above described system or equipment (CPU or MPU), the computer of the above described system or equipment operates the above described various kinds of devices in accordance with this program code, thereby achieving the above described embodiments are also included in the scope of the present invention.

Also, in this case, the program code related to the above described software itself achieves the features of the above described embodiments, and the program code itself and means for supplying the program code to the computer, specifically a storage medium storing therein the above described program code are included in the scope of the present invention.

As for such a storage medium storing therein the program code, for example, a floppy disk, a hard disk, an optical memory disk, a magneto-optical disk, a CD-ROM, a magnetic tape, a nonvolatile memory card, a ROM or the like may be used.

Furthermore, not only when the above described computer controls various kinds of devices in accordance with only the supplied program code, whereby the features of the above described embodiments are achieved, but also when the above described program code operates in collaboration with the OS (operating system) operating on the computer, other application software or the like to achieve the above described embodiments, the program code is included in the scope of the present invention.

Furthermore, the cases where after this supplied program code is stored in a memory provided for the feature expansion board of the computer or the feature expansion unit connected to the computer, the CPU or the like provided for the feature expansion board or the feature expansion unit performs a part or all of actual processing based on instructions of the program code, and the above described embodiments are achieved by the processing are also included in the scope of the present invention.

Furthermore, in the case of applying the present invention to the above described storage medium, the program code corresponding to the previously described flowcharts (shown in FIGS. 14, 15 and 16), or the flowchart in the second embodiment, or the flowchart in the third embodiment, or the flowchart shown in FIG. 18 in the fourth embodiment is stored in the storage medium.

As described above, according to the present invention, in states in which hierarchical coding can be performed, technologies for generating coded data that can cope with many kinds of decoding/playback speeds/times or technologies for decoding these coded data in accordance with many kinds of decoding/playback speeds/times can be provided.

The present invention is not limited to the above embodiments and various changes and modifications can be made within the spirit and scope of the present invention. Therefore, to appraise the public of the scope of the present invention, the following claims are made.

What is claimed is:

1. A coding device for encoding image data, comprising:
    transforming means for performing discrete wavelet transformation on inputted image data, thereby generating transformation factors of a plurality of frequency sub-bands;

coding means for entropy-coding each of said sub-bands and generating entropy-coded data for each of said sub-bands; and generating means for monitoring the amount of entropy-coded data of a predetermined sub-band in said each sub-band, and if the amount exceeds a predetermined code length, removing exceeded coded data from entropy-coded data of the predetermined sub-band, and if the amount does not reach said predetermined code length, adding dummy data to the coded data of the predetermined sub-band, thereby generating fixed length coded data of said predetermined code length, wherein said predetermined sub-band includes at least a lowest frequency sub-band, said generating means generates at least fixed length coded data for the lowest frequency sub-band.

2. The coding device according to claim 1, further comprising:

inputting means for inputting image data and audio data; and audio encoding means for encoding audio data inputted by said inputting means.

3. The coding device according to claim 1, wherein for the sub-band to be subjected to removal, bit planes are removed in ascending order with the lowest bit plane of bit planes expressing the sub-band being first.

4. The coding device according to claim 1, wherein said generating means further comprises means for defining the lowest frequency sub-band of sub-bands obtained by said transforming means as said predetermined sub-band, and making its coded data to be fixed length data.

5. The coding device according to claim 1, wherein said generating means further comprises means for defining each of sub-bands obtained by said transforming means as a predetermined sub-band, and defining the coded data of each sub-band as fixed length data.

6. The coding device according to claim 1, wherein said generating means further comprises means for defining a resolution level constituted by a certain number of sub-bands of the sub-bands obtained by said transforming means as a unit, and defining coded data of such unit as fixed length data.

7. The coding device according to claim 1, wherein said generating means generates a header when generating said fixed length coded data, and information about said fixed length coded data is written in this header.

8. The coding device according to claim 1, wherein said transforming means comprises storing means for storing therein said transformation factor on a temporary basis, and quantization is performed in the order of from a lower level sub-band to a higher level sub-band from this storing means.

9. The coding device according to claim 8, wherein said transforming means gives a larger quantizing step to a higher sub-band at the time of said quantization.

10. A coding method of encoding image data, comprising:

a transforming step of performing discrete wavelet transformation on inputted image data, thereby generating transformation factors of a plurality of frequency sub-bands;

a coding step for entropy-coding each of said sub-bands and generating entropy-coded data for each of said sub-bands; and a generating step for monitoring the amount of entropy-coded data of a predetermined sub-band in said each sub-band, and if the amount exceeds a predetermined code length, removing exceeded coded data from entropy-coded data of the predetermined sub-band, and if the amount does not reach said predetermined code length, adding dummy data to the coded data of the predetermined sub-band, thereby generating fixed length coded data of said predetermined code length, wherein said predetermined sub-band includes at least a lowest frequency sub-band, at least fixed length coded data for the lowest frequency sub-band is generated in said generating step.

11. The coding method according to claim 10, further comprising:

an inputting step for inputting image and audio data; and an audio encoding step, of encoding audio data inputted in said inputting step.

12. A storage medium storing therein program codes functioning as a coding device for encoding image data, comprising:

a program code of a transforming step of performing discrete wavelet transformation on inputted image data, thereby generating transformation factors of a plurality of frequency sub-bands;

a program code of a coding step for entropy-coding each of said sub-bands and generating entropy-coded data for each of said sub-bands; and a program code of a generating step for monitoring the amount of entropy-coded data of a predetermined sub-band in said each sub-band, and if the amount exceeds a predetermined code length, removing exceeded coded data from entropy-coded data of the predetermined sub-band, and if the amount does not reach said predetermined code length, adding dummy data to the coded data of the predetermined sub-band, thereby generating fixed length coded data of said predetermined code length, wherein said predetermined sub-band includes at least a lowest frequency sub-band, at least fixed length coded data for the lowest frequency sub-band is generated in the generating step.

13. The storage medium according to claim 12, further comprising:

a program code of an inputting step for inputting image data and audio data; and a program code of an audio encoding step of encoding audio data inputted in said inputting step.

14. A coding method of encoding image data of each frame constituting a motion image, comprising:

a transforming step of performing discrete wavelet transformation on inputted image data, thereby generating transformation factors of a plurality of frequency sub-bands;

a coding step of entropy-coding each of said sub-bands and generating entropy-coded data for each of said sub-bands; and a generating step of monitoring the amount of entropy-coded data of a predetermined sub-band in said each sub-band, and if the amount exceeds a predetermined code length, removing exceeded coded data from entropy-coded data of the predetermined sub-band, and if the amount does not reach said predetermined code length, adding dummy data to the coded data of the predetermined sub-band, thereby generating fixed length coded data of said predetermined code length, wherein said predetermined sub-band includes at least a lowest frequency sub-band, at least fixed length coded data for the lowest frequency sub-band is generated in said generating step.

15. The coding method according to claim 14, wherein the predetermined sub-band of which said coded data is fixed-length is the lowest frequency sub-band.

16. The coding method according to claim 14, wherein the predetermined sub-bands of which said coded data are fixed-length are the lowest frequency sub-band and higher frequency sub-bands subsequent thereto.

17. A coding device for encoding image data of each frame constituting a motion image, comprising:

transforming means for performing discrete wavelet transformation on inputted image data, thereby generating transformation factors of a plurality of frequency sub-bands;

coding means for entropy-coding each of said sub-bands and generating entropy-coded data for each of said sub-bands; and generating means for monitoring the amount of entropy-coded data of a predetermined sub-band in said each sub-band, and if the amount exceeds a predetermined code length, removing exceeded coded data from entropy-coded data of the predetermined sub-band, and if the amount does not reach said predetermined code length, adding dummy data to the coded data of the predetermined sub-band, thereby generating fixed length coded data of said predetermined code length, wherein the predetermined sub-band includes at least lowest frequency sub-band, and at least fixed-length coded data for the lowest frequency sub-band is generated in said generating means.

18. A storage medium storing therein program codes functioning as a coding device for encoding image data of each frame constituting a motion image, comprising:

a program code of a transforming step of performing discrete wavelet transformation on inputted image data, thereby generating transformation factors of a plurality of frequency sub-bands;

a program code of a code transforming step for entropy-coding each of said sub-bands and generating entropy-coded data for each of said sub-bands; and a program code of a generating step for monitoring the amount of entropy-coded data of a predetermined sub-band in said each sub-band, and if the amount exceeds a predetermined code length, removing exceeded coded data from entropy-coded data of the predetermined sub-band, and if the amount does not reach said predetermined code length, adding dummy data to the coded data of the predetermined sub-band, thereby generating fixed length coded data of said predetermined code length, wherein the predetermined sub-band includes at least lowest frequency sub-band, and at least fixed length coded data for the lowest frequency sub-band is generated in the generating step.

19. An image playing-back method of decoding/playing-back according to 1 to n-fold playback speeds each frame image entropy-coded data obtained by dividing image data of each frame constituting a motion image into frequency sub-bands and encoding the same so that the entropy-coded data of predetermined sub-bands of the frequency sub-bands are fixed length, wherein at least one of the fixed-length entropy-coded data are decoded as objects to be decoded, and are played back as images of frames to be decoded, in accordance with the playback speed, wherein the predetermined sub-band includes at least a lowest frequency sub-band, and the length of entropy-coded of the lowest frequency sub-band for each frame is fixed.

20. The playing-back method according to claim 19, wherein the predetermined sub-band of which the coded data is fixed length is the lowest frequency sub-band, and the coded data of the lowest frequency sub-band is decoded as an object to be decoded in accordance with the playback speeds, and is played back as an image of a frame to be decoded.

21. The playing-back method according to claim 19, wherein the predetermined sub-bands of which the coded data are fixed length are the lowest frequency sub-band and higher frequency sub-bands subsequent thereto, and the coded data of the lowest frequency component, or some coded data of the lowest frequency component and higher frequency sub-bands subsequent thereto are decoded as objects to be decoded in accordance with the playback speeds, and are played back as images of frames to be decoded.

22. An image playing-back device for decoding/playing-back according to 1 to n-fold playback speeds each frame image entropy-coded data obtained by dividing image data of each frame constituting a motion image into frequency sub-bands and encoding the same so that the entropy-coded data of predetermined sub-bands of the frequency sub-bands are fixed length, comprising:

playing-back means for decoding at least one of the fixed length entropy-coded data and playing back the same as images of frames to be decoded, in accordance with the playback speed, wherein the predetermined sub-band includes at least a lowest frequency sub-band, and the length of entropy-coded of the lowest frequency sub-band for each frame is fixed.

23. A storage medium storing therein program codes functioning as an image playing-back device for decoding/playing-back according to 1 to n-fold playback speeds each frame image entropy-coded data obtained by dividing image data of each frame constituting a motion image into frequency sub-bands and encoding the same so that the entropy-coded data of predetermined sub-bands of the frequency sub-bands are length-fixed, comprising:

a program code of a generating step for decoding at least one of the length-fixed entropy-coded data and playing back the same as images of frames to be decoded, in accordance with the playback speed, wherein the predetermined sub-band includes at least a lowest frequency sub-band, and the length of entropy-coded of the lowest frequency sub-band for each frame is fixed.

24. A coding method of encoding image data of each frame constituting a motion image, comprising:

a transforming step, of performing discrete wavelet transformation on inputted image data, thereby generating transformation factors of a plurality of frequency sub-bands;

a dividing step, of dividing into code blocks a plurality of frequency sub-bands obtained in said transforming step;

a decomposing step, of forming into bit planes the code blocks obtained in said dividing step, and decomposing each bit plane into three coding passes;

a coding step, of encoding each coding pass, and distributing the obtained coded data to a plurality of layers, thereby generating coded data having a layer structure; and a code length controlling step, of controlling the coded data of a predetermined layer in each layer so that it takes on a predetermined code length, wherein the predetermined layer includes at least an uppermost layer, and the coded data of the uppermost layer is fixed-length coded data.

25. The coding method according to claim 24, wherein the predetermined layer of which the coded data is fixed length is a layer including coding passes for constructing the uppermost bit plane obtained in said decomposing step.

26. The coding method according to claim 24, wherein the predetermined layer of which the coded data is fixed length is each of a plurality of layers.

27. A coding device for encoding image data of each frame constituting a motion image, comprising:
    transforming means for performing discrete wavelet transformation on inputted image data, thereby generating transformation factors of a plurality of frequency sub-bands;
    dividing means for dividing into code blocks a plurality of frequency sub-bands obtained from said transforming means;
    decomposing means for forming into bit planes the code blocks obtained in said dividing means, and decomposing each bit plane into three coding passes;
    coding means for encoding each coding pass, and distributing the obtained coded data to a plurality of layers, thereby generating coded data having a layer structure; and
    code length controlling for controlling the coded data of a predetermined layer in each layer so that it takes on a predetermined code length,
    wherein said predetermined layer includes at least an uppermost layer, and the coded data of the uppermost layer is fixed length coded data.

28. A storage medium storing therein program codes functioning as a coding device for encoding image data of each frame constituting a motion image, comprising:
    a program code of a transforming step of performing discrete wavelet transformation on inputted image data, thereby generating transformation factors of a plurality of frequency sub-bands;
    a program code of a dividing step of dividing into code blocks a plurality of frequency sub-bands obtained in said transforming step;
    a program code of a decomposing step of forming into bit planes the code blocks obtained in said dividing step, and decomposing each bit plane into three coding passes;
    a program code of a coding step of encoding said each coding pass, and distributing the obtained coded data to a plurality of layers, thereby generating coded data having a layer structure; and
    a program code of a code length controlling step of controlling the coded data of a predetermined layer in said each layer so that it takes on a predetermined code lengths,
    wherein said predetermined layer includes at least an uppermost layer, and the coded data of the uppermost layer is fixed length coded data.

29. An image playing-back method of forming into bit planes transformation factors obtained by subjecting image data of each frame constituting a motion image to wavelet transformation, decomposing each bit plane into three coding passes, distributing coded data expressing these coding passes to a plurality of layers, and decoding/playing-back each frame image coded data subjected to length fixation according to 1 to n-fold playback speeds for the coded data of predetermined layers,
    wherein at least one of the fixed-length coded data are decoded as objects to be decoded, and are played back as images of frames to be decoded, in accordance with the playback speed,
    wherein the predetermined layer includes at least an uppermost layer, and the coded data of the uppermost layer is fixed length coded data.

30. The coding device according to claim 27, wherein the predetermined layer of which the coded data is fixed length is a layer including coding passes for constructing the uppermost bit plane in each bit plane.

31. The coding device according to claim 27, wherein the predetermined layer of which coded data is fixed length is each of a plurality of layers.

32. An image playing-back device for forming into bit planes transformation factors obtained by subjecting image data of each frame constituting a motion image to wavelet transformation, decomposing each bit plane into three coding passes, distributing coded data expressing these coding passes to a plurality of layers, and decoding/playing-back each frame image coded data subjected to length fixation according to 1 to n-fold playback speeds for the coded data of predetermined layers, comprising:
    means for decoding at least one of fixed-length coded data and playing back the same as images of frames to be decoded, in accordance with the playback speed,
    wherein the predetermined layer includes at least an uppermost layer, and the coded data of the uppermost layer is fixed-length coded data.

33. A storage medium storing therein program codes functioning as an image playing-back device for forming into bit planes transformation factors obtained by subjecting image data of each frame constituting a motion image to wavelet transformation, decomposing each bit plane into three coding passes, distributing coded data expressing these coding passes to a plurality of layers, and decoding/playing-back each frame image coded data subjected to length fixation according to 1 to n-fold playback speeds for the coded data of predetermined layers, comprising:
    a program code of a step of decoding at least one of fixed-length coded data and playing back the same as images of frames to be decoded, in accordance with the playback speed,
    wherein the predetermined layer includes at least an uppermost layer, and the coded data of the uppermost layer is fixed-length coded data.

* * * * *

UNITED STATES PATENT AND TRADEMARK OFFICE
CERTIFICATE OF CORRECTION

| | |
|---|---|
| PATENT NO. | : 6,950,471 B2 |
| APPLICATION NO. | : 09/851559 |
| DATED | : September 27, 2005 |
| INVENTOR(S) | : Hiroki Kishi |

It is certified that error appears in the above-identified patent and that said Letters Patent is hereby corrected as shown below:

COLUMN 1

Line 14, "an" should read --a--; and
    Line 67, "an" should read --a--.

COLUMN 4

Line 45, "an" should read --a--.

COLUMN 5

Line 58, "an" should read --a--; and
    Line 59, "each by each" should read --one by one--.

COLUMN 6

Line 60, "follows" should read --follows:--.

COLUMN 9

Line 3, "has" should read --has been--.

COLUMN 12

Line 7, "has" should read --has been--.

COLUMN 13

Line 7, "thereby" should read --thereby--; and
    Line 50, "has" should read --has been--.

COLUMN 14

Line 48, "a" should be deleted.

UNITED STATES PATENT AND TRADEMARK OFFICE
CERTIFICATE OF CORRECTION

PATENT NO. : 6,950,471 B2
APPLICATION NO. : 09/851559
DATED : September 27, 2005
INVENTOR(S) : Hiroki Kishi It is certified that error appears in the above-identified patent and that said Letters Patent is hereby corrected as shown below:

COLUMN 15

Line 6, "In" should read --¶ In--;
    Line 9, "If" should read --¶ If--;
    Line 19, "On" should read --¶ On--;
    Line 33, "Image" should read --¶ Image--;
    Line 37, "The" should read --¶ The--;
    Line 44, "Furthermore," should read --¶ Furthermore,--;
    Line 48, "Furthermore," should read --¶ Furthermore,--;
    Line 55, "However," should read --¶ However,--;
    Line 60, "FIG. 24" should read --¶ FIG. 24--; and
    Line 66, "A" should read --¶ A--.

COLUMN 16

Line 1, "Frame" should read --¶ Frame--;
    Line 14, "Processing" should read --¶ Processing--;
    Line 16, "FIG. 26" should read --¶ FIG. 26--;
    Line 23, "A" should read --¶ A--;
    Line 25, "When" should read --¶ When--; and
    Line 35, "The" should read --¶ The--.

COLUMN 18

Line 4, "has" should read --has been--;
    Line 26, "has" should read --has been--;
    Line 47, "possible-to" should read --possible to--;
    Line 54, "there by" should read --thereby--; and "playback" should read --play back--.

COLUMN 19
    Line 19, "keeps" should read --keep--;
    Line 37, "has" should read --has been--;and
    Line 61, "has" should read --has been--.

UNITED STATES PATENT AND TRADEMARK OFFICE
CERTIFICATE OF CORRECTION

| | | |
|---|---|---|
| PATENT NO. | : 6,950,471 B2 | |
| APPLICATION NO. | : 09/851559 | |
| DATED | : September 27, 2005 | |
| INVENTOR(S) | : Hiroki Kishi | |

It is certified that error appears in the above-identified patent and that said Letters Patent is hereby corrected as shown below:

COLUMN 20

Line 5, "CO," should read --C0,--.

COLUMN 21

Line 9, "has" should read --has been--; and
    Line 15, "LH1," should read --HL1,--.

COLUMN 22

Line 32, "has" should read --has been--; and
    Line 55, "has" should read --has been--.

COLUMN 23

Line 4, "construct" should read --constructing--;
    Line 4, "a" should read --as--; and
    Line 25, "equal" should read --equal to--.

COLUMN 24

Line 50, "has" should read --has been--.

COLUMN 25

Line 51, "two-or" should read --two or--.

UNITED STATES PATENT AND TRADEMARK OFFICE
CERTIFICATE OF CORRECTION

PATENT NO. : 6,950,471 B2
APPLICATION NO. : 09/851559
DATED : September 27, 2005
INVENTOR(S) : Hiroki Kishi It is certified that error appears in the above-identified patent and that said Letters Patent is hereby corrected as shown below:

COLUMN 29

Line 66, "coded" should read --coded data--.

COLUMN 30

Line 30, "coded" should read --coded data--; and
Line 46, "coded" should read --coded data--.

COLUMN 31

Line 56, "lengths," should read --length,--.

Signed and Sealed this

Eighth Day of July, 2008

JON W. DUDAS
*Director of the United States Patent and Trademark Office*